(12) United States Patent
Kai et al.

(10) Patent No.: US 9,200,174 B2
(45) Date of Patent: Dec. 1, 2015

(54) LAMINATED BODY, CONDUCTIVE LAMINATED BODY, TOUCH PANEL, COATING COMPOSITION AND METHOD OF MANUFACTURING LAMINATED BODY THAT USES THE COATING

(71) Applicant: Toray Industries, Inc., Tokyo (JP)

(72) Inventors: Michiko Kai, Otsu (JP); Yasuyuki Ishida, Otsu (JP); Tadahiko Iwaya, Otsu (JP); Yasushi Takada, Otsu (JP)

(73) Assignee: Toray Industries, Inc. (JP)

( * ) Notice: Subject to any disclaimer, the term of this patent is extended or adjusted under 35 U.S.C. 154(b) by 0 days.

(21) Appl. No.: 14/402,513

(22) PCT Filed: May 28, 2013

(86) PCT No.: PCT/JP2013/064725
§ 371 (c)(1),
(2) Date: Nov. 20, 2014

(87) PCT Pub. No.: WO2013/183487
PCT Pub. Date: Dec. 12, 2013

(65) Prior Publication Data
US 2015/0152279 A1 Jun. 4, 2015

(30) Foreign Application Priority Data

Jun. 6, 2012 (JP) .................. 2012-128606
Jun. 6, 2012 (JP) .................. 2012-128607
Sep. 13, 2012 (JP) .................. 2012-201190
Feb. 6, 2013 (JP) .................. 2013-021162

(51) Int. Cl.
*C09D 129/10* (2006.01)
*G06F 3/044* (2006.01)
(Continued)

(52) U.S. Cl.
CPC ............ *C09D 129/10* (2013.01); *C09D 7/12* (2013.01); *C09D 133/16* (2013.01);
(Continued)

(58) Field of Classification Search
CPC ...... C09D 129/10; C09D 143/04; G02B 1/04; G06F 3/044
See application file for complete search history.

(56) References Cited

U.S. PATENT DOCUMENTS 2,681,294 A 6/1954 Beguin
5,389,422 A * 2/1995 Okazaki .................. B32B 27/20
428/141

(Continued)

FOREIGN PATENT DOCUMENTS

JP 2001276728 A2 * 9/2001
JP 2001-276728 A 10/2001
(Continued)

OTHER PUBLICATIONS

Abstract_JP_2001276728_A; Ikishima, Kenji; Coated Metal Panel Excellent in Design Effect and Abrasion Resistance; Sep. 10, 2001; JPO; whole document.*

*Primary Examiner* — Tahseen N Khan
(74) *Attorney, Agent, or Firm* — DLA Piper LLP (US)

(57) ABSTRACT

A laminated body is a laminated body that has in this order a second layer and a first layer with different indices of refraction on at least one surface of a supporting base material, and the first layer contains particles X (particles X being particles having at least an inorganic particle part), with the second layer containing particles Y (particles Y being particles having at least an inorganic particle part) and is characterized by the number average particle size ($D_X$ in the following) for the inorganic particle parts for the particles X being 5-25 nm and by Equations 1 and 2 being satisfied:

$$1.4 \leq (L_X/D_X) \leq 3 \qquad 1$$

$$S_{LX} \leq 7 \qquad 2.$$

10 Claims, 6 Drawing Sheets

(51) Int. Cl.
- *C09D 143/04* (2006.01)
- *G02B 1/04* (2006.01)
- *C09D 7/12* (2006.01)
- *C09D 201/00* (2006.01)
- *G06F 3/041* (2006.01)
- *C09D 133/16* (2006.01)
- *C08F 222/10* (2006.01)

(52) U.S. Cl.
CPC ........... *C09D 143/04* (2013.01); *C09D 201/00* (2013.01); *G02B 1/04* (2013.01); *G06F 3/041* (2013.01); *G06F 3/044* (2013.01); *C08F 2222/104* (2013.01)

(56) References Cited

U.S. PATENT DOCUMENTS 6,083,617 A * 7/2000 Aoyama ................ C08J 5/18
　　　　　　　　　　　　　　　　　423/700

2007/0224434 A1* 9/2007 Osada ................ B32B 27/08
　　　　　　　　　　　　　　　　　428/480
2010/0033650 A1* 2/2010 Sato .................. C08J 7/047
　　　　　　　　　　　　　　　　　349/62
2010/0189959 A1* 7/2010 Sato .................. G02B 5/0226
　　　　　　　　　　　　　　　　　428/143

FOREIGN PATENT DOCUMENTS

| JP | 3626624 B2 | 12/2004 |
| JP | 2005-139301 A | 6/2005 |
| JP | 2009-051045 A | 3/2009 |
| JP | 2009-217258 A | 9/2009 |
| JP | 2010-015861 A | 1/2010 |
| JP | 2011-183567 A | 9/2011 |
| JP | 2012-008158 A | 1/2012 |

* cited by examiner

LAMINATED BODY, CONDUCTIVE LAMINATED BODY, TOUCH PANEL, COATING COMPOSITION AND METHOD OF MANUFACTURING LAMINATED BODY THAT USES THE COATING

TECHNICAL FIELD

This disclosure relates to a touch panel used in various electronic devices, a conductive laminated body used in a transparent electrode of the touch panel, a laminated body used to adjust the refractive index of the conductive laminated body, and a coating composition and a method of producing a laminated body using the coating composition.

BACKGROUND

In recent years, capacitance touch panels have been increasingly used in various mobile devices such as cellular phones and portable music players. Such capacitance touch panels have a structure in which a dielectric layer is laminated on a patterned conductor, and touching with a finger or the like establishes a ground via capacitance of a human body. In that case, there occurs a change in the value of resistance between a patterned electrode and a grounding point, and position input is recognized. However, when conventional transparent conductive films are used, there has been a problem in that a pattern is emphasized because of a great difference in optical properties between a part having a conductive layer and a part where the conductive layer is removed, which reduces visibility when disposed at a front of a display such as a liquid crystal display.

To not emphasize the transmittance and color tone of a transparent conductive film and, furthermore, the pattern of a conductive layer, methods have been proposed which are used for antireflection films and the like and utilize interference of light with layers having different refractive indices laminated. In other words, methods have been proposed which utilize optical interference with a layer having a different refractive index (also referred to as an index-matching layer, a refractive index-adjusting layer, an optically functional layer, an optically adjusting layer, or an antireflection layer) provided between a transparent conductive thin-film layer and a substrate film, and JP 2010-15861 A discloses "a transparent conductive laminated film having a structure in which a high refractive index layer, a low refractive index layer, and a transparent conductive thin-film layer are laminated in this order on a substrate made of a transparent plastic film, wherein the high refractive index layer has a refractive index in the range of 1.70 to 2.50 and a thickness in the range 4 to 20 nm, and the low refractive index layer has a refractive index in the range of 1.30 to 1.60 and a thickness in the range 20 to 50 nm."

As an example of formation of the refractive index-adjusting layer described above by wet coating, Japanese Patent No. 3626624 discloses "a transparent conductive laminated body comprising an organic polymer substrate and a transparent conductive layer laminated on at least one outermost surface of the substrate, wherein (A1) a layer having a refractive index in the range from 1.7 to the refractive index of the transparent conductive layer+0.3 and a thickness in the range of 20 to 90 nm (H1 layer), (B1) a layer having a refractive index in the range of 1.35 to 1.5 and a thickness in the range of 30 to 110 nm (L1 layer), and (C) a transparent conductive layer having a thickness in the range of 12 to 30 nm are laminated on the substrate in this order; (D) the sum of optical thicknesses of the three layers is in the range of 180 to 230 nm; (F) the average reflectance of the lamination surface of the transparent conductive layer at a wavelength of 450 to 650 nm is 5.5% or less; and (G) the b* value of transmitted light of the laminated body, based on the psychometric chroma coordinates of the L*a*b* color system defined in Japanese Industrial Standard Z8729, is in the range of 0 to 2" and "the transparent conductive laminated body, wherein the H1 layer and/or the L1 layer are layers obtained mainly by hydrolysis and condensation of metal alkoxides."

Further, as an example in which the outermost surface shape of a lower layer (underlying layer) of a transparent electrode layer is focused, JP 2011-183567 A discloses "a substrate with a transparent electrode, wherein an underlying layer composed mainly of partially or completely particulate silicon oxide, and a transparent electrode layer comprising a transparent conductive oxide layer composed mainly of indium oxide or zinc oxide are formed on the substrate in this order, and the underlying layer has an arithmetic average roughness (Ra) of 4 nm to 10 nm and a refractive index in the range of 1.34 to 1.60."

The process of forming a conductive layer pattern from a transparent conductive film is generally performed by removing unwanted parts of a conductive layer by etching. In the etching process, alkaline solution is often used, and therefore a refractive index-adjusting layer of the transparent conductive film requires alkali resistance. One method of providing a laminated body with alkali resistance like this refractive index-adjusting layer is an antireflection layer with high alkali resistance, and as an example thereof, JP 2009-51045 A discloses "an antireflection film having a substrate film made of biaxially-stretched polyethylene terephthalate, a hard coat layer on the substrate film, and, furthermore, a low refractive index layer on the hard coat layer, wherein the hard coat layer has a thickness of 0.5 to 5 μm, and the hard coat layer is formed by blending 100 parts by mass of an ionizing radiation-curable resin comprising 80 to 97% by mass of polyfunctional (meth)acrylate having two or more (meth)acryloyl groups in its molecule and 20 to 3% by mass of N-vinylcaprolactam with 200 to 600 parts by mass of antimony pentoxide, and curing the blending."

There are the following problems in the prior art mentioned above.

In JP '861 and JP '624, a high refractive index layer, a low refractive index layer, and a conductive layer are laminated on a substrate. However, according to the description of JP '861, the low refractive index layer is laminated by sputtering, and in JP '624, alkoxysilane hydrolysate is used. The refractive index described in Examples is about 1.46, but we determined that such a refractive index is insufficient to produce the effect of reducing coloring of transmitted light and the effect of making a pattern of a conductive layer less visible, and simply lowering the refractive index at the same constitution may compromise in-plane uniformity of the effect of making a pattern of a conductive layer less visible.

In JP '045, a high refractive index layer and a low refractive index layer are laminated on a substrate, but we determined that the alkali resistance is insufficient. Moreover, according to the method of evaluating alkali resistance described in Examples, when a conductive layer is formed on the high refractive index layer and the low refractive index layer, the alkali resistance is insufficient for the process of patterning the conductive layer.

In JP '567, a conductive layer is formed on an underlying layer composed mainly of particulate silicon oxide, but we determined that the effect of making a pattern of a conductive layer less visible and the effect of preventing coloring of transmitted light are insufficient.

In addition, in any of JP '861, JP '624 and JP '567, annealing is performed to improve the conductivity after forming a conductive layer, but the annealing temperature is as high as 170° C. or higher, which may cause deformation of a support substrate, heat shrinkage, precipitation of oligomer components, and the like.

It could therefore be helpful to provide a laminated body having a laminated film comprising a first layer and a second layer having different refractive indices on at least one surface of a support substrate, the laminated body having desired properties even if annealing for improving conductivity and light transmittance is carried out at a lower temperature when a conductive layer is laminated on the outermost surface of the laminated film to form a conductive laminated body, a method of producing the laminated body, and a coating composition for producing the laminated body.

It could also be helpful to provide a laminated body with high alkali resistance which is not affected when a conductive layer is formed on the outermost surface of the laminated film, or even if alkaline solution is used for patterning when the conductive layer is further patterned by etching, the laminated body further being able to reduce observation angle dependence and in-plane uniformity of the effect of reducing coloring of transmitted light and the effect of making a pattern of a conductive layer less visible, a method of producing the laminated body, and a coating composition for producing the laminated body.

SUMMARY

We thus provide:
First Group (Laminated Body)
1) A laminated body comprising a first layer, a second layer, and a support substrate, the second layer and the first layer having different refractive indices and being laminated in this order on at least one surface of the support substrate, the first layer containing particles X (the particles X being particles having at least an inorganic particle part), the second layer containing particles Y (the particles Y being particles having at least an inorganic particle part),
wherein the inorganic particle part of the particles X has a number average particle diameter (hereinafter referred to as $D_X$) [nm] of 5 nm to 25 nm, and Expression (1) and Expression (2) are satisfied:

$$1.4 \leq (L_X/D_X) \leq 3 \quad (1)$$

$$S_{LX} \leq 7 \quad (2).$$

$L_X$ means an average center-to-center distance [nm] between particles of the inorganic particle part of the particles X as measured by observation of the surface of the first layer under a scanning electron microscope.

$S_{LX}$ means a standard deviation of the average center-to-center distance [nm] between particles of the inorganic particle part of the particles X as measured by observation of the surface of the first layer under a scanning electron microscope.

2) The laminated body according to 1), wherein the first layer has an average thickness of 20 nm to 40 nm, and the second layer has an average thickness of 30 nm to 65 nm.

3) The laminated body according to 1) or 2), wherein the number of openings having an inscribed diameter three times or more the $D_X$, as determined by observation of the surface of the first layer under a scanning electron microscope, is not more than 5 per 4 μm².

4) The laminated body according to any one of 1) to 3), wherein an interface formed by the first layer and the second layer satisfies Expression (3) and Expression (4):

$$0.3 \leq (A_{12}/D_X) \leq 1.1 \quad (3)$$

$$3 \leq (F_{12}/D_X) \leq 15 \quad (4).$$

$A_{12}$ [nm] means an amplitude of a contour curve of the interface formed by the first layer and the second layer.
$F_{12}$ [nm] means a wavelength of the contour curve of the interface formed by the first layer and the second layer.

5) The laminated body according to any one of claims 1 to 4, wherein a zeta potential at pH 10 of the surface of the first layer is −60 mV or less.

6) A conductive laminated body having a conductive layer on the first layer of the laminated body according to any of 1) to 5).

7) A touch panel comprising the conductive laminated body according to 6).

Second Group (Coating Composition)
8) A coating composition comprising a polymer having a part derived from a fluorine compound A (hereinafter referred to as a fluorine polymer A), particles having an inorganic particle part and a part derived from the fluorine polymer A (hereinafter referred to as particles a), particles having an inorganic particle part but not having a part derived from the fluorine polymer A (hereinafter referred to as particles b), a binder material, and an organic solvent, the coating composition satisfying all Requirements 1 to 3:

Requirement 1: The mass ratio of the total of the part derived from the fluorine polymer A in the particles a, the fluorine compound A, and the fluorine polymer A to the binder material is 25:75 to 55:45.

Requirement 2: The mass ratio of the total of the fluorine polymer A and the part derived from the fluorine polymer A in the particles a to the part derived from the fluorine polymer A in the particles a is 10:90 to 87:13.

Requirement 3: The mass ratio of the total of the fluorine polymer A and the part derived from the fluorine polymer A in the particles a to the part derived from the fluorine compound A in the fluorine polymer A is 20:80 to 92:8.

The fluorine compound A refers to a compound represented by Formula (1) below:

$R^{f1}$ means at least one substituent group selected from the group consisting of fluoroalkyl, fluorooxyalkyl, fluoroalkenyl, fluoroalkanediyl, and fluorooxyalkanediyl.
$R^1$ means a reactive site.
$R^2$ means any alkylene group with a carbon number of 1 to 9 or any alkylene ether group with a carbon number of 1 to 9.
$R^{f1}$, $R^1$, and $R^2$ each may have a side chain in its structure.
The fluorine polymer A refers to a polymer having the part derived from the fluorine compound A and a part derived from a compound D represented by Formula (2) below:

$R^3$ means a reactive site.
$R^4$ means any alkylene group with a carbon number of 1 to 6 or any alkylene ether group with a carbon number of 1 to 6.
$R^5$ and $R^6$ each means hydrogen or any alkyl group with a carbon number of 1 to 4.
n1 means an integer from 0 to 2.

9) The coating composition according to 8), wherein the fluorine compound A is a compound represented by Formula (3) below:

$$R^{f2}\text{—}X\text{—}OCOCH\text{=}CH_2 \quad \text{Formula (3).}$$

$R^{f2}$ means any linear perfluoroalkyl group with a carbon number of 4 to 6.

X means any alkylene group with a carbon number of 4 to 8.

10) The coating composition according to 8) or 9), wherein the fluorine polymer A is a polymer further having a part derived from a compound E represented by Formula (4) below:

$$(R^7)_{n2}\text{—}R^8{}_{n3} \quad \text{Formula (4).}$$

$R^7$ means a reactive site.

$R^8$ means any alkylene group with a carbon number of 1 to 6, any hydroxyalkyl group with a carbon number of 1 to 6, any alkoxy group with a carbon number of 1 to 6, any alkylene ether group with a carbon number of 1 to 3, any polyhydric alcohol derivative with a carbon number of 1 to 5, any carboxylic acid derivative with a carbon number of 1 to 12, any amide derivative with a carbon number of 1 to 6, or a bisphenol derivative. n2 means an integer from 1 to 3, and n3 means an integer from 1 to 10.

11) The coating composition according to 10), wherein $R^8$ of the compound E is a lactone ring.

Third Group (Method of Producing Laminated Body)

12) A method of producing a laminated body comprising a first layer, a second layer, and a support substrate, the second layer and the first layer having different refractive indices and being laminated in this order on at least one surface of the support substrate, the first layer containing particles A, the second layer containing particles B, the method comprising applying the coating composition according to any one of 8) to 11) to at least one surface of the support substrate in one coating step, followed by drying.

Particles derived from the particles a is referred to as the particles A, and particles derived from the particles b as the particles B.

13) The production method according to 12), wherein the surface of the support substrate to be coated with the coating composition has a zeta potential at a pH of the coating composition of −12 mV or less, and the surface of the support substrate to be coated with the coating composition has a surface free energy of 52 mN/m or less.

By using the coating composition and the production method, the laminated body can be obtained having desired properties even if annealing to improve conductivity and light transmittance is carried out at a lower temperature when a conductive layer is laminated on the outermost surface of a laminated film to form a conductive laminated body.

In addition, the laminated body has high alkali resistance, and is able to reduce observation angle dependence and in-plane uniformity of the effect of reducing coloring of transmitted light, the effect of making a pattern of a conductive layer less visible, and color tone when a conductive layer is formed on the outermost surface at the laminated film side of the laminated body, or when the conductive layer is further patterned by etching.

Figure 1:
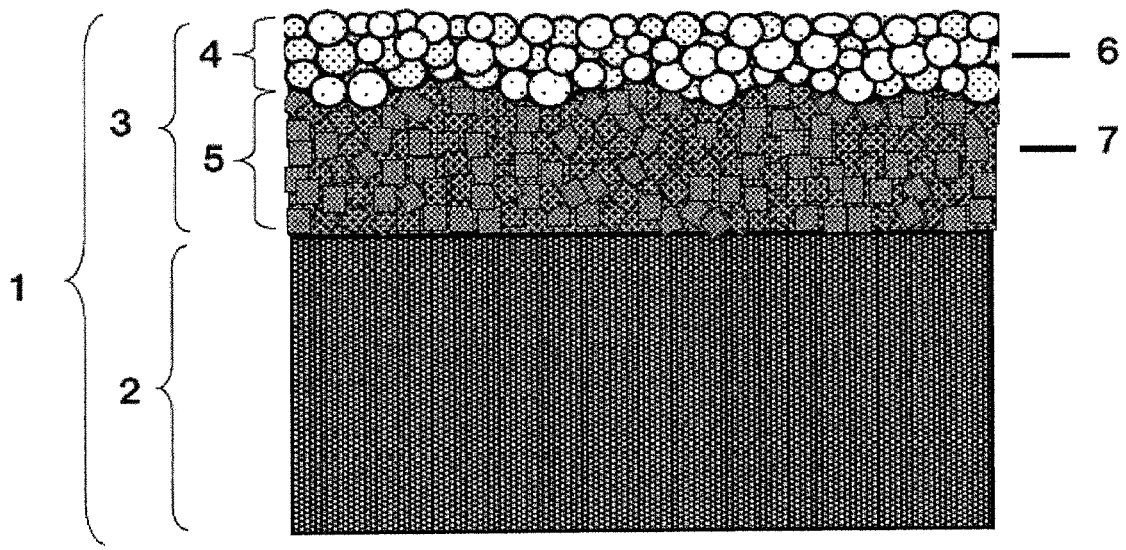
FIG. 1 is a schematic cross-sectional view of one aspect of the preferred laminated body.

DESCRIPTION OF SYMBOLS 1, 8, 15, 32, 40, 48, 57, 64, 72: Laminated body
2, 9, 16, 33, 41, 49, 58, 65, 73: Support substrate
3, 10, 17, 34, 42, 50, 59, 66, 74: Laminated film
4, 11, 18, 35, 43, 51, 61, 68, 76: First layer
5, 12, 19, 36, 44, 52, 62, 69, 77: Second layer
6, 13, 21, 23, 26, 27, 37, 45, 53, 85, 86, 87, 88, 89: Inorganic particle part of particles X
7, 14, 20, 39, 47, 55: Inorganic particle part of particles Y
22: Opening
24: Circumcircle
25: Center of circumcircle (center point of inorganic particle part of particles X)
28, 84: Center-to-center distance of inorganic particle part of particles X
29, 38, 46, 54: Contour curve of interface
30: Amplitude of contour curve of interface
31: Wavelength of contour curve of interface
56, 63, 71: Conductive laminated body
60, 67, 75: Conductive layer
70: Part where first layer is exposed at outermost surface
78: Hard coat layer and/or adhesion-improving layer
79: Hard coat layer and/or adhesion-improving layer, anti-blocking layer
80: Inscribed circle of opening

DETAILED DESCRIPTION

First Group

The first group relates to a laminated body and will be described in detail.

First, one preferred aspect of the laminated body is shown in FIG. 1. In a laminated body (1), a laminated film (3) is laminated on at least one surface of a support substrate (2). The laminated film (3) comprises a first layer (4) and a second layer (5) having different refractive indices. There is no restriction on the laminated film (3) as long as the first layer and the second layer have different refractive indices, but the first layer (4) preferably has a refractive index lower than that of the second layer (5). For the first layer and the second layer, a layer having a relatively low refractive index is referred to as a low refractive index layer, and a layer having a relatively high refractive index as a high refractive index layer.

"Laminated body" as used herein refers to a member having the second layer and the first layer with different refractive indices on at least one surface of the support substrate in this order.

The laminated body has the second layer (5) and the first layer (4) in this order on at least one surface of the support substrate (2), the first layer (4) containing particles X (6), the second layer (5) containing particles Y (7). The particles X are particles having at least an inorganic particle part and further satisfying specific requirements mentioned below. The particles Y are particles having at least an inorganic particle part.

The support substrate, the particles X, and the particles Y will now be described.

Support Substrate

It is important that the laminated body and a laminated body of the third group (a method of producing a laminated body) mentioned below, and a conductive laminated body formed using these laminated bodies have a support substrate. The support substrate is preferably a plastic film rather than a glass plate. Examples of the material of the plastic film include cellulose esters (e.g., triacetylcellulose, diacetylcellulose, propionylcellulose, butyrylcellulose, acetylpropionylcellulose, nitrocellulose), polyamides, polycarbonates, polyesters (e.g., polyethylene terephthalate, polyethylene naphthalate, poly-1,4-cyclohexanedimethylene terephthalate, polyethylene-1,2-diphenoxyethane-4,4'-dicarboxylate, polybutylene terephthalate), polystyrenes (e.g., syndiotactic polystyrene), polyolefins (e.g., polypropylene, polyethylene, polymethylpentene), polysulfones, polyethersulfones, polyarylates, polyetherimides, polymethyl methacrylates, and polyether ketones, among which triacetylcellulose, polycarbonates, polyethylene terephthalate, and polyethylene naphthalate are particularly preferred.

The light transmittance of the support substrate is preferably 80% to 100%, more preferably 86% to 100%. "Light transmittance" is a fraction of incident light that passes through a sample and is an indicator of transparency of a transparent material which can be measured in accordance with JIS K 7361-1 (1997). For the conductive laminated body, this value is preferably as large as possible, and if the value is small, a haze value can increase, resulting in image degradation. The haze in an indicator of cloudiness of a transparent material defined in JIS K 7136 (2000). A smaller haze indicates a higher transparency.

The haze of the support substrate is preferably 0.01% to 2.0%, more preferably 0.05% to 1.0%.

The refractive index of the support substrate is preferably 1.4 to 1.7. "Refractive index" as used herein is a ratio of change in angle of the traveling direction of light at the interface as light travels from air into a substance, and can be measured by the method defined in JIS K 7142 (1996).

The support substrate may contain an infrared absorber or UV absorber. The content of the infrared absorber is preferably 0.01% by mass to 20% by mass based on 100% by mass of the total components of the support substrate, more preferably 0.05% by mass to 10% by mass. The transparent support may contain particles of an inactive inorganic compound as a lubricant. Examples of inactive inorganic compounds include $SiO_2$, $TiO_2$, $BaSO_4$, $CaCO_3$, talc, and kaolin. Further, the support substrate may be subjected to a surface treatment.

The surface of the support substrate can also be subjected to various surface treatments. Examples of surface treatments include chemical treatment, mechanical treatment, corona discharge treatment, flame treatment, UV irradiation treatment, high-frequency treatment, glow discharge treatment, active plasma treatment, laser treatment, mixed acid treatment, and ozone oxidation treatment. Of these, glow discharge treatment, UV irradiation treatment, corona discharge treatment, and flame treatment are preferred, and glow discharge treatment, corona discharge treatment, and UV treatment are more preferred.

The support substrate may have layers (which are referred to as functional layers) such as an adhesion-improving layer, a hard coat layer, an antiblocking layer, an antistatic layer, a UV-absorbing layer, and an oligomer block layer.

Unless otherwise noted, the above description of the support substrate also applies to the second group and the third group.

Particles X

There is no limitation on the particles X if they have at least an inorganic particle part and, furthermore, Expression 1 and Expression 2 described below are satisfied. Thus, the particles X may be particles composed only of inorganic particle parts (what is called normal inorganic particles) or particles further having other parts (e.g., "inorganic particles coated with an organic compound," "inorganic particles having a part derived from a polymer" described below).

Preferred examples of the inorganic particle part of the particles X include oxides, nitrides, borides, fluorides, carbonates, and sulfates of a semimetal element or metal element selected from Si, Na, K, Ca, Mg, and Al. Silica particles ($SiO_2$), alkali metal fluorides (e.g., NaF, KF, $NaAlF_6$), and alkaline earth metal fluorides (e.g., $CaF_2$, $MgF_2$) are more preferred, and silica particles are particularly preferred in terms of durability, refractive index, cost, and the like.

"Silica particles" refers to particles containing a composition comprising either a silicon compound or a polymer (condensate) of an inorganic/organic silicon compound, and is a general term of particles derived, for example, from silicon oxides such as $SiO_2$. There is no limitation on the shape suitable for the inorganic particle part of the particles X, but a shape close to a sphere is more preferred to form the surface shape because the filled state of the first layer of the particles X has influence on the surface shape of a laminated body.

Further, there is no limitation on the particles X contained in the first layer in the laminated body of the first group if they have at least an inorganic particle part and, furthermore, the number average particle diameter $D_X$ of the inorganic particle part is 5 nm to 25 nm, but the particles X are preferably particles A (particles derived from particles a) and/or particles a mentioned below.

In particular, the laminated body of the first group is preferably obtained by the production method of the third group using the coating composition of the second group, that is, the particles X are preferably the particles A (particles derived from the particles a) mentioned below.

In the laminated body, it is important that the number average particle diameter ($D_X$) of the inorganic particle part of the particles X be 5 nm to 25 nm. The number average particle diameter ($D_X$) of the inorganic particle part of the particles X is more preferably 8 nm to 20 nm, particularly preferably 10 nm to 20 nm. The number average particle diameter ($D_X$) of the inorganic particle part of the particles X means an arithmetic average diameter by number described in JIS Z8819-2 (2001) and is a value obtained by observation of a cross-section of the laminated body described above under a transmission electron microscope (TEM). A specific method of measuring it will be described below.

When the number average particle diameter ($D_X$) of the inorganic particle part of the particles X is less than 5 nm, a specific surface shape (the specific surface shape meaning that Expression 1 and Expression 2 below are satisfied) of the laminated body mentioned below cannot be formed, and thus the annealing temperature-lowering effect produced when a conductive layer is formed on the surface of the laminated film (3) is insufficient. On the other hand, when the number average particle diameter of the inorganic particle part of the particles X is more than 25 nm, the surface of the first layer of the laminated body will be rough and, consequently, reduction in transparency and reduction in conductivity (increase of surface resistance value) upon formation of a conductive layer on the surface of the laminated film (3) Occur.

Figure 2:
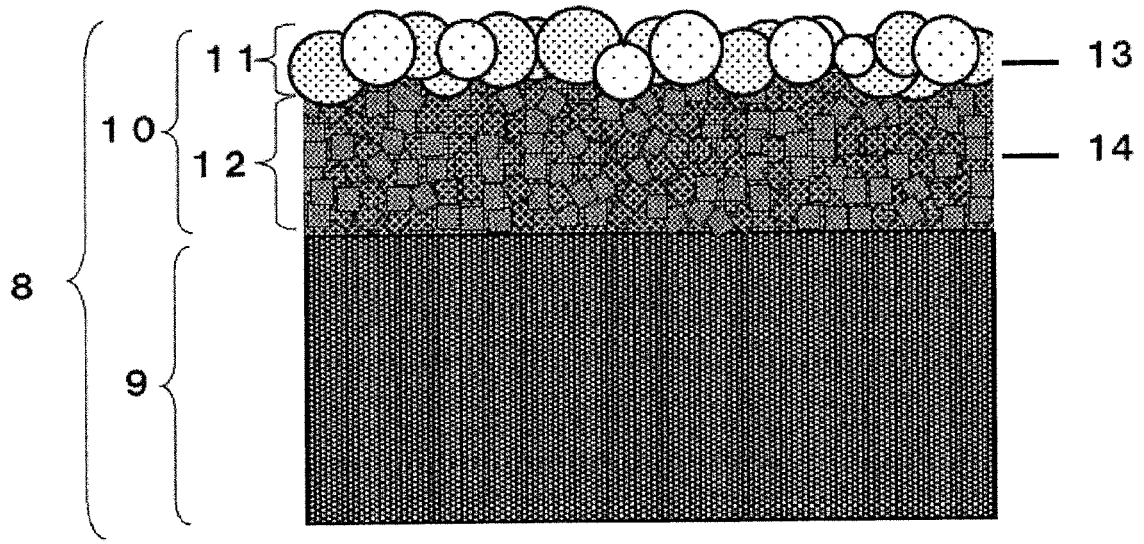
FIG. 2 is a schematic cross-sectional view of one aspect of a laminated body of the prior art.
Figure 3:
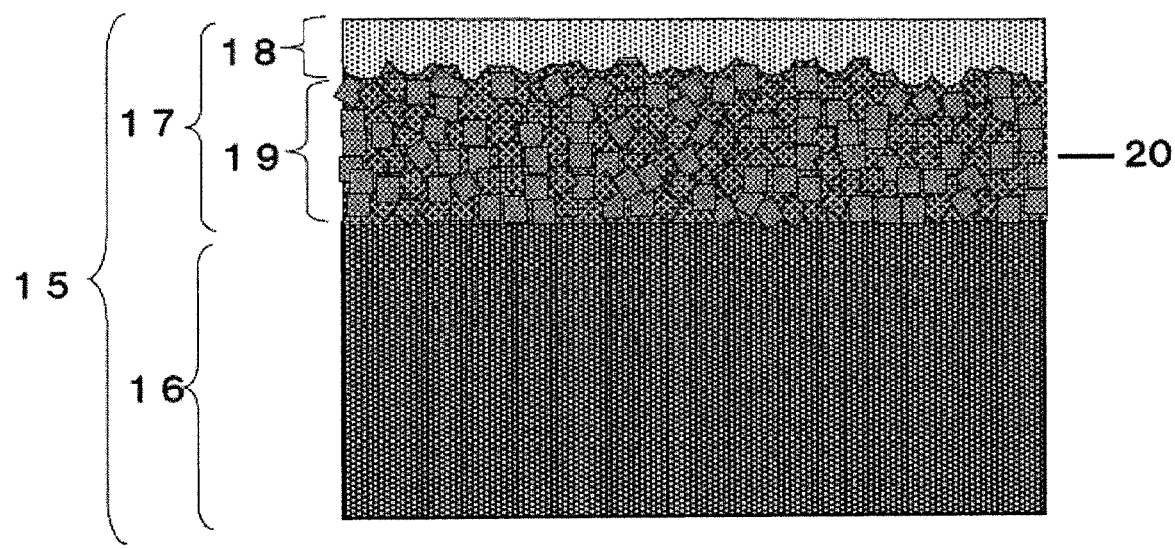
FIG. 3 is schematic cross-sectional view of one aspect of a laminated body of the prior art.

FIG. 2 shows one aspect of a laminated body of the prior art where the number average particle diameter ($D_X$) of an inorganic particle part of particles X (13) is more than 25 nm. FIG. 3 shows one aspect of a laminated body of the prior art where the particles X are not contained in a first layer.

Further, it is important that the laminated body satisfy Expression (1) and Expression (2) below:

$$1.4 \leq (L_X/D_X) \leq 3 \quad (1)$$

$$S_{LX} \leq 7 \quad (2).$$

The laminated body preferably satisfies Expression (1-2) and Expression (2-2) below, particularly preferably satisfies Expression (1-3) and Expression (2-3):

$$1.5 \leq (L_X/D_X) \leq 2.8 \quad (1\text{-}2)$$

$$S_{LX} \leq 5 \quad (2\text{-}2)$$

$$1.6 \leq (L_X/D_X) \leq 2.6 \quad (1\text{-}3)$$

$$S_{LX} \leq 4 \quad (2\text{-}3).$$

$L_X$ means an average center-to-center distance between particles of the inorganic particle part of the particles X as measured by observation of the surface of the first layer under a scanning electron microscope.

Figure 4:
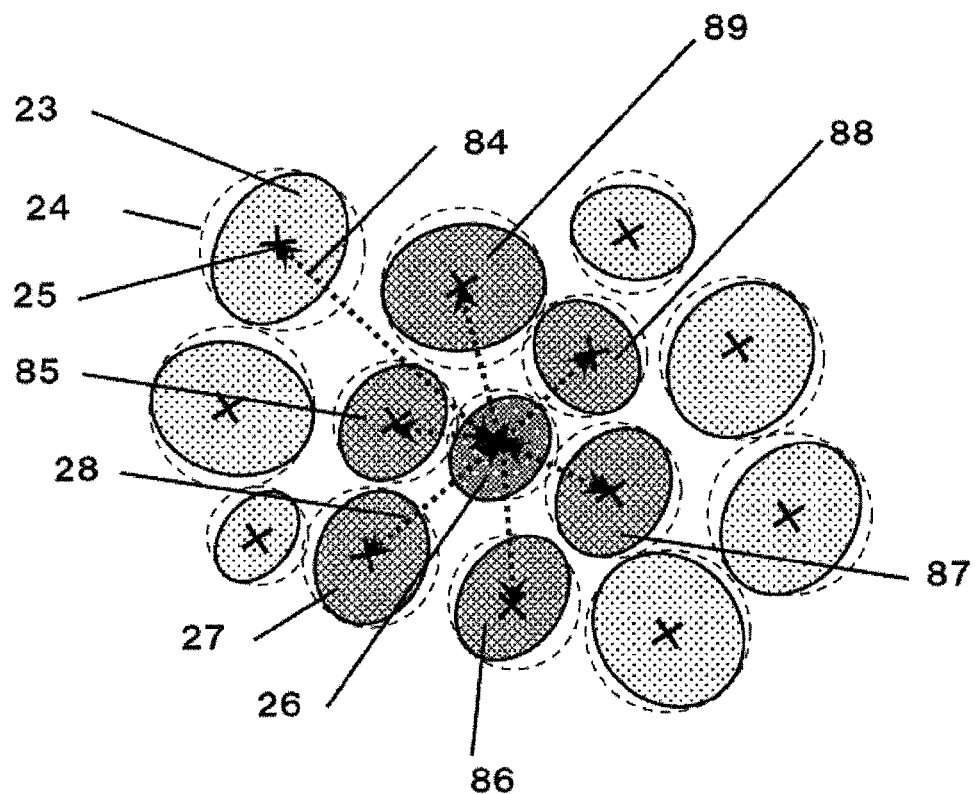
FIG. 4 is a drawing illustrating a center-to-center distance of the inorganic particle part of the particles X.

FIG. 4 shows a drawing illustrating the average center-to-center distance between particles of the inorganic particle part of the particles X. The center-to-center distance between particles is a distance (28) between the center of an inorganic particle part (26) of the particles X and the center of an adjacent inorganic particle part (27) of the particles X, and the average of these center-to-center distances is an average center-to-center distance between particles L. A specific calculation method will be described below.

$S_{LX}$ means a standard deviation of the average center-to-center distance between particles of the inorganic particle part of the particles X as measured by observation of the surface of the first layer under a scanning electron microscope. A specific calculation method will be described below.

The value of $S_{LX}$ may be as small as possible if it is a positive value, but practically, the lower limit is about 1. If it is larger than 7, the state of the presence of the particles A in a plane is ununiform, which causes reduction in adhesion of the conductive layer and increase of openings (defects).

The first problem and the second problem described above can be solved by satisfying Expression (1) and Expression (2). Although the reason why the first problem can be solved by satisfying Expression (1) and Expression (2) is not clear, it is considered that while the surface of the laminated body on the first layer side is covered uniformly in a plane by the inorganic particle part of the particles X, a fine and in-plane uniform uneven structure, i.e., the above-mentioned specific surface shape of the laminated body can be provided, and this uneven structure facilitates crystallization when a conductive layer is formed on the laminated body surface; thus, a high conductivity (low surface low efficiency) and a high light transmittance can be achieved even at a low annealing temperature.

Further, although the reason why the second problem described above can be solved is also not clear, it is considered that the above in-plane uniform uneven structure produces a micro-scattering effect at the interface with the conductive layer of the laminated body surface.

A method of observation under a scanning electron microscope and a specific method of measuring an average center-to-center distance between particles will be described below.

When the value of $L_X/D_X$ is less than 1.4, the inorganic particle part of the particles X is excessively filled in the first layer; as a result, openings where the inorganic particle part of the particles X is absent is partially formed on the outermost surface of the first layer, and an annealing temperature-lowering effect by conductive layer formation, which is due to the presence of the inorganic particle part of the particles X, can be insufficient. When the value of $L_X/D_X$ is larger than 3, adhesion of a conductive layer and an annealing temperature-lowering effect by conductive layer formation, which are due to the presence of the inorganic particle part of the particles X, can be insufficient.

To satisfy Expression (1) and Expression (2), in addition to using particles having an inorganic particle part with a number average particle diameter ($D_X$) of 5 nm to 25 nm as the particles X, using the coating composition of the second group described below and, furthermore, producing the laminated body by the production method of the third group are preferred.

Particles Y

The particles Y are particles having at least an inorganic particle part. Thus, the particles Y may be particles composed only of inorganic particle parts (what is called normal inorganic particles) or particles further having other parts (e.g., "inorganic particles coated with an organic compound," "inorganic particles having a part derived from a polymer" described below).

The inorganic particle part of the particles Y is preferably a different type of inorganic particles from the inorganic particle part of the particles X.

In this specification, "type" of inorganic particles of an inorganic particle part depends on the type of elements constituting the inorganic particles. For example, titanium oxide ($TiO_2$) and nitrogen-doped titanium oxide ($TiO_{2-x}N_x$) formed by replacing part of oxygen in titanium oxide with anion nitrogen are inorganic particles of different types since the elements constituting the inorganic particles are different. On the other hand, in the case of inorganic particles composed of the same elements, for example, only Zn and O (ZnO), even if several particles have different particle diameters or if the composition ratio of Zn to O are different, they are inorganic particles of the same type. Further, even if several Zn particles have different oxidation numbers, they are particles of the same type as long as the elements constituting the particles are the same (in this case, as long as elements other than Zn are all the same).

There is no limitation on the inorganic particle part of the particles Y, but it is preferably an oxide, nitride, boride, carbonate, and sulfate of a metal element or semimetal element, more preferably oxide particles of at least one element selected from the group consisting of Ga, Zr, Ti, Al, In, Zn, Sb, Sn, and Ce.

The inorganic particle part of the particles Y is preferably inorganic particles having a refractive index higher than that of the inorganic particle part of the particles X. The inorganic particle part of the particles Y is, specifically, at least one selected from zirconium oxide ($ZrO_2$), titanium oxide ($TiO_2$), aluminum oxide ($Al_2O_3$), indium oxide ($In_2O_3$), zinc oxide (ZnO), tin oxide ($SnO_2$), antimony oxide ($Sb_2O_3$), and indium tin oxide; a solid solution thereof and a solid solution where part of elements is substituted, part of elements is fitted into the interstice, or part of elements is deleted; or inorganic particles formed by blending inorganic particles of different types. The inorganic particle part of the particles Y is, particularly preferably, phosphorus-containing tin oxide (PTO), antimony-containing tin oxide (ATO), gallium-containing zinc oxide (GZO), titanium oxide ($TiO_2$), or zirconium oxide ($ZrO_2$).

The refractive index of the inorganic particle part of the particles Y is preferably 1.55 to 2.80, more preferably 1.58 to 2.50. When the refractive index of the inorganic particle part of the particles Y is less than 1.55, the second layer containing the particles Y of the resulting laminated body has a low refractive index, and the refractive index difference compared to the first layer containing the particles X is small; thus, the effect of reducing coloring of transmitted light and the effect of reducing patterning of a conductive layer are insufficient. When the refractive index of the inorganic particle part of the particles Y is more than 2.80, the refractive index difference compared to the conductive layer formed on the first layer and the refractive index difference between the second layer and the support substrate are large, and thus, again, the effect of reducing coloring of transmitted light and the effect of reducing patterning of a conductive layer are insufficient.

Further, when the inorganic particle part of the particles X is silica particles, the inorganic particle part of the particles Y is particularly preferably inorganic particles having a refractive index higher than that of the silica particles, and an inorganic compound having a number average particle diameter of 20 nm or less and a refractive index of 1.60 to 2.80 is preferably used as such inorganic particles having a high refractive index. Specific examples such inorganic compounds include antimony oxide, antimony-containing zinc oxide, antimony-containing tin oxide (ATO), phosphorus-containing tin oxide (PTO), gallium-containing zinc oxide (GZO), zirconium oxide ($ZrO_2$), and/or titanium oxide ($TiO_2$), and titanium oxide and zirconium oxide, which have a particularly high refractive index, are more preferred.

Further, there is no limitation on the particles Y contained in the second layer in the laminated body of the first group if they have at least an inorganic particle part, but the particles X are preferably particles A (particles derived from particles a) and/or particles a mentioned below.

In particular, as mentioned below, the laminated body of the first group is preferably obtained by the production method of the third group using the coating composition of the second group, that is, the particles Y are preferably particles B (particles derived from particles b) mentioned below.

Next, the first layer and the second layer of the laminated body will be described.

There are preferred ranges for the average thickness of the first layer and the second layer, and the average thickness of the first layer is preferably 20 nm to 40 nm, more preferably 15 nm to 38 nm, and particularly preferably 20 nm to 36 nm. The average thickness of the second layer is preferably 30 nm to 65 nm, more preferably 35 nm to 63 nm, and particularly preferably 40 nm to 60 nm.

When the thickness of the first layer is less than 20 nm or the thickness of the second layer is less than 30 nm, the effect of making a pattern of a conductive layer less visible can be insufficient when the laminated body is formed into a conductive laminated body. On the other hand, when the thickness of the first layer is more than 40 nm or the thickness of the second layer is more than 65 nm, the effect of preventing coloring of transmitted light of the laminated body can be insufficient.

When the average thickness of the first layer is 20 nm to 40 nm, the diameter of the particles is close to the thickness, and thus, a capillary force in the horizontal direction (the direction parallel to the surface direction of the layer) is likely to act on the particles. Consequently, a state where particles are excessively filled is likely to be formed in the first layer, and as a result, the value of $L_X/D_X$ can be less than 1.4. Therefore, when the average thickness of the first layer is 20 nm to 40 nm, it is particularly important to control the value of $L_X/D_X$ to be 1.4 or more.

In this regard, by using the coating composition of the second group described below, the value of $L_X/D_X$ can be controlled to be in the above preferred range even in a thin film with an average thickness of 20 nm to 40 nm.

Figure 5:
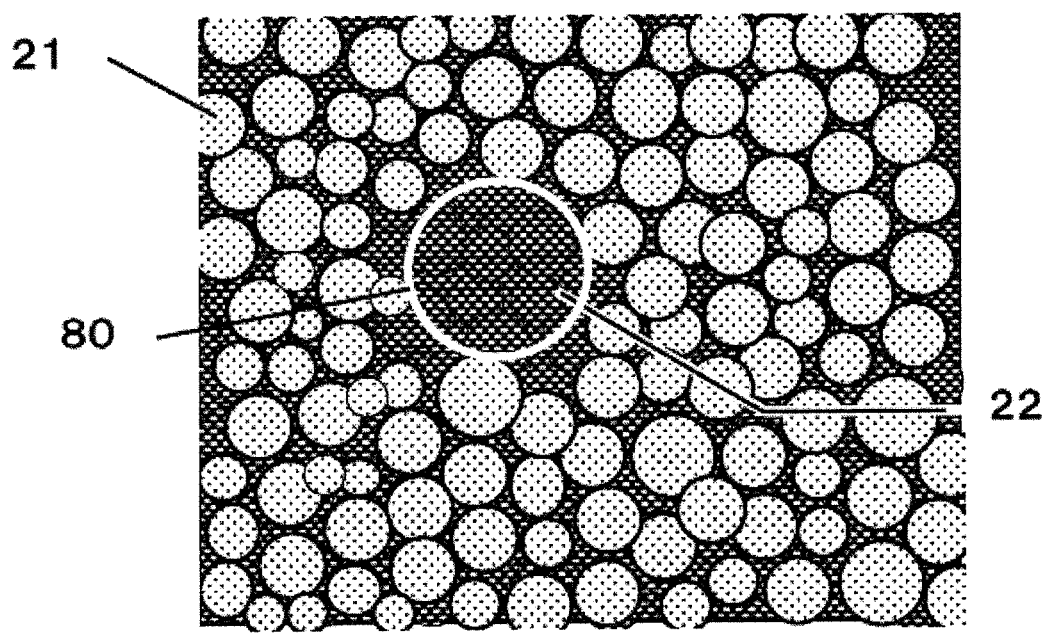
FIG. 5 is a drawing illustrating an opening.

Next, an example of an opening (22) present at the surface of the first layer is shown in FIG. 5. "Opening (defect)" as used herein means a part that looks like a dent where an inorganic particle part (21) of the particles X is absent when the surface of the first layer is observed under a scanning electron microscope, or a part in an image obtained using a scanning electron microscope where the concentration looks different because of the presence of inorganic particles having constituent elements different from those of the inorganic particle part of the particles X, and refers to a part where when the size of the part is represented by an inscribed circle (80), the diameter of the inscribed circle (inscribed diameter) is three times or more the number average particle diameter ($D_X$) of the inorganic particle part (21) of the particles X. In the laminated body, the number of openings having an inscribed diameter three times or more the $D_X$ is preferably not more than 5 per 4 $\mu m^2$, more preferably not more than 3, particularly preferably not more than 1, and most preferably 0. The measuring method using a scanning electron microscope in this measurement will be described below.

If the number of openings having an inscribed diameter three times or more the $D_X$ is more than 5 per 4 $\mu m^2$, reduction in the effect of preventing coloring of transmitted light and the effect of making a pattern of a conductive layer less visible, reduction in transparency, reduction in conductivity of a conductive layer (increase of surface resistance value) will be caused.

There is a preferred form for an interface formed by the first layer and the second layer of the laminated body, and it is preferable to satisfy Expression (3) and Expression (4) below:

$$0.3 \leq (A_{12}/D_X) \leq 1.1 \tag{3}$$

$$3 \leq (F_{12}/D_X) \leq 15 \tag{4}.$$

The laminated body more preferably satisfies Expression (3-2) and Expression (4-2), particularly preferably satisfies Expression (3-3) and Expression (4-3).

$$0.4 \leq (A_{12}/D_X) \leq 0.9 \tag{3-2}$$

$$4 \leq (F_{12}/D_X) \leq 13 \tag{4-2}$$

$$0.5 \leq (A_{12}/D_X) \leq 0.8 \tag{3-3}$$

$$5 \leq (F_{12}/D_X) \leq 11 \tag{4-3}$$

Figure 6:
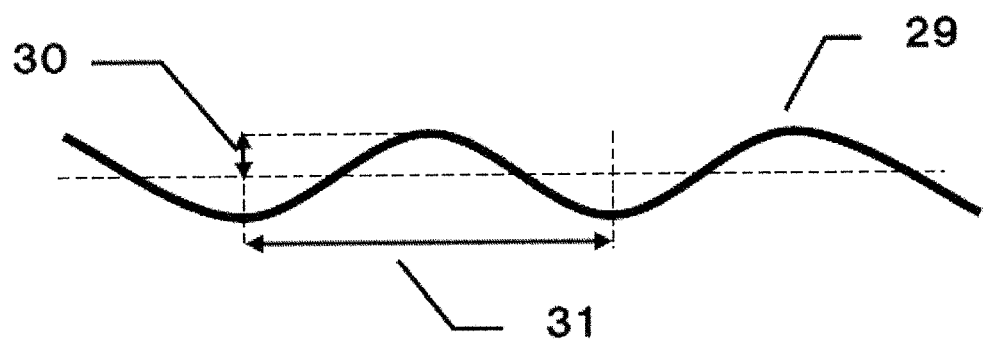
FIG. 6 is a drawing illustrating a contour curve, amplitude, and wavelength of an interface.

$A_{12}$ means an amplitude of a contour curve of the interface formed by the first layer and the second layer. $F_{12}$ means a wavelength of the contour curve of the interface formed by the first layer and the second layer. The contour curve of the interface means a boundary line between the first layer and the second layer of the laminated film of the laminated body. For the amplitude and the wavelength of the contour curve of the interface, the contour curve (29 in FIG. 6) is considered to be a waveform, and half of the magnitude of oscillation of the wave is defined as an amplitude (30 in FIG. 6), and the reciprocal of a cycle period (frequency) of the wave as a wavelength (31 in FIG. 6).

When the laminated body satisfies Expression (3) and Expression (4), the second problem mentioned above, in particular, observation angle dependence can be reduced. Although the reason why observation angle dependence can be reduced by satisfying Expression (3) and Expression (4) is not clear, it is considered that control of a refractive index-sloped region formed at the interface between the first layer and the second layer and control of the micro-scattering effect at the interface have an influence.

When $A_{12}/D_X$ is less than 0.3, a region where the particles X and the particles Y coexist in the thickness direction at the interface between the first layer and the second layer is small and, therefore, the refractive index-sloped region in the layer thickness direction is small, resulting in insufficient in-plane uniformity of the effect of making a pattern of a conductive layer less visible. When $F_{12}/D_X$ is less than 3, observation angle dependence of the effect of making a pattern of a conductive layer less visible is reduced. Further, when $A_{12}/D_X$ is more than 1.1 or when $F_{12}/D_X$ is more than 15, the laminated film has a low transmittance, leading to a low transmittance of the laminated body.

Figure 7:
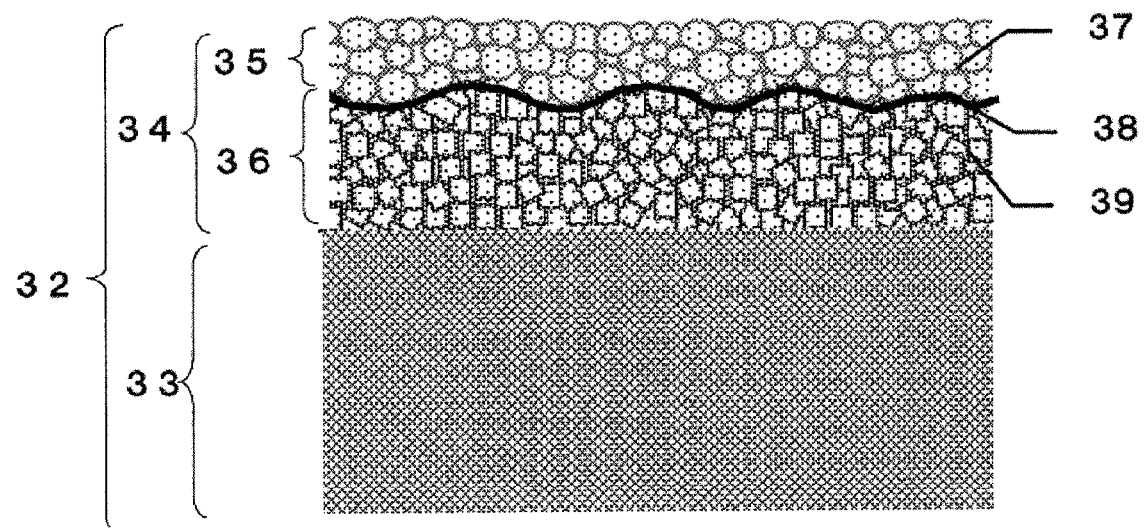
FIG. 7 is a configuration of an interface in one aspect of the preferred laminated body.
Figure 8:
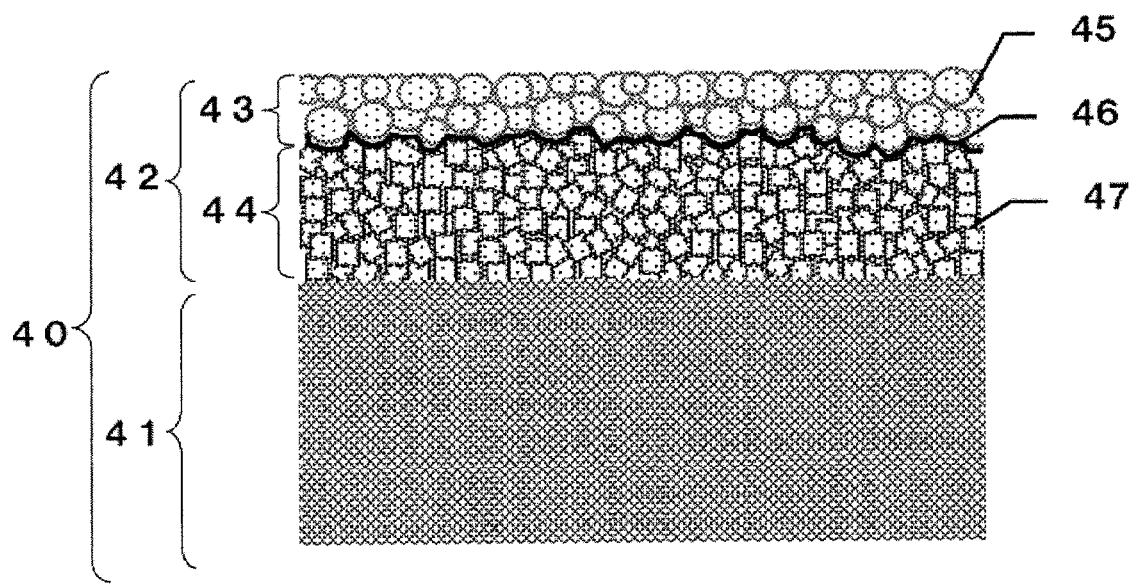
FIG. 8 is a configuration of an interface in one aspect of a laminated body of the prior art.
Figure 9:
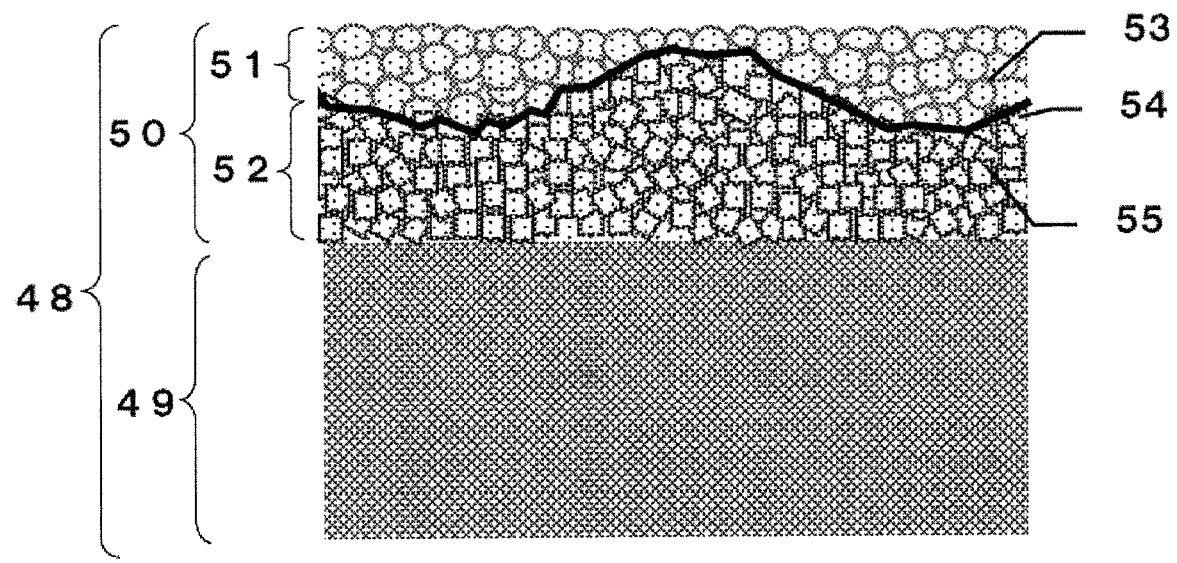
FIG. 9 is a configuration of an interface in one aspect of a laminated body of the prior art.

FIG. 7 shows a form of an interface in one aspect. A contour curve (38) of the interface formed by the first layer and the second layer, preferably, is not a straight line but forms a gentle undulation. FIG. 8 and FIG. 9 each shows a form of an interface in one aspect of a laminated body of the prior art. In FIG. 8, both the amplitude $A_{12}$ and the wavelength $F_{12}$ of a contour curve (46) of the interface formed by the first layer and the second layer are smaller than the preferred range, and in FIG. 9, both the amplitude $A_{12}$ and the wavelength $F_{12}$ of a contour curve (54) of the interface formed by the first layer and the second layer are larger than the preferred range.

There is a preferred range for the zeta potential at pH 10 of the surface of the first layer of the laminated body, and the zeta potential of the surface of the first layer is preferably −60 mV or less, particularly preferably −70 mV or less.

When the value of the zeta potential of the surface of the first layer is smaller than −60 mV, negatively-charged hydroxide ions in an alkaline solution are less likely to be attracted to the surface of the first layer, which can lead to improved alkali resistance. The value of the zeta potential of the surface of the first layer may be as small as possible, but in general, its lower limit is about −150 mV. When the value of the zeta potential of the surface of the first layer is larger than −60 mV, the alkaline solution easily permeates into the surface of the first layer, which may lead to poor alkaline resistance.

The zeta potential of the first layer surface of the laminated body is influenced by the zeta potential of the particles X contained in the first layer. Namely, for the zeta potential of the surface of the first layer to be −60 mV or less, it is preferable to select particles X whose zeta potential value is negative and small. The value of the zeta potential of the particles X is preferably 0 mV or less at pH 10, and the value is preferably as small as possible.

One method for the zeta potential of the surface of the first layer of the laminated body to be −60 mV or less is to use as the particles X particles whose inorganic particle part is titanium oxide (zeta potential: −20 mV) and particles whose inorganic particle part is zirconium oxide (zeta potential: −80 mV) in combination. Even when particles having an inorganic particle part like titanium oxide whose zeta potential value is not so small are used, if they are used in combination with particles having an inorganic particle part like zirconium oxide whose zeta potential value is very small, the zeta potential of the surface of the first layer can be −60 mV or less. This is because the zeta potential of the whole particles X can be represented by the sum of values obtained by multiplying the zeta potential of each particles by its volume ratio. In other words, by using several types of particles having different zeta potentials and adjusting their volume ratio, the zeta potential of the whole particles X and the zeta potential of the first layer surface each can be controlled to be a preferred value.

When the laminated body of the first group is produced using the coating composition of the second group described below, the zeta potential of the first layer surface of the laminated body is influenced by the zeta potential of the particles b in the coating composition used to form the laminated body. Thus, for the zeta potential of the surface of the first layer to be −60 mV or less, the coating composition preferably contains at least one type of particles b, and the coating composition may contain two or more types of particles b with different zeta potentials.

The value of the zeta potential of the first layer surface of the laminated body is decreased (tends to be −60 mV or less) by using particles b whose zeta potential value is negative and small, and is increased (tends to be larger than −60 mV) by using particles b whose zeta potential value is negative but not so small. In addition, the zeta potential of the first layer surface can be adjusted to be in a preferred range by mixing two or more types of particles b having different zeta potentials.

One method for the zeta potential of the surface of the first layer of the laminated body to be −60 mV or less is to use as the particles b in the coating composition, for example, titanium oxide (zeta potential: −20 mV) and zirconium oxide (zeta potential: −80 mV) in combination. Even when particles b like titanium oxide whose zeta potential value is negative and not so small are used, if they are mixed with particles b like zirconium oxide whose zeta potential value is negative and very small, since the zeta potential of the whole particles b is a value obtained by multiplying the zeta potential of each particles by its volume ratio, the zeta potential can be adjusted to be a preferred value by adjusting the volume ratio, and the zeta potential of the surface of the first layer of the laminated body produced using the coating composition can be adjusted to be a preferred value.

For the laminated body, it is important that the surface of the first layer have a specific surface shape (the specific surface shape meaning that Expression 1 and Expression 2 above are satisfied) as described above, and in addition, when the average thickness of the first layer and the second layer, the number of openings per unit area at the surface of the first layer, and the form (amplitude, wavelength) of the interface between the first layer and the second layer are specific ones, the effects can be further enhanced.

Method of Producing Laminated Body According to the First Group

The laminated body of the first group may be produced by any method, but the laminated body of the first group can be efficiently produced by using the coating composition of the second group described below.

Further, the laminated body of the first group can be more efficiently produced by the production method of the third group using the coating composition of the second group described below.

Second and Third Groups

The second group relates to a coating composition. It is important that the coating composition comprise a polymer having a part derived from a fluorine compound A (hereinafter referred to as a fluorine polymer A), particles having an inorganic particle part and a part derived from the fluorine polymer A (hereinafter referred to as particles a), particles having an inorganic particle part but not having a part derived from the fluorine polymer A (hereinafter referred to as particles b), a binder material, and an organic solvent.

In addition, it is important that the coating composition satisfy requirements 1 to 3 described below.

By using this coating composition, a laminated body having excellent properties (e.g., the laminated body of the first group) can be efficiently produced. In particular, by using the coating composition and by using the production method of the third group described below (production method comprising coating at least one surface of a support substrate in one step, followed by drying), a laminated body comprising a support substrate and a laminated film having the properties described above formed on the support substrate (laminated body of the first group) can be efficiently produced.

The third group relates to a method of producing the laminated body formed using the coating composition of the second group.

The method of producing a laminated body, the third group, is a method comprising applying the coating composition described above (coating composition of the second group) to at least one surface of the support substrate described above in one coating step, and then drying the coating composition to form a laminated film composed of two layers having different refractive indices. More particularly, it is a method of producing a laminated body comprising a first layer, a second layer, and a support substrate, the second layer and the first layer having different refractive indices and being laminated in this order on at least one surface of the support substrate, the first layer containing particles A, the second layer containing particles B, the method comprising applying the coating composition of the second group to at least one surface of the support substrate in one step, followed by drying (wherein the particles A are particles derived from the particles a, and the particles B are particles derived from the particles b).

Namely, by using the coating composition of the second group and the production method of the third group, although the number of coating steps is once, a laminated film having the first layer comprising the particles A or the particles a derived therefrom and the second layer comprising the particles B or the particles b derived therefrom can be formed on a support substrate.

The relationship between the particles a and the particles A, and the relationship between the particles b and the particles B will now be described.

The particles A contained in the first layer in the laminated body produced using the coating composition of the second group by the production method of the third group are particles derived from the particles a in the coating composition. In other words, when the particles a in the coating composition are applied to a support substrate and dried, the particles a react with the binder material and the fluorine polymer A contained in the coating composition to transform into the particles A. When particles that do not have a site reactive with the binder material or the fluorine polymer A are used as the particles a or the case where the particles a do not react with the binder material or the fluorine polymer A, the particles a and the particles A are completely the same. However, as described below, the particles a generally react with the binder material when dried on a support substrate since they have a part derived from the fluorine polymer A.

The particles B contained in the second layer in the laminated body produced using the coating composition of the second group by the production method of the third group are particles derived from the particles b in the coating composition. In other words, when the particles b in the coating composition are applied to a support substrate and dried, the particles b react with the binder material contained in the coating composition to transform into the particles B. When particles that do not have a site reactive with the binder material are used as the particles b or the case where the particles b do not react with the binder material, the particles b and the particles B are completely the same. However, as described below, the particles b generally do not react with the binder material when dried on a support substrate since they do not have a part derived from the fluorine polymer A.

Coating Composition Used for Second and Third Groups

Components of the coating composition used for the second and third groups will be described below in detail.

Fluorine Polymer A

The fluorine polymer A is a polymer comprising a part derived from a fluorine compound A and a part derived from a compound D described below. In other words, the fluorine polymer A is a polymer obtained by reacting the fluorine compound A and the compound D.

Further, to improve the alkali resistance of the laminated body formed using the coating composition, the fluorine polymer A is preferably a polymer further having a part derived from a compound E. In other words, a more preferred fluorine polymer A is a polymer obtained by reacting the fluorine compound A, the compound D, and the compound E, and such a fluorine polymer A is a polymer having a part derived from the fluorine compound A, a part derived from the compound D, and a part derived from the compound E.

Fluorine Compound A

The fluorine compound A will now be described. The fluorine compound A is a compound represented by Formula (1) below:

$$\text{Fluorine compound A: } R^1\text{—}R^2\text{—}R^{f1} \qquad (1).$$

$R^{f1}$ means at least one substituent group selected from the group consisting of fluoroalkyl, fluorooxyalkyl, fluoroalkenyl, fluoroalkanediyl, and fluorooxyalkanediyl. $R^1$ means a reactive site (reaction group). $R^2$ means any alkylene group with a carbon number of 1 to 9 or any alkylene ether group with a carbon number of 1 to 9. $R^{f1}$, $R^1$, and $R^2$ each may have a side chain in its structure.

Fluoroalkyl, fluorooxyalkyl, fluoroalkenyl, fluoroalkanediyl, and fluorooxyalkanediyl represented by $R^{f1}$ are substituent groups in which some or all hydrogen atoms of alkyl, oxyalkyl, alkenyl, alkanediyl, and oxyalkanediyl are replaced with fluorine, and they are all substituent groups composed mainly of fluorine atoms and carbon atoms. There may be branching in their structures, and a plurality of such portions may be connected to form a dimer, trimer, oligomer, or polymer structure.

The reactive site represented by $R^1$ refers to a site that reacts with other components upon receiving external energy such as heat or light. Examples of such reactive sites include, from the standpoint of reactivity, alkoxysilyl, silanol which is formed by hydrolysis of alkoxysilyls, carboxyl, hydroxyl, epoxy, vinyl, allyl, acryloyl, methacryloyl, acryloxy, and methacryloxy, and from the standpoint of reactivity and handleability, alkoxysilyl, silyl ether or silanol, epoxy, acryloyl, methacryloyl, acryloxy, and methacryloxy are preferred.

Specific examples of the fluorine compound A include 3,3,3-trifluoropropyltrimethoxysilane, 3,3,3-trifluoropropyltriethoxysilane, 3,3,3-trifluoropropyltriisopropoxysilane, 3,3,3-trifluoropropyltrichlorosilane, 3,3,3-trifluoropropyltriisocyanatesilane, 2-perfluorooctyltrimethoxysilane, 2-perfluorooctylethyltriethoxysilane, 2-perfluorooctylethyltriisopropoxysilane, 2-perfluorooctylethyltrichlorosilane, 2-perfluorooctylisocyanatesilane, 2,2,2-trifluoroethyl acrylate, 2,2,3,3,3-pentafluoropropyl acrylate, 2-perfluorobutylethyl acrylate, 3-perfluorobutyl-2-hydroxypropyl acrylate, 2-perfluorohexylethyl acrylate, 3-perfluorohexyl-2-hydroxypropyl acrylate, 2-perfluorooctylethyl acrylate, 3-perfluorooctyl-2-hydroxypropyl acrylate, 2-perfluorodecylethyl acrylate, 2-perfluoro-3-methylbutylethyl acrylate, 3-perfluoro-3-methoxybutyl-2-hydroxypropyl acrylate, 2-perfluoro-5-methylhexylethyl acrylate, 3-perfluoro-5-methylhexyl-2-hydroxypropyl acrylate, 2-perfluoro-7-methyloctyl-2-hydroxypropyl acrylate, tetrafluoropropyl acrylate, octafluoropentyl acrylate, dodecafluoroheptyl acrylate, hexadecafluorononyl acrylate, hexafluorobutyl acrylate, 2,2,2-trifluoroethyl methacrylate, 2,2,3,3,3-pentafluoropropyl methacrylate, 2-perfluorobutylethyl methacrylate, 3-perfluorobutyl-2-hydroxypropyl methacrylate, 2-perfluorooctylethyl methacrylate, 3-perfluorooctyl-2-hydroxypropyl methacrylate, 2-perfluorodecylethyl methacrylate, 2-perfluoro-3-methylbutylethyl methacrylate, 3-perfluoro-3-methylbutyl-2-hydroxypropyl methacrylate, 2-perfluoro-5-methylhexylethyl methacrylate, 3-perfluoro-5-methylhexyl-2-hydroxypropyl methacrylate, 2-perfluoro-7-methyloctyl ethyl methacrylate, 3-perfluoro-7-methyloctylethyl methacrylate, tetrafluoropropyl methacrylate, octafluoropentyl methacrylate, octafluoropentyl methacrylate, dodecafluoroheptyl methacrylate, hexadecafluorononyl methacrylate, 1-trifluoromethyltrifluoroethyl methacrylate, hexafluorobutyl methacrylate, and triacryloyl-heptadecafluorononenyl-pentaerythritol.

Further, the fluorine compound A, in terms of environmental impact (e.g., no possibility to generate PFOA described below after decomposition or metabolism in an environment), is preferably a compound represented by Formula (1) and also a compound represented by Formula (3):

$R^{f2}$—X—OCOCH=CH$_2$ (3).

$R^{f2}$ means any linear perfluoroalkyl group with a carbon number of 4 to 6. X means any alkylene group with a carbon number of 4 to 8. In the fluorine compound A represented by Formula (3), $R^{f2}$ is more preferably a linear perfluoroalkyl group with a carbon number of 6, and X is preferably a linear alkylene group with a carbon number of 6.

PFOA is an abbreviation of PerFluoroOctanoic Acid. Recent studies (EPA Report "PRELIMINARY RISK ASSESSMENT OF THE DEVELOPMENTAL TOXICITY ASSOCIATED WITH EXPOSURE TO PERFLUOROOCTANOIC ACID AND ITS SALTS" have clarified that this substance has a potential risk of environmental load, and EPA (U.S. Environmental Protection Agency) has announced on Apr. 14, 2003 that EPA intensifies scientific investigation.

On the other hand, Federal Register (FR Vol. 68, No. 73/Apr. 16, 2003 [FRL-2303-8]), EPA Environmental News FOR RELEASE: MONDAY Apr. 14, 2003 EPA INTENSIFIES SCIENTIFIC INVESTIGATION OF A CHEMICAL PROCESSING AID, and EPA OPPT FACT SHEET Apr. 14, 2003 have announced that "telomere" having a PerFluoroOctanoic portion may form PFOA after decomposition or metabolism, which means that the absence of "telomere" having a PerFluoroOctanoic portion is demanded in the use of a fluorine compound.

Specific examples of the fluorine compound A that satisfies both Formula (1) and Formula (3) include 4-perfluorobutyl-butyl acrylate, 4-perfluorohexyl-butyl acrylate, 6-perfluorobutyl-hexyl acrylate, 6-perfluorohexyl-hexyl acrylate, 8-perfluorobutyl-octyl acrylate, and 8-perfluorohexyl-octyl acrylate.

Compound D

The compound D will now be described. The compound D is a compound represented by Formula (2) mentioned above. In addition, the compound D refers to a compound that does not include $R^{f1}$ characteristic of the fluorine compound A and has at least a reactive site capable of reacting with the fluorine compound A and a site capable of reacting with particles such as silica particles ("Si—OR$^6$" in Formula (2)).

$R^3$—$R^4$—SiR$^5_{n1}$(OR$^6$)$_{3-n1}$ (2)

$R^3$ means a reactive site, and its definition is the same as that of $R^1$. $R^4$ means any alkylene group with a carbon number of 1 to 6 or any alkylene ether group with a carbon number of 1 to 6. $R^5$ and $R^6$ each represents hydrogen or any alkyl group with a carbon number of 1 to 4. n1 means an integer from 0 to 2.

Specific examples of the compound D include acryloxyethyltrimethoxysilane, acryl-oxypropyltrimethoxysilane, acryloxybutyltrimethoxysilane, acryloxypentyltrimethoxysilane, acryloxyhexyltrimethoxysilane, acryloxyheptyltrimethoxysilane, methacryloxyethyltrimethoxy-silane, methacryloxypropyltrimethoxysilane, methacryloxybutyltrimethoxysilane, methacryloxy-hexyltrimethoxysilane, methacryloxyheptyltrimethoxysilane, methacryloxypropylmethyldimethoxysilane, methacryloxypropylmethyldimethoxysilane, and compounds obtained by replacing methoxy groups in these compounds with other alkoxyl groups and hydroxyl groups.

Compound E

The compound E will now be described. The compound E is a compound represented by Formula (4), that is, a compound having a reactive site capable of reacting with the fluorine compound A and a reactive site capable of reacting with the compound D.

$(R^7)_{n2}$—$(R^8)_{n3}$ (4)

$R^7$ means a reactive site, and its definition is the same as that of $R^1$.

$R^8$ means any alkylene group with a carbon number of 1 to 6, any hydroxyalkyl group with a carbon number of 1 to 6, any alkoxy group with a carbon number of 1 to 6, any alkylene ether group with a carbon number of 1 to 3, any polyhydric alcohol derivative with a carbon number of 1 to 5, any carboxylic acid derivative with a carbon number of 1 to 12, any amide derivative with a carbon number of 1 to 6, or a bisphenol derivative. n2 means an integer from 1 to 3, and n3 means an integer from 1 to 10.

Specific examples of the compound E include pentaerythritol (mono-, di-, tri-)(meth)acrylate, dipentaerythritol (mono-, di-, tri-)(meth)acrylate, trimethylolpropane (mono-, di-, tri-)(meth)acrylate, neopentyl glycol di(meth)acrylate polypropylene glycol (mono-, di-)(meth)acrylate, polyethylene glycol (mono-, di-)(meth)acrylate, 2-hydroxyethyl (meth)acrylate, 2-hydroxypropyl (meth)acrylate, 2-hydroxybutyl (meth)acrylate, acryloylmorpholine, dimethylacrylamide, hydroxyethylacrylamide, diethylacrylamide, modified bisphenol A (F) di(meth)acrylate, 2-(meth)acryloyloxyethyl-succinic acid, 2-acryloyloxyethylhexahydrophthalic acid, 2-acryloyloxyethylphthalic acid, 2-acryloyloxyethyl-2-hydroxyethylphthalic acid, δ-valerolactone (meth)acrylate, γ-butyrolactone (meth)acrylate, and β-propiolactone (meth)acrylate.

As described below, the laminated body of the first group to the third group can provide a conductive laminated body described below by forming a conductive layer on the first layer of the laminated body. This conductive laminated body is used for various applications, and in many applications, it is necessary to perform patterning by which the conductive layer is processed into a desired shape. In general, patterning of a conductive layer is carried out by etching the conductive layer uniformly formed on a first layer of a conductive laminated body to remove unwanted parts of the conductive layer.

In the etching process, alkaline solution is often used, and therefore during the process, the surface of the laminated body is exposed to the alkaline solution when unwanted parts of the conductive layer is removed. Thus, the laminated body is preferably sufficiently alkali-resistant.

On the other hand, the coating composition contains the fluorine polymer A and the particles a as described above, and therefore the laminated body formed by the production method using the coating composition forms a layer in which the fluorine polymer A and the particles A are uniformly dispersed in the first layer, and provides a robust laminated body. Consequently, required alkali resistance can be achieved, but to address an advanced etching process, even higher alkali resistance may be demanded. Thus, in the coating composition, the fluorine polymer A is preferably a polymer further having a part derived from the compound E.

The compound E preferably has an alkaline buffering capacity as defined below of 2 ml or more. Alkaline buffering capacity herein means the amount (ml) of NaOH (0.1 mol/l) required to adjust the pH of 100 g of a 5% by mass solution of the compound E in a mixed solution of isopropyl alcohol and $H_2O$ at a ratio of 9:1 (by mass), as measured at 25° C. by the pH measuring method using a glass electrode described in JIS Z8802 (2011), to pH 9. The compound E preferably has an alkaline buffering capacity of 2 ml or more, particularly preferably 3 ml or more. The alkaline buffering capacity of the compound E may be as high as possible if it is 2 ml or more, but the upper limit is typically about 50 ml. When the alkaline buffering capacity of the compound E is 2 ml or more, an alkaline buffering capacity can be imparted to the laminated body formed using the coating composition formed from the coating composition containing the fluorine polymer A having a part derived from the compound E, which results in improved alkali resistance of the laminated body.

$R^8$ in above Formula (4) of the compound E is preferably any carboxylic acid derivative with a carbon number of 1 to 12, particularly preferably a lactone ring. The lactone ring is a cyclic ester formed by dehydration condensation between a carboxyl group and a hydroxyl group in hydroxy acid molecule. The lactone ring opens in the presence of alkali to become hydroxy acid. Thus, when $R^8$ of the compound E is a lactone ring, a high alkaline buffering capacity is exhibited due to the alkali consumption upon ring-opening and the function of hydroxy acid.

Specific examples of the compound E with an alkaline buffering capacity of 2 ml or more include pentaerythritol (mono-, di-, tri-)(meth)acrylate, 2-hydroxyethyl (meth)acrylate, 2-hydroxypropyl (meth)acrylate, 2-hydroxybutyl (meth)acrylate, 2-(meth)acryloyloxyethylsuccinic acid, 2-acryloyloxyethylhexahydrophthalic acid, 2-acryloyloxyethylphthalic acid, 2-acryloyloxyethyl-2-hydroxyethylphthalic acid, δ-valerolactone (meth)acrylate, γ-butyrolactone (meth)acrylate, and β-propiolactone (meth)acrylate, and more preferred specific examples of the compound E include δ-valerolactone (meth)acrylate, γ-butyrolactone (meth)acrylate, and β-propiolactone (meth)acrylate.

Particles a and Particles A

The particles a are particles having an inorganic particle part and a part derived from the fluorine polymer A. Preferred examples of the inorganic particle part of the particles a include oxides, nitrides, borides, fluorides, carbonates, and sulfates of a semimetal element or metal element selected from Si, Na, K, Ca, Mg, and Al. Silica particles ($SiO_2$), alkali metal fluorides (e.g., NaF, KF, $NaAlF_6$), and alkaline earth metal fluorides (e.g., $CaF_2$, $MgF_2$) are more preferred, and silica particles are particularly preferred in terms of durability, refractive index, cost, and the like.

"Silica particles" refers to particles containing a composition comprising either a silicon compound or a polymer (condensate) of an inorganic/organic silicon compound, and is a general term of particles derived, for example, from silicon oxides such as $SiO_2$. There is no limitation on the shape suitable for the inorganic particle part of the particles a, but a shape close to a sphere is more preferred to form the surface shape because the filled state of the first layer of the particles A (the particles X in the first group) has influence on the surface shape of a laminated body.

The particles a and the fluorine polymer A in the coating composition will now be described. It is important that the particles a have not only an inorganic particle part but also a part derived from the fluorine polymer A. Thus, the particles a can be obtained by introducing a part derived from the fluorine polymer A into the inorganic particles described above, in particular, inorganic particles such as silica, for example, by reaction with the fluorine polymer A.

"Introduced" herein refers to a state where a part derived from the fluorine polymer A is chemically bonded (including covalent bonding, hydrogen bonding, ionic bonding, van der Waals bonding, hydrophobic bonding, and the like) or adsorbed (including physical adsorption and chemical adsorption) to an inorganic particle part, and in particular, covalent bonding is preferred.

The particles A means particles derived from the particles a and, thus, the description of the particles a applies also to the particles A unless otherwise specified.

Method of Producing Fluorine Polymer A, and Method of Producing Particles a

A method of producing a fluorine polymer A, and a method of producing particles a by reacting the fluorine polymer A with inorganic particles will now be described.

The method of producing a fluorine polymer A and the method of producing particles a may be, but are not limited to, a method 1) or 2) below, or a combination of these methods.

1) A fluorine compound A and a compound D are polymerized to prepare a fluorine polymer A, and the fluorine polymer A is reacted with inorganic particles to obtain particles a.
2) A fluorine compound A and a compound D are polymerized in the presence of inorganic particles to produce a fluorine polymer A, and simultaneously with the polymerization of the fluorine polymer A, a part of the fluorine polymer A is reacted with the inorganic particles to obtain particles a.

In 1), a reactive site of the fluorine compound A and a reactive site of the compound D are polymerized by a method suitable for the structure of each reactive site. For example, when the reactive site of the fluorine compound A and the reactive site of the compound D are both (meth)acrylate, radical addition polymerization is performed using a radical polymerization initiator, and when the reactive site of the fluorine compound A and the reactive site of the compound D are both alkoxysilyl, silanol condensation reaction is performed using acid catalyst or alkaline catalyst. The fluorine polymer A is then introduced into inorganic particles. Specifically, using a site capable of reacting with the particles (i.e., "Si—$OR^6$" in Formula (2)) in the part derived from the compound D in the fluorine polymer A, the fluorine polymer A is introduced onto the surface of the particles, optionally with addition of a catalyst or optionally using a process such as mechanical dispersion as required.

In 2), it is necessary to polymerize the fluorine compound A and the compound D in the presence of inorganic particles, and they may be added in any order. In other words, inorganic particles and the compound D may be reacted before adding the fluorine compound A, or the fluorine compound A and the compound D may be reacted while being reacted with inorganic particles.

A more preferred method of producing a fluorine polymer A and a more preferred method of producing particles a is, for example, a method 3) or 4) below, or a combination of these methods.

3) A fluorine compound A, a compound D, and a compound E are polymerized to prepare a fluorine polymer A, and the fluorine polymer A is reacted with inorganic particles to obtain particles a.

4) A fluorine compound A, a compound D, and a compound E are polymerized in the presence of inorganic particles to produce a fluorine polymer A, and simultaneously with the polymerization of the fluorine polymer A, a part of the fluorine polymer A is reacted with the inorganic particles to produce particles a.

In 3), a reactive site of the fluorine compound A, a reactive site of the compound D, and a reactive site of the compound E are polymerized by a method suitable for the structure of each reactive site. For example, when the reactive site of the fluorine compound A, the reactive site of the compound D, and the reactive site of the compound E are all (meth)acrylate, a method in which a radical polymerization initiator is used to carry out radical addition polymerization can be used. When the reactive site of the fluorine compound A, the reactive site of the compound D, and the reactive site of the compound E are all alkoxysilyl, a method in which acid catalyst or alkaline catalyst is used to carry out silanol condensation reaction can be used. Further, the fluorine compound A, the compound D, and the compound E may be reacted simultaneously, or any two compounds may be reacted first, followed by reaction with the other compound. Furthermore, even when the reactive site of the fluorine compound A, the reactive site of the compound D, and the reactive site of the compound E are not all the same, they may be reacted simultaneously, or any two compounds may be reacted first, followed by reaction with the other compound, by a method suitable for the structure of each reactive site.

The fluorine polymer A is then introduced into inorganic particles. Specifically, using a site capable of reacting with the particles (i.e., "Si—OR$^6$" in Formula (2)) in the part derived from the compound D in the fluorine polymer A, the fluorine polymer A is introduced onto the surface of the particles, optionally with addition of a catalyst or optionally using a process such as mechanical dispersion as required.

In 4), it is necessary to polymerize the fluorine compound A, the compound D, and the compound E in the presence of inorganic particles, and they may be added in any order. In other words, inorganic particles and the compound D may be reacted before adding the fluorine compound A and the compound E, or the fluorine compound A, the compound D, and the compound E may be reacted while being reacted with inorganic particles.

Particles b and Particles B

The inorganic particle part of the particles b is preferably a different type of inorganic particles from the inorganic particle part of the particles a. There is no limitation on the inorganic particle part of the particles b, but it is preferably an oxide, nitride, boride, carbonate, and sulfate of a metal element or semimetal element, more preferably oxide particles of at least one element selected from the group consisting of Ga, Zr, Ti, Al, In, Zn, Sb, Sn, and Ce.

The inorganic particle part of the particles b is preferably inorganic particles having a refractive index higher than that of the inorganic particle part of the particles a. The inorganic particle part of the particles b is, specifically, at least one selected from zirconium oxide ($ZrO_2$), titanium oxide ($TiO_2$), aluminum oxide ($Al_2O_3$), indium oxide ($In_2O_3$), zinc oxide (ZnO), tin oxide ($SnO_2$), antimony oxide ($Sb_2O_3$), and indium tin oxide; a solid solution thereof and a solid solution where part of elements is substituted, part of elements is fitted into the interstice, or part of elements is deleted; or inorganic particles formed by blending inorganic particles of different types. The particles b is, particularly preferably, phosphorus-containing tin oxide (PTO), antimony-containing tin oxide (ATO), gallium-containing zinc oxide (GZO), titanium oxide ($TiO_2$), or zirconium oxide ($ZrO_2$).

The refractive index of the inorganic particle part of the particles b is preferably 1.55 to 2.80, more preferably 1.58 to 2.50. When the refractive index of the inorganic particle part of the particles b is less than 1.55, the second layer containing the particles B (the particles Y in first group) of the resulting laminated body has a low refractive index, and the refractive index difference compared to the first layer containing the particles X or the particles A is small; thus, the effect of reducing coloring of transmitted light and the effect of reducing patterning of a conductive layer are insufficient. When the refractive index of the inorganic particle part of the particles b is more than 2.80, the refractive index difference compared to the conductive layer formed on the first layer and the refractive index difference between the second layer and the support substrate are large, and thus, again, the effect of reducing coloring of transmitted light and the effect of reducing patterning of a conductive layer are insufficient.

Further, in the laminated body produced by the production method, when the inorganic particle part of the particles a is silica particles, the inorganic particle part of the particles b is particularly preferably inorganic particles having a refractive index higher than that of the silica particles, and an inorganic compound having a number average particle diameter of 20 nm or less and a refractive index of 1.60 to 2.80 is preferably used as such inorganic particles having a high refractive index. Specific examples such inorganic compounds include antimony oxide, antimony-containing zinc oxide, antimony-containing tin oxide (ATO), phosphorus-containing tin oxide (PTO), gallium-containing zinc oxide (GZO), zirconium oxide ($ZrO_2$), and/or titanium oxide ($TiO_2$), and titanium oxide and zirconium oxide, which have a particularly high refractive index, are more preferred.

The particles B means particles derived from the particles b and, thus, the description of the particles b applies also to particles B unless otherwise specified. For example, the inorganic particle part of the particles B is preferably a different type of inorganic particles from the inorganic particles of the particles A, and the inorganic particle part of the particles B is preferably inorganic particles having a refractive index higher than that of the inorganic particle part of the particles A.

Binder Material

It is necessary for the coating composition to contain a binder material. In this specification, binders contained in the coating composition are expressed as a "binder material," and binders contained in the laminated film of the laminated body as a "binder," but a binder material is present as it is as a binder in some cases (that is, aspects where a binder material of the coating composition is present as it is as a binder in the laminated film are included).

The binder material may be any material, but from the standpoint of processability, it is preferably a binder material that can be cured, for example, by heat and/or active energy ray. One binder material may be used alone, or two or more binder materials may be used in combination. To hold particles in the film, preferred is a binder material having in its molecule the reactive site mentioned above, that is, alkoxysilyl, silanol which is formed by hydrolysis of alkoxysilyls, carboxyl, hydroxyl, epoxy, vinyl, allyl, acryloyl, methacryloyl, acryloxy, or methacryloxy.

It is preferable to use polyfunctional (meth)acrylate as a component of such a binder material, and representative examples are listed below. Polyfunctional acrylate having at least 3 (more preferably 4 to 6) (meth)acryloxy groups in one molecule, and modified polymers and oligomers thereof can be used. Specific examples include pentaerythritol tri(meth)acrylate, pentaerythritol tetra(meth)acrylate, dipentaerythritol tri(meth)acrylate, dipentaerythritol tetra(meth)acrylate, dipentaerythritol penta(meth)acrylate, dipentaerythritol hexa(meth)acrylate, trimethylolpropane tri(meth)acrylate, and pentaerythritol triacrylate hexanemethylene diisocyanate urethane polymer. These monomers can be used alone or in combination of two or more thereof. Examples of commercially available polyfunctional acrylic compositions include "Diabeam" (trade name) series and the like from Mitsubishi Rayon Co., Ltd., "Denacol" (trade name) series and the like from Nagase & Co., Ltd., "NK ester" (trade name) series and the like from Shin-Nakamura Chemical Co., Ltd., "UNIDIC" (trade name) and the like from DIC Corporation, "Aronix" series and the like from Toagosei Co., Ltd., "Blemmer" series and the like from NOF Corporation., "KAYARAD" (trade name) series and the like from Nippon Kayaku Co., Ltd., and "Light Ester" (trade name) series and the like from Kyoeisha Chemical Co., Ltd., and these products can be used.

Organic Solvent

It is necessary for the coating composition to contain an organic solvent in addition to the fluorine polymer A, the particles a, the particles b, and the binder material mentioned above. The use of an organic solvent is preferred because it provides good properties: it provides appropriate liquidity in a coating step to achieve uniform thickness of a coating film, and ensures the mobility of the particles to improve surface migration properties.

The organic solvent may be any solvent as long as the fluorine polymer A, the particles a, the particles b, and the binder material are uniformly dissolved or dispersed, but in general, an organic solvent having a boiling point at normal pressure of 250° C. or lower is preferred. Specifically, alcohols, ketones, ethers, esters, hydrocarbons, amides, fluorine-containing compounds, and the like are used. These can be used alone or in combination of two or more thereof.

Examples of alcohols include methanol, ethanol, isopropyl alcohol, isobutanol, n-butanol, tert-butanol, ethoxy ethanol, butoxy ethanol, diethylene glycol monoethyl ether, benzyl alcohol, and phenethyl alcohol. Examples of ketones include acetone, methyl ethyl ketone, methyl isobutyl ketone, and cyclohexanone. Examples of ethers include ethylene glycol monoethyl ether, ethylene glycol monobutyl ether, and propylene glycol monoethyl ether acetate. Examples of esters include ethyl acetate, butyl acetate, ethyl lactate, methyl acetoacetate, and ethyl acetoacetate. Examples of aromatics include toluene and xylenes. Examples of amides include N,N-dimethylformamide, N,N-dimethylacetamide, and N-methylpyrrolidone.

In addition, it is important for the coating composition to satisfy all of the following Requirements 1 to 3.

(Requirement 1): The mass ratio of the total of the part derived from the fluorine polymer A in the particles a, the fluorine compound A, and the fluorine polymer A to the binder material is 25:75 to 55:45.

For the requirement 1, the coating composition may or may not contain the fluorine compound A, but from the standpoint of leveling of a coating film, the coating composition preferably contains the fluorine compound A.

The mass ratio in the requirement 1 of the total of the part derived from the fluorine polymer A in the particles a, the fluorine compound A, and the fluorine polymer A to the binder material is preferably 28:72 to 53:47, more preferably 30:70 to 51:49. When the total of the part derived from the fluorine polymer A in the particles a, the fluorine compound A, and the fluorine polymer A is less than 25, a phenomenon where the particles a migrate spontaneously to the surface side during a drying step (hereinafter referred to as surface migration properties) may not occur sufficiently since the amounts of components compatible with the particles a is small. When the total of the part derived from the fluorine polymer A in the particles a, the fluorine compound A, and the fluorine polymer A is more than 55, formation of a uniform film may not be sufficient because of cohesion among the parts derived from the fluorine compound A.

(Requirement 2): The mass ratio of the total of the fluorine polymer A and the part derived from the fluorine polymer A in the particles a to the part derived from the fluorine polymer A in the particles a is 10:90 to 87:13.

The mass ratio in the requirement 2 of the total of the fluorine polymer A and the part derived from the fluorine polymer A in the particles a to the part derived from the fluorine polymer A in the particles a is preferably 12:88 to 85:15, more preferably 15:85 to 80:20. For the requirement 2, when the ratio of the part derived from the fluorine polymer A in the particles a is less than 13, or when the ratio of the part derived from the fluorine polymer A in the particles a is more than 90, the surface migration properties may be reduced, and formation of a uniform film may not be sufficient.

(Requirement 3): The mass ratio of the total of the fluorine polymer A and the part derived from the fluorine polymer A in the particles a to the part derived from the fluorine compound A in the fluorine polymer A is 20:80 to 92:8.

The mass ratio in the requirement 3 of the total of the fluorine polymer A and the part derived from the fluorine polymer A in the particles a to the part derived from the fluorine compound A in the fluorine polymer A is preferably 25:75 to 85:15, more preferably 30:70 to 82:18. When the ratio of the part derived from the fluorine compound A in the fluorine polymer A is less than 8, the surface migration properties may be reduced. When the ratio of the part derived from the fluorine compound A in the fluorine polymer A is more than 80, the amount of the fluorine compound A introduced into the particles a is excessive, which may cause cohesion among the fluorine compounds, and formation of a uniform film may not be sufficient.

In (Requirement 1) to (Requirement 3) above, "the part derived from the fluorine polymer A in the particles a" means a part derived from the fluorine polymer A in the particles a contained in the coating composition.

"The fluorine compound A" means a fluorine compound A present free in the coating composition.

"The fluorine polymer A" means a fluorine polymer A present free in the coating composition.

"The fluorine compound A in the fluorine polymer A" means the total of the part derived from the fluorine compound A in "the fluorine polymer A" (fluorine polymer A present free in the coating composition) and the part derived from the fluorine compound A in "the part derived from the fluorine polymer A in the particles a" (part derived from the fluorine polymer A in the particles a contained in the coating composition).

For the mass of the fluorine compound A and the fluorine polymer A, the mass of the fluorine compound A can be determined from the amounts of components loaded when preparing the coating composition, or by separating the particles a and the particles b by centrifugation or the like from a mixed solution containing the particles a and the fluorine polymer A, which is an intermediate material in the preparation of the coating composition, or from the coating composition, and analyzing liquid components by gas chromatography. The mass of the fluorine polymer A can be determined by further performing gravimetric analysis or gel permeation chromatography (GPC).

In other words, the mass of the fluorine compound A can be determined by any of the following methods:

A method of determining the mass of the fluorine compound A from the amounts of components loaded when preparing the coating composition;

A method of determining the mass of the fluorine compound A by separating the particles a by centrifugation or the like from a mixed solution containing the particles a and the fluorine polymer A, which is an intermediate material in the preparation of the coating composition, and analyzing liquid components by gas chromatography; and A method of determining the mass of the fluorine compound A by separating the particles a and the particles b from the coating composition by centrifugation or the like, and analyzing liquid components by gas chromatography.

The mass of the fluorine polymer A can be determined by any of the following methods:

A method of determining the mass of the fluorine polymer A by separating the particles a by centrifugation or the like from a mixed solution containing the particles a and the fluorine polymer A, which is an intermediate material in the preparation of the coating composition, performing gravimetric analysis of liquid components or gel permeation chromatography (GPC): and A method of determining the mass of the fluorine polymer A by separating the particles a and the particles b from the coating composition by centrifugation or the like, and performing gravimetric analysis of liquid components or gel permeation chromatography (GPC).

Further, the mass of the part derived from the fluorine polymer A in the particles a can be determined by the following method:

The mass of the part derived from the fluorine polymer A can be calculated by separating the particles a by centrifugation or the like from a mixed solution containing the particles a and the fluorine polymer A, which is an intermediate material in the preparation of the coating composition, and determining the concentration of the elements constituting the resulting particles a by X-ray fluorescence analysis (XRF).

It is important for the fluorine polymer A in the coating composition and the part derived from the fluorine polymer A in the particles a to satisfy the above-described requirements for the fluorine polymer A, i.e., to be a polymer having at least the part derived from the fluorine compound A and the part derived from the compound D in the fluorine polymer A.

In addition, the fluorine polymer A in the coating composition and the particles a (the part derived from the fluorine polymer A of the particles a) in the coating composition are preferably produced using the same fluorine compound A (same in terms of molecular structure). In other words, the fluorine polymer A in the coating composition and the particles a (the part derived from the fluorine polymer A of the particles a) in the coating composition preferably have a part derived from the same fluorine compound A (same in terms of molecular structure).

However, although the fluorine polymer A in the coating composition and the fluorine polymer A used to produce the particles a in the coating composition are preferably produced using the same fluorine compound A (same in terms of molecular structure), the amount of the part derived from the fluorine compound A in each fluorine polymer A is not critical. Thus, the fluorine polymer A in the coating composition and the fluorine polymer A used to produce the particles a in the coating composition must not necessarily have the same number average molecular weight, weight average molecular weight, or molecular weight distribution, and can be selected arbitrarily.

The number average molecular weight of the fluorine polymer A is preferably 5,000 to 20,000, more preferably 6,000 to 18,000, and particularly preferably 8,000 to 17,000. When the number average molecular weight of the fluorine polymer A is more than 20,000, the fluorine polymer A becomes bulky, and as a result, reactivity between the fluorine polymer A and inorganic particles may decrease when the particles a are produced by introducing a part of the fluorine polymer A into the inorganic particles, resulting in poor surface migration properties. Further, decreased solubility due to the high number average molecular weight of the fluorine polymer A topically causes a part with a low surface free energy, resulting in an increase in the number of openings. When the number average molecular weight is less than 5,000, the surface migration properties can be poor because the amount of the part derived from the fluorine compound A introduced into inorganic particles is small (i.e., because the amount of the part derived from the fluorine polymer in the particles a is small).

The zeta potential of the whole particles b in the coating composition is preferably −60 mV or less, particularly preferably −70 mV or less. The value of the zeta potential at pH 10 of the first layer surface of the laminated body produced by using the coating composition wherein the zeta potential of the whole particles b is −60 my or less is negative and small, and thus can be controlled to be −60 my or less; as a result, negatively-charged hydroxide ions in an alkaline solution are less likely to be attracted to the surface of the first layer, which can lead to improved alkali resistance.

Namely, that is because by using the coating composition wherein the zeta potential of the whole particles b is −60 mV or less, the value of the zeta potential at pH 10 of the first layer surface of the laminated body can be a negative and small value. In other words, by using the coating composition wherein the zeta potential of the whole particles b is −60 mV or less, the value of the zeta potential at pH 10 of the first layer surface of the laminated body can be easily controlled to be −60 mV or less.

When the value of the zeta potential at pH 10 of the first layer surface of the laminated body is −60 mV or less, alkali resistance of the laminated body can be improved. This is because, as described above, when the value of the zeta potential at pH 10 of the first layer surface is −60 mV or less, negatively-charged hydroxide ions existing in an alkaline solution may be less likely to be attracted to the surface of the first layer of the laminated body.

The value of the zeta potential of the whole particles b may be negative and as small as possible, but in general, its lower limit is about −150 mV. When the value of the zeta potential of the whole particles b is larger than −60 mV, the alkaline solution easily permeates into the surface of the first layer, which may lead to poor alkaline resistance.

The coating composition preferably contains at least one type of particles b, and two types of particles b with different zeta potentials may be used in combination. When one type of particles b is used in the coating composition, the zeta potential of the particles b is used as the zeta potential of the whole particles b. When two or more types of particles b are used in combination in the coating composition, the value obtained by multiplying the data potential of each of the two or more types of particles b by its volume ratio is used as the zeta potential of the whole particles b.

Specific examples of the particles b with different zeta potentials include titanium oxide (zeta potential: −20 mV) and zirconium oxide (zeta potential: −80 mV). Even when particles like titanium oxide whose zeta potential value is negative and not so small are used, if they are mixed with particles like zirconium oxide whose zeta potential value is negative and very small, the zeta potential can be adjusted to be a preferred value by adjusting the volume ratio. This is because, as described above, the zeta potential of the whole particles b is a value obtained by multiplying the zeta potential of each particles by its volume ratio. A method of measuring the zeta potential of the particles b and the whole particles b will be described below.

Content of Components in Coating Composition

In the coating composition, particles a/particles b (mass ratio) is preferably 1/30 to 1/1. When particles a/particles b is 1/30 to 1/1, the ratio of the thickness of the first layer to the thickness of the second layer of the resulting laminated body can be fixed. Thus, it is easy to adjust the thicknesses of the first layer and the second layer simultaneously to a desired thickness by application in one coating step, which is preferred.

Particles a/particles b (mass ratio) is preferably 1/28 to 1/1, more preferably 1/26 to 1/2, and particularly preferably 1/23 to 1/3.

Preferred is an aspect in which the content of the particles a is 0.03% by mass to 26.3% by mass; the content of the particles b is 0.06% by mass to 57.5% by mass; the content of the fluorine polymer A is 0.003% by mass to 27.2% by mass; the content of the binder material is 0.02% by mass to 43.2% by mass: the content of the organic solvent is 40% by mass to 98% by mass; and the content of other components such as initiators, curing agents, and catalysts is 0.1% by mass to 20% by mass, based on 100% by mass the coating composition. More preferred is an aspect in which the content of the particles a is 0.04% by mass to 14% by mass; the content of the particles b is 0.18% by mass to 56.8% by mass; the content of the fluorine polymer A is 0.004% by mass to 24.0% by mass; the content of the binder material is 0.02% by mass to 40.6% by mass: the content of the organic solvent is 40% by mass to 98% by mass; and the content of other components such as initiators, curing agents, and catalysts is 1% by mass to 15% by mass, based on 100% by mass the coating composition.

Other Components in Coating Composition

The coating composition preferably further comprises a polymerization initiator and a curing agent. The polymerization initiator and the curing agent are used to promote the reaction between particles and the binder material or promote the reaction between the binder materials.

As the polymerization initiator and the curing agent, various ones can be used depending on the reactive site of the binder material contained in the coating composition. A plurality of polymerization initiators may be used simultaneously, or one polymerization initiator may be used alone. Further, an acid catalyst, a thermal polymerization initiator, or a photopolymerization initiator may be used in combination. Examples of acid catalysts include aqueous hydrochloric acid solution, formic acid, and acetic acid. Examples of thermal polymerization initiators include peroxides and azo compounds. Examples of photopolymerization initiators include, but are not limited to, alkylphenone compounds, sulfur-containing compounds, acylphosphine oxide compounds, and amine compounds. In terms of curing properties, alkylphenone compounds are preferred, and specific examples thereof include 2.2-dimethoxy-1.2-diphenylethan-1-one, 2-methyl-1-(4-methylthiophenyl)-2-morpholinopropan-1-one, 2-benzyl-2-dimethylamino-1-(4-phenyl)-1-butane, 2-(dimethylamino)-2-[(4-methylphen-yl)methyl]-1-(4-phenyl)-1-butane, 2-benzyl-2-dimethylamino-1-(4-morpholinophenyl)-1-butane, 2-(dimethylamino)-2-[(4-methylphenyl)methyl]-1-[4-(4-morpholinyl)phenyl]-1-butane, 1-cyclohexyl-phenyl ketone, 2-methyl-1-phenylpropan-1-one, and 1-[4-(2-ethoxy)-phenyl]-2-hydroxy-2-methyl-1-propan-1-one.

The content of the polymerization initiators, curing agents, and catalysts is preferably 0.001 parts by mass to 30 parts by mass based on 100 parts by mass of the binder material in the coating composition, more preferably 0.05 parts by mass to 20 parts by mass, and still more preferably 0.1 parts by mass to 10 parts by mass.

Additionally, the coating composition may optionally further comprise additives such as surfactants, thickeners, leveling agents, UV absorbers, antioxidants, polymerization inhibitors, pH adjusters, and stabilizers, as required.

Third Group (Method of Producing Laminated Body)

The production method invention will now be described.

The method of producing the laminated body is a method of forming a laminated body comprising a first layer, a second layer, and a support substrate by applying the coating composition (the second group) to at least one surface of the support substrate in one coating step, followed by drying, the second layer and the first layer having different refractive indices and being laminated in this order on at least one surface of the support substrate, the first layer containing particles A, the second layer containing particles B.

Applying the coating composition to at least one surface of a support substrate in one coating step refers to forming a one-layer coating film (liquid film) comprising one coating composition on the support substrate in one coating step. Thus, simultaneous multilayer coating in which a coating film comprising a plurality of layers is applied simultaneously in one coating step, continuous sequential coating in which a one-layer coating film is applied for several times in one coating step and dried, wet-on-wet coating in which a one-layer coating film is applied for several times in one coating step and then dried, and the like are excluded.

Drying refers to reducing or removing the organic solvent contained in the coating composition applied on the support substrate. For the drying, it is preferable to perform heating such as convective heating, conductive heating, or radiation heating.

In the method of producing the laminated body, the laminated body can be produced by performing the drying step of reducing the organic solvent, for example, by heating the one-layer coating film formed by applying the coating composition to at least one surface of a support substrate in one coating step.

Next, one preferred example of the production method of the third group will be described.

The coating composition is applied to a support substrate by dip coating, air knife coating, curtain coating, roller coating, wire bar coating, gravure coating, die coating (see U.S. Pat. No. 2,681,294), or the like.

The coating film applied on the support substrate is then dried. The drying step preferably involves heating of the coating film from the standpoint of promoting the motion of the particles in the coating film to improve the surface migration properties as well as completely removing the organic solvent from the laminated film of the resulting laminated body. At the early stage of the drying, the drying may be performed at any wind speed and any temperature as long as a drying rate of 0.1 g/(m²·s) to 1.4 g/(m²·s) can be achieved.

In addition, the laminated film on the support substrate formed after the drying step may be further cured by applying heat or energy ray (curing step). This curing step refers to a step of promoting the reaction between the above-described reactive sites in the binder material and the like in the coating composition. In the curing step, when heat is used for curing, the temperature, which depends on the type of support substrate, is preferably from room temperature to 200° C. when the support substrate is a plastic film, and from the standpoint of activation energy in curing reaction, it is more preferably 100° C. to 200° C., still more preferably 130° C. to 200° C.

When energy ray is used for curing, electron beam (EB) and/or ultraviolet ray (UV ray) are preferred in terms of versatility. When ultraviolet ray is used for curing, the oxygen partial pressure is preferably as low as possible to prevent oxygen inhibition, and the curing is more preferably carried out in a nitrogen atmosphere (nitrogen purge).

When heat is used for curing, the drying step and the curing step may be carried out simultaneously.

In addition to the above, it is preferable to use a support substrate having a controlled surface zeta potential in the third group. Description will be given in detail below.

The zeta potential of the surface of the support substrate to be coated with the coating composition at a pH of the coating composition (hereinafter referred to as a zeta potential of the support substrate) is preferably −12 mV or less, and the surface free energy of the surface of the support substrate to be coated with the coating composition (hereinafter referred to as a surface free energy of the support substrate) is preferably 52 mN/m or less. More preferably, the zeta potential of the support substrate is −16 mV or less, and the surface free energy of the support substrate is preferably 48 mN/m or less.

The surface free energy of the support substrate and the zeta potential of the support substrate are both preferably as low as possible, but the surface free energy of the support substrate and the zeta potential of the support substrate cannot be controlled completely independent of each other. Therefore, to control the zeta potential of the support substrate at −12 mV or less, while also controlling the surface free energy of the support substrate to be 52 mN/m or less, the lower limit of the surface free energy of the support substrate is about 40 mN/m, and the lower limit of the zeta potential of the support substrate is about −30 mV.

In the production method, when the zeta potential of the support substrate is more than −12 mV, or when the surface free energy of the support substrate is more than 52 mN/m, disturbance of the shape of the interface between the first layer and the second layer of the resulting laminated body can occur.

Specifically, in the production method, when the surface free energy of the support substrate is more than 52 mN/m, attractive forces due to van der Waals forces between the particles b in the coating film and the support substrate are excessively strong during the process of drying the coating film, and the particles b are confined to the surface of the support substrate, inhibiting a uniform arrangement of the particles, which may lead to an increased disturbance of the interface between the first layer and the second layer of the resulting laminated body.

Further, in the production method, when the zeta potential of the support substrate is more than −12 mV, electrostatic repulsion between the particles b in the coating film and the support substrate during the process of drying the coating film is small, and the particles b are confined to the surface of the support substrate, inhibiting a uniform arrangement of the particles, which may lead to an increased disturbance of the interface between the first layer and the second layer of the resulting laminated body.

Further, in the production method, there are preferred ranges also for the arithmetic surface roughness Ra and the surface free energy of the surface of the support substrate to be coated with the coating composition. Namely, in the production method, the arithmetic surface roughness Ra, the surface free energy, and the zeta potential of the surface of the support substrate to be coated with the coating composition are preferably 40 nm or less, 52 mN/m or less, and −12 mV or less, respectively.

When the support substrate has the functional layer mentioned above and the coating composition is applied to the functional layer to form a laminated body, the surface of the functional layer desirably has an arithmetic surface roughness Ra, surface free energy, and zeta potential in preferred ranges (Ra: 40 nm or less, surface free energy: 52 mN/m or less, zeta potential: −12 mV or less).

As described above, in the production method, the arithmetic average roughness Ra of the surface of the support substrate to be coated with the coating composition, as measured in accordance with JIS R 1683 (2007), is preferably 40 nm or less. The surface roughness is more preferably 35 nm or less, particularly preferably 30 nm or less. If the arithmetic surface roughness Ra is more than 40 nm, the particles a will aggregate in the film because of poor surface migration properties, or the second layer will infiltrate into the first layer. As a result, the effect of reducing coloring of transmitted light and the effect of reducing visibility of patterning of a conductive layer are not produced; an in-plane uniform conductive layer cannot be formed on the laminated film, leading to an increased surface resistance value; and transparency of the coating film decreases.

The method of controlling the surface free energy of the surface of the support substrate on which the laminated film is to be formed to be 52 mN/m or less and, furthermore, the zeta potential of the surface of the support substrate on which the laminated film is to be formed at −12 mV or less is not critical, and these values can be achieved by varying the composition of the functional layer on the surface of the support substrate, i.e., the type of oligomer and monomer contained in the coating composition for forming the functional layer, or performing the surface treatments mentioned above.

Laminated Body and Laminated Film Produced by First to Third Groups

The laminated body desirably has high transparency to exhibit good properties. If the transparency is low, when the laminated body is used as an image display device, degradation of image quality may occur due to decrease in image saturation or the like.

For evaluation of the transparency of the laminated body, haze values and total light transmittance can be used. Haze is an indicator of cloudiness of a transparent material defined in JIS-K 7136 (2000). A smaller haze indicates a higher transparency. The haze value of the laminated body is preferably 1.2% or less, more preferably 1.0% or less, and still more preferably 0.8% or less. Although the transparency increases as the value decreases, it is difficult to reach 0%, and the realistic lower limit is considered to be about 0.01%. When the haze value is 2.0% or more, image degradation may be highly likely to occur.

The total light transmittance is an indicator of optical transparency of a transparent material defined in JIS-K 7361-1

(1997), and higher values indicate higher transparency. The total light transmittance of the laminated body is preferably 85% or more, more preferably 89% or more, and still more preferably 91% or more. The realistic upper limit is considered to be about 94%. A total light transmittance of 85% or less may cause a dark image.

Further, the laminated body of the first group and the laminated film of the laminated body produced by the production method of the third group preferably contain binders. When a binder material is present as it is as a binder, preferred types of binders are the compounds described in the item [Binder Material]. On the other hand, when a binder material is not present as it is as a binder, it is preferable to use the compounds described in the item [Binder Material] as binder materials of the coating composition.

Further, the laminated body produced using the coating composition of the second group and the laminated body produced by the production method of the third group preferably have the structure and properties described in the item [First Group] above.

Thus, for example, in the laminated body of the second and the third groups, the zeta potential at pH 10 of the surface of the first layer is preferably −60 mV or less.

The zeta potential of the first layer surface of the laminated body is influenced by the zeta potential of the particles b in the coating composition used to form the laminated body. Thus, for the zeta potential of the surface of the first layer to be −60 mV or less, the coating composition preferably contains at least one type of particles b, and the coating composition may contain two or more types of particles b with different zeta potentials.

The zeta potential of the first layer surface of the laminated body becomes more negative (tends to be −60 mV or less) by using particles b whose zeta potential is more negative, and becomes less negative (tends to be larger than −60 mV) by using particles b whose zeta potential is less negative. In addition, the zeta potential of the first layer surface can be adjusted to be in a preferred range by mixing two or more types of particles b having different zeta potentials.

One method for the zeta potential of the surface of the first layer of the laminated body to be −60 mV or less is to use as the particles b in the coating composition, for example, titanium oxide (zeta potential: −20 mV) and zirconium oxide (zeta potential: −80 mV) in combination. Even when particles b like titanium oxide whose zeta potential is less negative are used, if they are mixed with particles b like zirconium oxide whose zeta potential is more negative, since the zeta potential of the whole particles b is a value obtained by multiplying the zeta potential of each particles by its volume ratio, the zeta potential can be adjusted to be a preferred value by adjusting the volume ratio, and the zeta potential of the surface of the first layer of the laminated body produced using the coating composition can be adjusted to be a preferred value.

Names and Applications of Laminated Body and Laminated Body Produced by First to Third Groups When the support substrate constituting the laminated body is a plastic film, the laminated body may be referred to as a refractive index-adjusting film, an index-matching film, or an antireflection film, and is used in applications for adjusting a refractive index, applications for matching a refractive index, and applications for preventing reflection.

"Laminated film" formed on the support substrate, due to its function, may be also referred to as an index-matching layer, a reflectance-adjusting layer, an optically functional layer, an optically adjusting layer, or an antireflection layer.

Conductive Laminated Body Formed Using Laminated Body Produced by First to Third Groups The conductive laminated body can be produced by forming a conductive layer on the first layer of the laminated body. The conductive laminated body at least has a structure in which a second layer, a first layer, and a conductive layer are laminated in this order on a support substrate, i.e., a structure in which a conductive layer is laminated on the first layer of the laminated body described above.

The conductive layer can be a layer comprising transparent conductive oxide. The transparent conductive oxide is composed mainly of indium oxide or zinc oxide. When it is composed mainly of indium oxide, indium oxide can be used alone or doped to provide conductivity. Examples of doping materials include tin, zinc, niobium, tungsten, titanium, zirconium, and molybdenum, and in particular, tin-doped indium oxide (ITO) is widely used. When it is composed mainly of zinc oxide, zinc oxide can be used alone or doped to provide conductivity. Examples of doping materials include indium, tin, aluminum, boron, gallium, and silicon. Such a transparent conductive oxide layer can be formed by any known method, for example, sputtering, metallorganic chemical vapor deposition (MOCVD), thermal CVD, plasma CVD, molecular beam epitaxy (MBE), or pulsed laser deposition (PLD), and sputtering is preferred from the standpoint of uniform film formation in a large area.

The conductive laminated body obtained by forming a conductive layer on the support substrate is preferably annealed to improve conductivity and light transmittance. The annealing is preferably carried out under vacuum or in an inert gas atmosphere, and if the annealing is carried out in an oxygen atmosphere, the transparent conductive oxide may be thermally oxidized, resulting in reduction in conductivity (increase of surface resistance value). While the annealing temperature needs to be at or above the temperature which improves crystallinity, from the standpoint of the support substrate, a lower temperature is preferred from the standpoint of, for example, heat shrinkage, wrinkling, curling, oligomer precipitation, reduction in adhesion, and coloring. Thus, the annealing temperature is preferably as low as possible while still providing conductivity and light transmittance.

The conductive laminated body is used for various applications. The conductive laminated body can be suitably used, for example, as a touch panel including the same. In many applications including touch panels, it is necessary to perform patterning by which the conductive layer is processed into a desired shape. In general, patterning of a conductive layer is carried out by etching the conductive layer uniformly formed on a first layer of a conductive laminated body to remove unwanted parts of the conductive layer. In the etching process, alkaline solution is often used, and therefore during the process, the surface of the laminated body is exposed to the alkaline solution when unwanted parts of the conductive layer is removed. Thus, the laminated body is preferably sufficiently alkali-resistant.

The above-described alkali resistance herein means durability of the laminated body against alkaline solution, and a specific method of evaluating the alkali resistance will be described below.

The surface resistance value of the conductive laminated body varies depending on the application, and particularly for capacitance touch panel applications that require patterning, it is preferably 50 to 500Ω/□, more preferably 100 to 300Ω/□ for use. When the surface resistance value is less than 50Ω/□ or more than 500Ω/□, the recognition precision of a touch panel may decrease.

The thickness of the conductive layer of the conductive laminated body is preferably in the range of 4 to 50 nm, more preferably 10 to 40 nm. When the thickness of the conductive layer is less than 4 nm, it is difficult to form a continuous thin film, and it is difficult to provide good conductivity. When the thickness of the conductive layer is more than 50 nm, it is difficult to make the optical properties of a part having the conductive layer and a part not having the conductive layer similar when the transparent conductive thin film layer is patterned.

The conductive layer varies depending on the application, but herein means a layer having a surface resistance value of less than $10^6 \Omega/\square$. When it is used for a touch panel, which is a primary application, in particular, a capacitance touch panel that requires patterning, the surface resistance value of the conductive layer is preferably 50 to 500$\Omega/\square$, more preferably 100 to 300$\Omega/\square$ for use.

Figure 10:
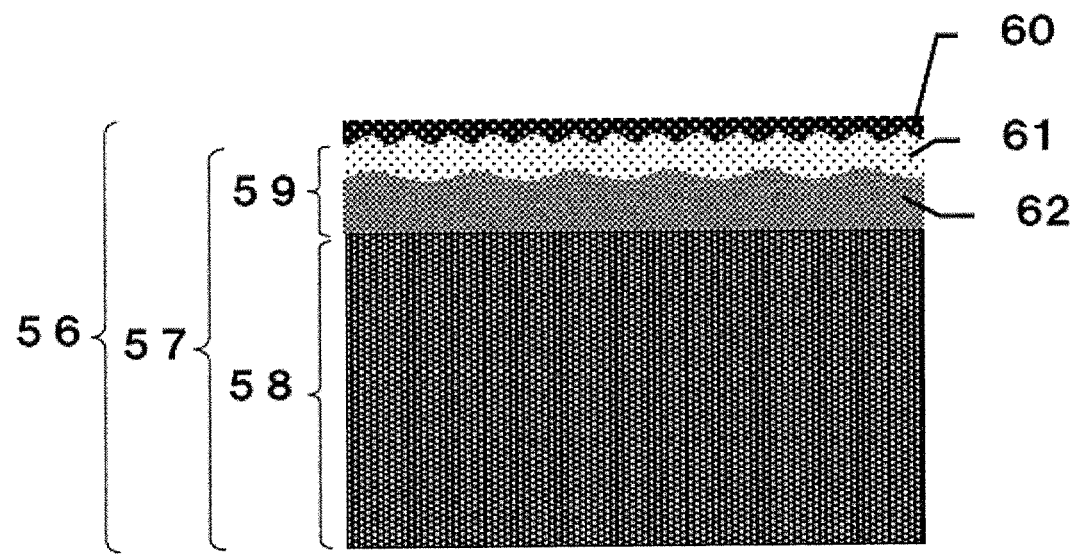
FIG. 10 is a schematic cross-sectional view in one aspect of the conductive laminated body.
Figure 11:
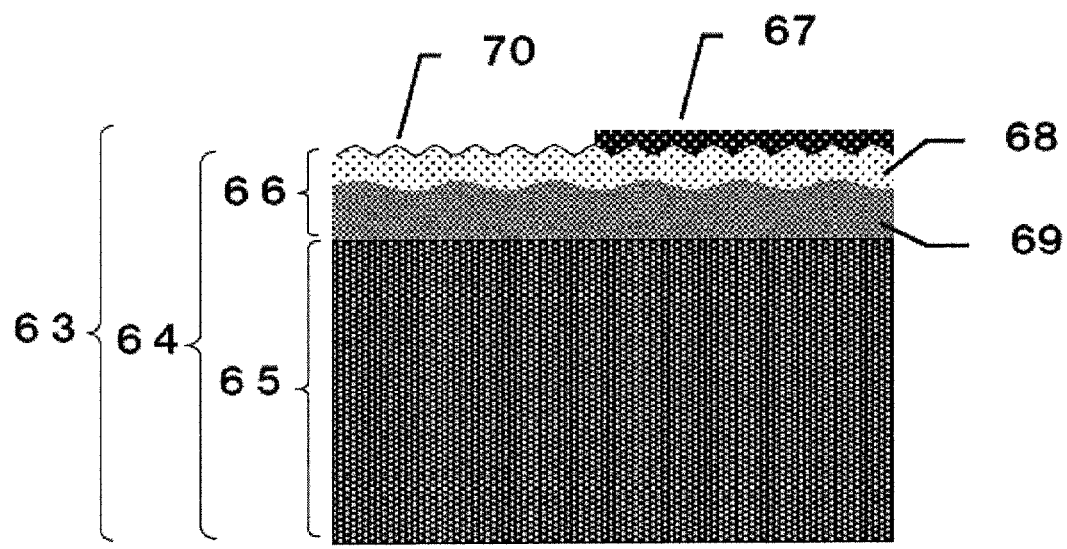
FIG. 11 is a schematic cross-sectional view in one aspect of the conductive laminated body.
Figure 12:
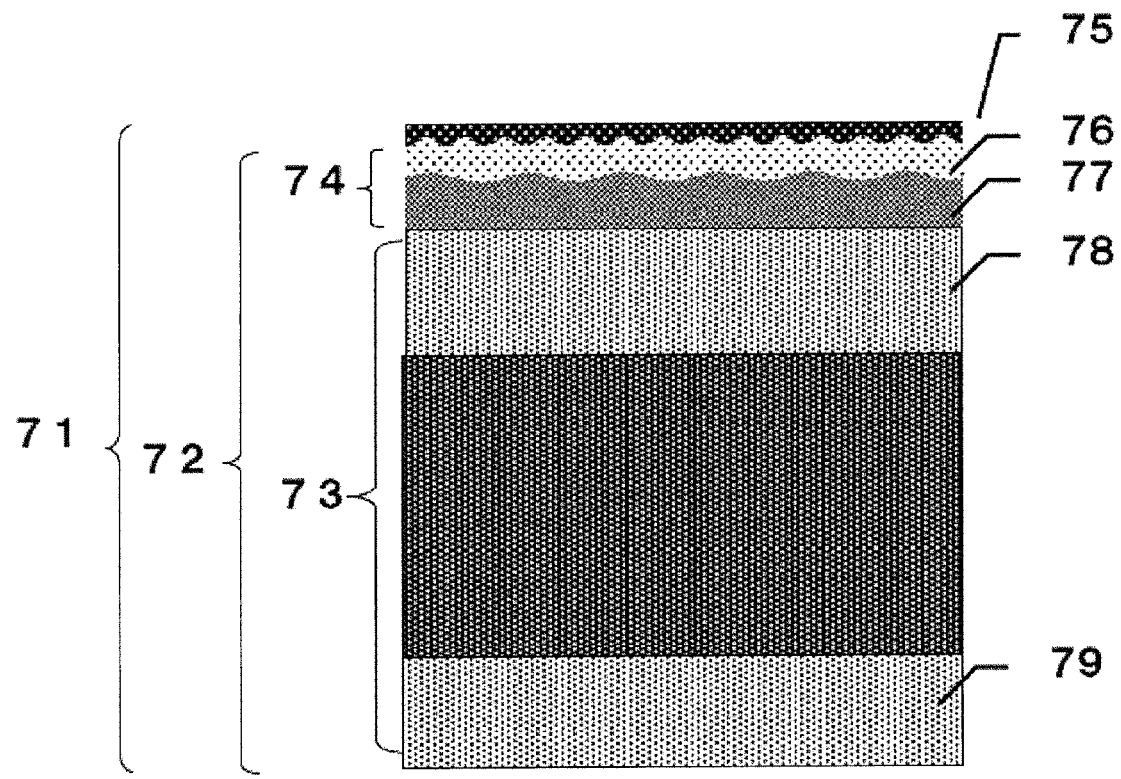
FIG. 12 is a schematic cross-sectional view in one aspect of the conductive laminated body.

One aspect of the conductive laminated body is shown in FIG. 10. A conductive laminated body (56) has a conductive layer (60) on a laminated film (59) (a first layer) of a laminated body (57). Further, another aspect of the conductive laminated body is shown in FIG. 11. A conductive laminated body (63) in this aspect has a part (67) partially having a conductive layer and a part (70) where a first layer is exposed at the outermost surface because of the absence of the conductive layer. Further, another aspect of the conductive laminated body is shown in FIG. 12. A support substrate (73) may be used which has a hard coat layer and/or adhesion-improving layer (78) on the side of a laminated film (72) opposite the side having a conductive layer (75) and, furthermore, a hard coat layer and/or adhesion-improving layer, and an antiblocking layer (79) on the side opposite the conductive layer (75) of the conductive laminated body.

Method of Producing Conductive Laminated Body

The conductive laminated body can be produced by forming a conductive layer on the first layer of the laminated body using vacuum deposition, sputtering, CVD, ion plating, spraying, or the like according to the desired thickness as appropriate. For example, in sputtering, normal sputtering using an oxide target, or reactive sputtering using a metal target is used. In this case, oxygen, nitrogen, or the like may be introduced as a reactive gas, and ozone addition, plasma irradiation, ion assistance, and the like may be used in combination. In addition, a bias such as DC bias, AC bias, or high-frequency bias may be applied to the substrate as long as our object can be achieved. Further, it is preferable to perform annealing to improve conductivity and optical transparency.

EXAMPLES

Our compositions, bodies and methods will now be described by way of example, but this disclosure is not necessarily limited thereto.

Preparation of Fluorine Polymer A
Preparation of Fluorine Polymer A (1)

After adding 1.9 g of methacryloxypropyltrimethoxysilane, 0.75 g of $C_6F_{13}$—$(CH_2)_6$—OCO—CH=$CH_2$, 0.096 g of 2,2-azobis(2,4-dimethylvaleronitrile), and 11 g of isopropyl alcohol (also referred to as IPA), the resulting mixture was heated under stirring at 80° C. for 60 minutes to prepare a fluorine polymer A (1) with a solid content of 25% by mass.

Preparation of Fluorine Polymer A (2)

After adding 2.1 g of methacryloxypropyltrimethoxysilane, 1.9 g of $C_6F_{13}$—$(CH_2)_6$—OCO—CH=$CH_2$, 0.13 g of 2,2-azobis(2,4-dimethylvaleronitrile), and 16.5 g of isopropyl alcohol, the resulting mixture was heated under stirring at 80° C. for 60 minutes to prepare a fluorine polymer A (2) with a solid content of 25% by mass.

Preparation of Mixed Solution Containing Particles a and Fluorine Polymer A
Preparation of Mixed Solution (1-1) Containing Particles a and Fluorine Polymer A To 11 g of the fluorine polymer A (1) with a solid content of 25% by mass and 10 g of colloidal silica dispersed in IPA (IPA-ST available from Nissan Chemical Industries, Ltd., solids concentration: 20% by mass, number average particle diameter: 12 nm), 0.17 g of 10 mass % aqueous formic acid solution and 0.3 g of water were added, and the resulting mixture was stirred at 70° C. for 1 hour. Methyl ethyl ketone was then added for dilution to prepare a "mixed solution (1-1) containing particles a and a fluorine polymer A" with a solid content of 3.5% by mass. After the preparation, the component ratio of the fluorine polymer A to the inorganic particles to the part derived from the fluorine polymer A in the particles a was investigated by the method described above. The results are shown in Table 1.

Preparation of Mixed Solution (2-1) Containing Particles a and Fluorine Polymer A To 10 g of colloidal silica dispersed in IPA (colloidal silica sol available from Nissan Chemical Industries, Ltd., solid content: 20% by mass, number average particle diameter: 12 nm), 1.9 g of methacryloxypropyltrimethoxysilane, 0.17 g of 10 mass % aqueous formic acid solution, and 0.3 g of water were added, and the resulting mixture was stirred at 70° C. for 1 hour. Thereafter, 0.75 g of $C_6F_{13}$—$(CH_2)_6$—OCO—CH=$CH_2$ and 0.096 g of 2,2-azobis(2,4-dimethylvaleronitrile) were added, and then the resulting mixture was heated under stirring at 80° C. for 60 minutes. Methyl ethyl ketone was then added for dilution to prepare a "mixed solution (2-1) containing particles a and a fluorine polymer A" with a solid content of 3.5% by mass.

Preparation of Mixed Solutions (2-2) to (2-11), (5-1), (6-1) to (6-4), and (7-1) to (7-3)
Containing Particles a and Fluorine Polymer A Mixed solutions were prepared using the formulations shown in Table 1 in the same manner as for the mixed solution (2-1) containing particles a and a fluorine polymer A.

Preparation of Mixed Solution (3-1) Containing Particles a and Fluorine Polymer A To 10 g of colloidal silica dispersed in IPA (colloidal silica sol available from Nissan Chemical Industries, Ltd., solids concentration: 20% by mass, number average particle diameter: 12 nm), 1.9 g of methacryloxypropyltrimethoxysilane, 0.17 g of 10 mass % aqueous formic acid solution, and 0.3 g of water were added, and the resulting mixture was stirred at 70° C. for 1 hour. Thereafter, 0.75 g of $C_6F_{13}$—$(CH_2)_6$—OCO—CH=$CH_2$ and 0.029 g of 2,2-azobis(2,4-dimethylvaleronitrile) were added, and then the resulting mixture was heated under stirring at 70° C. for 60 minutes. Methyl ethyl ketone was then added for dilution to prepare a "mixed solution (3-1) containing particles a and a fluorine polymer A" with a solid content of 3.5% by mass.

Preparation of Mixed Solution (3-2) Containing Particles a and Fluorine Polymer A A mixed solution was prepared using the formulation shown in Table 1 in the same manner as for the mixed solution (3-1) containing particles a and a fluorine polymer A.

Preparation of Mixed Solution (4-1) Containing Particles a and Fluorine Polymer A To 10 g of colloidal silica dispersed in IPA (colloidal silica sol available from Nissan Chemical Industries, Ltd.: solids concentration: 20% by mass, number average particle diameter: 12 nm), 1.9 g of methacryloxypropyltrimethoxysilane, 0.17 g of 10 mass % aqueous formic acid solution, and 0.3 g of water were added, and the resulting mixture was stirred at 70° C. for 1 hour. Thereafter, 0.75 g of $C_6F_{13}$—$(CH_2)_6$—OCO—CH=$CH_2$ and 2,2-azobisisobutyronitrile 0.075 g were added, and then the resulting mixture was heated under stirring at 90° C. for 60 minutes. Methyl ethyl ketone was then added for dilution to prepare a "mixed solution (4-1) containing particles a and a fluorine polymer A" with a solid content of 3.5% by mass.

Preparation of Mixed Solution (4-2) Containing Particles a and Fluorine Polymer A A mixed solution was prepared using the formulation shown in Table 1 in the same manner as for the mixed solution (4-1) containing particles a and a fluorine polymer A.

Preparation of Mixed Solution (8-1) Containing Particles a and Fluorine Polymer A To 10 g of colloidal silica dispersed in IPA (colloidal silica sol available from Nissan Chemical Industries, Ltd.: solids concentration: 20% by mass, number average particle diameter: 12 nm), 1.15 g of methacryloxypropyltrimethoxysilane, 0.17 g of 10 mass % aqueous formic acid solution, and 0.3 g of water were added, and the resulting mixture was stirred at 70° C. for 1 hour. Thereafter, 0.75 g of $C_6F_{13}$—$(CH_2)_6$—OCO—CH=$CH_2$, 0.75 g of γ-butyrolactone acrylate, and 0.096 g of 2,2-azobisisobutyronitrile were added, and then the resulting mixture was heated under stirring at 80° C. for 60 minutes. Methyl ethyl ketone was then added for dilution to prepare a "mixed solution (8-1) containing particles a and a fluorine polymer A" with a solid content of 3.5% by mass.

Preparation of Mixed Solutions (8-2) to (8-15) Containing Particles a and Fluorine Polymer A Mixed solutions were prepared using the formulations shown in Table 1 in the same manner as for the mixed solution (8-1) containing particles a and a fluorine polymer A.

Preparation of Mixed Solution (9-1) Containing Particles a and Fluorine Polymer A To 10 g of colloidal silica dispersed in IPA (colloidal silica sol available from Nissan Chemical Industries, Ltd.: solids concentration: 20% by mass, number average particle diameter: 12 nm), 1.53 g of methacryloxypropyltrimethoxysilane, 0.17 g of 10 mass % aqueous formic acid solution, and 0.3 g of water were added, and the resulting mixture was stirred at 70° C. for 1 hour. Thereafter, 0.75 g of $C_6F_{13}$—$(CH_2)_6$—OCO—CH=$CH_2$, 0.37 g of γ-butyrolactone acrylate, and 0.096 g of 2,2-azobisisobutyronitrile were added, and then the resulting mixture was heated under stirring at 80° C. for 60 minutes. Methyl ethyl ketone was then added for dilution to prepare a "mixed solution (9-1) containing particles a and a fluorine polymer A" with a solid content of 3.5% by mass.

Preparation of Mixed Solutions (9-2) and (9-3) Containing Particles a and Fluorine Polymer A Mixed solutions were prepared using the formulations shown in Table 1 in the same manner as for the mixed solution (9-1) containing particles a and a fluorine polymer A.

Selection of Particles b

The materials below were used as particles b.

Particles b (1)
 Dispersed titanium dioxide particles (zeta potential of particles b: −20 mV)
(ELCOM available from JGC C&C., solid content: 30% by mass, number average particle diameter: 8 nm)

Particles b (2)
 Dispersed zirconium oxide particles (zeta potential of particles b: −80 mV)
(available from Nissan Chemical Industries, Ltd., solid content: 30% by mass, number average particle diameter: 10 nm)

Particles b (3)
 The materials below were mixed to obtain particles b (3).
 Dispersed titanium dioxide particles (zeta potential of particles b: −20 mV) 50.0 parts by mass
(ELCOM available from JGC C&C., solid content: 30% by mass, number average particle diameter: 8 nm)
 Dispersed zirconium oxide particles (zeta potential of particles b: −80 mV) 50.0 parts by mass
(available from Nissan Chemical Industries, Ltd., solid content: 30% by mass, number average particle diameter: 10 nm)
 Zeta potential of whole particles b: −50 mV Particles b (4)
 The materials below were mixed to obtain particles b (4).
 Dispersed titanium dioxide particles (zeta potential of particles b: −20 mV) 30.0 parts by mass
(ELCOM available from JGC C&C., solid content: 30% by mass, number average particle diameter: 8 nm)
 Dispersed zirconium oxide particles (zeta potential of particles b: −80 mV) 70.0 parts by mass
(available from Nissan Chemical Industries, Ltd., solid content: 30% by mass, number average particle diameter: 10 nm)
 Zeta potential of whole particles b: −62 mV Preparation of Coating Composition Preparation of Coating Composition (1)
 The materials below were mixed to prepare a coating composition (1).
 Mixed solution (2-1) containing particles a and a fluorine polymer A 50.3 parts by mass
 Fluorine polymer A (1) (diluted with methyl ethyl ketone (MEK) to a solids concentration of 3.5% by mass) 2.7 parts by mass
 Particles b (1) 7.8 parts by mass
 Binder material (pentaerythritol triacrylate: PETA) 1.56 parts by mass
 Photopolymerization initiator (Irgacure 127: Irg127 available from Ciba Specialty Chemicals K. K.) 0.26 parts by mass
Organic Solvent
 Methyl ethyl ketone (MEK) 26.4 parts by mass
 Ethylene glycol monobutyl ether acetate (EGMBA) 11.0 parts by mass Preparation of Coating Compositions (2) to (17), (19) to (25), (28), (30), and (36) to (55)

Coating compositions were prepared using the formulations shown in Table 1 in the same manner as for the preparation of the coating composition (1).

Preparation of Coating Composition (18)
 The materials below were mixed to prepare a coating composition (18).
 Mixed solution (2-1) containing particles a and a fluorine polymer A 53.0 parts by mass
 Fluorine compound A ($C_6F_{13}$—$(CH_2)_6$—OCO—CH=$CH_2$) 0.15 parts by mass
 Particles b (1) 7.8 parts by mass
 Binder material (pentaerythritol triacrylate: PETA) 1.56 parts by mass
 Photopolymerization initiator (Irgacure 127: Irg127 available from Ciba Specialty Chemicals K. K.) 0.26 parts by mass
Organic Solvent
 Methyl ethyl ketone (MEK) 26.4 parts by mass
 Ethylene glycol monobutyl ether acetate (EGMBA) 11.0 parts by mass Preparation of Coating Composition (26)
 A coating composition (26) was prepared in the same manner as for the coating composition (1) except that the binder material (PETA) was substituted with a binder material (di-pentaerythritol pentaacrylate: DPPA).

Preparation of Coating Composition (27)

A coating composition (27) was prepared in the same manner as for the coating composition (1) except that the binder material (PETA) was substituted with a binder material (urethane acrylate oligomer UA-306T Kyoeisha Chemical Co., Ltd.).

Preparation of Coating Composition (29)

The materials below were mixed to prepare a coating composition (29).

Mixed solution (6-2) containing particles a and a fluorine polymer A 50.0 parts by mass Fluorine compound A ($C_8F_{17}$—$(CH_2)_2$—OCO—CH=$CH_2$) 3.0 parts by mass Particles b (2) 27.0 parts by mass Binder material (pentaerythritol triacrylate: PETA) 6.7 parts by mass Photopolymerization initiator (Irgacure 127: Irg127 available from Ciba Specialty Chemicals K. K.) 0.34 parts by mass Organic Solvent Methyl ethyl ketone (MEK) 7.6 parts by mass Ethylene glycol monobutyl ether acetate (EGMBA) 8.3 parts by mass Preparation of Coating Composition (31)

A coating composition (31) was prepared in the same manner as for the coating composition (1) except that the particles a (2-1) were substituted with particles a (2-8).

Preparation of Coating Composition (32)

A coating composition (32) was prepared in the same manner as for the coating composition (1) except that the particles a (2-1) were substituted with particles a (2-9).

Preparation of Coating Composition (33)

A coating composition (33) was prepared in the same manner as for the coating composition (1) except that the particles a (2-1) were substituted with particles a (2-10).

Preparation of Coating Composition (34)

A coating composition (34) was prepared in the same manner as for the coating composition (1) except that the particles a (2-1) were substituted with particles a (2-11).

Preparation of Coating Composition (35)

A coating composition (35) was prepared in the same manner as for the coating composition (1) except that the particles a (2-1) were substituted with particles a (6-4).

Preparation of Hard Coat Coating Composition 1

The materials below were mixed to prepare a hard coat coating composition 1.

Pentaerythritol triacrylate (PETA) 30.0 parts by mass

Irgacure 907 (available from Ciba Specialty Chemicals K. K.) 1.5 parts by mass

Methyl isobutyl ketone (MIBK) 73.5 parts by mass

Preparation of Hard Coat Coating Composition 2

The materials below were mixed to prepare a hard coat coating composition 2.

Urethane acrylate oligomer (EBECRYL8655 available from Daicel-Cytec Company Ltd.) 30.0 parts by mass Irgacure 907 (available from Ciba Specialty Chemicals K. K.) 1.5 parts by mass Methyl isobutyl ketone (MIBK) 73.5 parts by mass Preparation of Hard Coat Coating Composition 3

The materials below were mixed to prepare a hard coat coating composition 3.

PVA acrylate (acrylate modified polyvinyl alcohol) 30.0 parts by mass

Irgacure 907 (available from Ciba Specialty Chemicals K. K.) 1.5 parts by mass

Methyl isobutyl ketone (MIBK) 73.5 parts by mass

Preparation of Antiblocking Coating Composition

The materials below were mixed to prepare an antiblocking coating composition.

Aika Aitron Z-739 (Aika Kogyo Co., Ltd.) 36.4 parts by mass

Methyl ethyl ketone (MEK) 36.4 parts by mass

Evaluation of Coating Composition

Method of Quantifying Inorganic Particle Part in Particles A, Fluorine Polymer A, and Part Derived from Fluorine Polymer A in Particles a Using Mixed Solution Containing Particles a and Fluorine Polymer A The following method was used for quantification.

Quantification of Fluorine Polymer A:

To the mixed solution containing particles a and a fluorine polymer A obtained by the preparation method described above, a large excess of hexane was added to aggregate the particles a, and centrifugation was performed at 5000 rpm for 30 minutes to cause precipitation. The precipitate was further washed with hexane. The solid component was isolated as the particles a, and a component dissolved in a liquid as the fluorine polymer A. From their mass ratio, the ratio of the particles a to the fluorine polymer A was determined.

Quantification of Inorganic Particle Part in Particles a and Part Derived from Fluorine Polymer A:

For the particles a isolated as described above, quantitative analysis of silicon, fluorine, carbon, and other atoms was performed using a wavelength-dispersive X-ray fluorescence spectrometer. From the quantity of fluorine atoms obtained by the analysis and the structure of the fluorine compound A used, the content of the fluorine compound A in the part derived from the fluorine polymer can be determined. Further, by subtracting the carbon content in the fluorine compound A from the quantity of carbon atoms obtained by the analysis, the content of the compound D in the part derived from the fluorine polymer can be determined. From the contents of the fluorine compound A and the compound D, the mass of the part derived from the fluorine polymer A in the particles a can be determined. When the inorganic particles contain any other characteristic element, the mass of the inorganic particle part in the particles A can be determined from the amount thereof. When the inorganic particles are silica, by further subtracting the quantity of silicon atoms in the compound D, which is determined from the structure and the content of the compound D, from the quantity of silicon atoms obtained by the analysis, the mass of the inorganic particle part in the particles A can be determined.

Number Average Molecular Weight of Fluorine Polymer A

The number average molecular weight of the fluorine polymer A was measured with the apparatus below using monodisperse polystyrene of known molecular weight as a reference material. For the fluorine polymer A, those isolated by the method described above can be used.

Apparatus: LC-10 manufactured by Shimadzu Corporation

Separation column: K-804+K-805L available from Shodex

Column temperature: 35° C.

Solvent: tetrahydrofuran pH of Coating Composition

The pH of the coating composition necessary for determining the zeta potential of the support substrate described below can be measured in accordance with the pH measuring method using a glass electrode described in JIS Z 8802 (2011). Specifically, it was measured using a pH meter D50 manufactured by Horiba, Ltd.

Alkaline Buffering Capacity of Compound E

The alkaline buffering capacity of the compound E is determined such that NaOH (0.1 mol/l) is added to 100 g of a 5% by mass solution of the compound E in a mixed solution of isopropyl alcohol and $H_2O$ at a ratio of 9:1 (by mass), and the amount (ml) of NaOH (0.1 mol/l) consumed until the pH at 25° C., as measured by the pH measuring method using a glass electrode described in JIS Z8802 (2011), reaches pH 9 is measured. Specifically, it was measured using a pH meter D50 manufactured by Horiba, Ltd.

Zeta Potential of Particles b

The zeta potential of the particles b was determined by measuring an electroosmotic flow at 25° C./pH 7 using a zeta potential/particle size analyzer ELSZ-1 available from Otsuka Electronics Co., Ltd. and reference particles obtained by dispersing polystyrene latex particles (monitor particles: Standard particles for solid sample cell/available from Otsuka Electronics Co., Ltd.) in an aqueous solution containing 10 mmol/$dm^3$ of NaCl electrolyte.

When two or more types of particles b are used in combination in the coating composition, the value obtained by multiplying the data potential of each of the two or more types of particles b by its volume ratio was used as the zeta potential of the whole particles b.

Preparation of Support Substrate

Methods of preparing support substrates are described below. The constitutions of samples are summarized in Table 4.

Preparation of Support Substrates 1 to 3

U48, U46, and U34 (available from Toray Industries, Inc.), in which an adhesion-improving layer was formed on a PET resin film, were used as support substrates 1 to 3.

Preparation of Support Substrate 4

To the surface of the support substrate 1 to which adhesion-improving coating was applied, the hard coat coating composition 1 described above was applied using a bar coater (#10), and then dried under the following conditions:
 Temperature of hot air: 70° C.
 Wind speed of hot air: 3 m/s
 Wind direction: parallel to coated surface
 Drying time: 1.5 min.

Then, using a high-pressure mercury lamp (available from Eye Graphics Co., Ltd.) of 160 W/$cm^2$, UV light was applied at an illuminance of 600 W/$cm^2$ and a total light quantity of 800 mJ/$cm^2$ under an oxygen concentration of 0.1% by volume to cure the coat, thereby preparing a support substrate 4.

Preparation of Support Substrate 7

To the surface of the support substrate 4 to which a hard coat coating composition was not applied, the antiblocking coating composition described above was applied using a bar coater (#10), and then dried under the following conditions:
 Temperature of hot air: 70° C.
 Wind speed of hot air: 3 m/s
 Wind direction: parallel to coated surface
 Drying time: 1.5 min.

Then, using a high-pressure mercury lamp (available from Eye Graphics Co., Ltd.) of 160 W/$cm^2$, UV light was applied at an illuminance of 600 W/$cm^2$ and a total light quantity of 800 mJ/$cm^2$ under an oxygen concentration of 0.1% by volume to cure the coat, thereby preparing a support substrate 7.

Preparation of Support Substrate 8

A hard coat layer was formed in the same manner as in the method of preparing the support substrate 4 except that the hard coat coating composition 1 was substituted with the hard coat coating composition 2, and then an antiblocking layer was formed on the surface to which a hard coat coating composition was not applied in the same manner as for the support substrate 7, thereby preparing a support substrate 8.

Preparation of Support Substrate 9

A hard coat layer was formed in the same manner as in the method of preparing the support substrate 4 except that the hard coat coating composition 1 was substituted with the hard coat coating composition 3, and then an antiblocking layer was formed on the surface to which a hard coat coating composition was not applied in the same manner as for the support substrate 7, thereby preparing a support substrate 9.

Evaluation of Support Substrate

For the support substrates, the zeta potential and the surface free energy of the surface on which the laminated film was to be formed were measured, and the results obtained are shown in Tables. Unless otherwise specified, in Examples and Comparative Examples, measurements were made at three different points for one sample, and the average value was used.

Zeta Potential of Support Substrate

The zeta potential of the surface of the support substrate on which the laminated film was to be formed was measured with a unit for plate samples of a zeta potential/particle size analyzer ELSZ-1 available from Otsuka Electronics Co., Ltd. using an aqueous solution containing $Na_2SO_4$ as a buffer, the pH of the solution being adjusted with HCl and NaOH to the pH of the coating composition.

Surface Free Energy of Support Substrate

The surface free energy of the surface of the support substrate on which the laminated film was to be formed was calculated by measuring the contact angle of water, ethylene glycol, formamide, and diiodomethane using an automatic contact angle meter DM-501 manufactured by Kyowa Interface Science Co., Ltd., and analyzing the average value using analysis software "FAMAS" attached to the apparatus. Its calculation principle is based on the method of Owens (J. Appl. Polym. Sci., 13, 1741 (1969). Measurements were made at four points for each sample, and the average was calculated.

Method of Producing Laminated Body

A method of producing laminated bodies is described below. The constitutions of the laminated bodies are shown in Table 4.

The coating composition described above was applied to a hard coat layer (in the case where a support substrate on which a hard coat layer was formed was used) or an adhesion-improving layer (in the case where a support substrate on which an adhesion-improving layer was formed was used) using a bar coater (#3), and then the first-stage drying described below was performed, followed by the second-stage drying.

First stage
 Temperature of hot air: 50° C.
 Wind speed of hot air: 1.5 m/s
 Wind direction: parallel to coated surface
 Drying time: 0.5 min Second Stage
 Temperature of hot air: 100° C.
 Wind speed of hot air: 5 m/s
 Wind direction: perpendicular to coated surface
 Drying time: 1 min The wind speed of hot air is a value obtained by converting a measured dynamic pressure at a blowoff unit into a wind speed.

After drying, using a high-pressure mercury lamp (available from Eye Graphics Co., Ltd.) of 160 W/$cm^2$, UV light was applied at an illuminance of 600 W/$cm^2$ and a total light quantity of 800 mJ/cm² under an oxygen concentration of 0.1% by volume to cure the coat.

Laminated bodies of Examples 1 to 32 and Comparative Examples 1 to 8 were produced using combinations of the support substrates and the coating composition formulations shown in Table 4.

Evaluation of Laminated Body

For the laminated bodies, the following performance evaluations were performed, and the results obtained are shown in Tables. Unless otherwise specified, in Examples and Comparative Examples, measurements were made at three different points for one sample, and the average value was used.

For evaluations of the haze of conductive laminated bodies, the surface resistance value of conductive laminated bodies, the adhesion of conductive layers, and the visibility of conductive layer patterning, samples obtained by forming a conductive layer on the first layer of a laminated body in the manner described below and then patterning the conductive layer were used.

Zeta Potential of First Layer Surface

The zeta potential at pH 10 of the surface of the first layer of the laminated body was determined by measuring an electroosmotic flow with a unit for plate samples of a zeta potential/particle size analyzer ELSZ-1 available from Otsuka Electronics Co., Ltd. using an aqueous solution whose pH was adjusted to 10 with NaOH as an electrolyte, and polystyrene latex as monitor particles (Standard particles for solid sample cell available from Otsuka Electronics Co., Ltd.).

Alkali Resistance of Laminated Body

The alkali resistance of the laminated body was evaluated as described below. The laminated body was immersed in a 2 mass % aqueous NaOH solution heated to 60° C. for 5 minutes, and then washed with pure water. The reflectances of an alkali-immersed portion and an unimmersed portion after being dried were measured using a reflection spectrophotometer (available from Shimadzu Corporation, trade name (UV-3000)) in the range of 200 nm to 800 nm, and for the reflectance difference (ΔR) obtained, ΔR of 1.2 or less (A and B) was evaluated as acceptable.

ΔR of 1.0 or less A
ΔR of 1.2 or less B
ΔR of 1.3 or more C

Conductive Layer Formation

Conductive Layer Formation 1

A conductive layer comprising indium-tin composite oxide was formed on the first layer of the laminated body described above. The pressure before sputtering was $10^{-5}$ Pa, and using indium oxide containing 36% by mass of tin oxide (available from Sumitomo Metal Mining Co., Ltd., density: 6.9 g/cm³) as a target, DC power of 2 W/cm² was applied. Further, Ar gas was flowed at 130 sccm, and $O_2$ gas was flowed at a flow rate which minimizes the surface resistance value; and the conductive layer was formed by DC magnetron sputtering in an atmosphere of 0.67 Pa.

However, to prevent arc discharge, not a usual DC but a 5 μs wide pulse was applied at a frequency of 50 kHz using RPG-100 manufactured by Japan ENI. The sputtering was carried out at a center roll temperature of 10° C.

The oxygen partial pressure in the atmosphere was constantly monitored using a sputtering process monitor (XPR2, manufactured by LEYBOLD INFICON), and fed back to a flow meter of oxygen gas and a DC power supply to keep constant the degree of oxidation in the conductive layer comprising indium-tin composite oxide.

After sputtering, annealing was performed under the conditions of a vacuum degree of 0.01 Pa or lower and a temperature of 160° C. for 10 minutes to deposit a conductive layer with a thickness of 30 nm and a refractive index of 1.96 comprising indium-tin composite oxide, thereby producing a conductive laminated body.

Conductive Layer Formation 2

A conductive laminated body was produced in the same manner as in Conductive Layer Formation 1 described above except that the annealing temperature was changed to 130° C.

Patterning of Conductive Layer of Conductive Laminated Body

An etching resist was printed on the conductive laminated body produced by Conductive Layer Formation 1 described above, and then the conductive laminated body was immersed in 1 N hydrochloric acid, and immersed in alkali to form a pattern of the conductive layer of 1×3 cm (which is hereinafter referred to as a patterned conductive laminated body).

Refractive Index of First Layer and Second Layer

For the refractive index of each of the first layer and the second layer, a reflectance of the laminated film of the laminated body was measured using a reflective film thickness monitor (manufactured by Otsuka Electronics Co., Ltd., trade name (FE-3000)) in the range of 300 to 800 nm, and using software (FE-Analysis) attached to this apparatus, a refractive index at 550 nm was determined in accordance with the method described in General Catalog P6 for a film thickness meter (nonlinear least-squares method) available from Otsuka Electronics Co., Ltd.

Using the Cauchy dispersion formula Expression (1) as an approximate formula for wavelength dispersion of the refractive index, optical constants (C1, C2, C3) were calculated by the least-squares method (curve fitting) to measure the refractive index at 550 nm.

$$n = \frac{C_3}{\lambda^4} + \frac{C_2}{\lambda^2} + C_1 \qquad (1)$$

State of Interface Formed by First Layer and Second Layer

The state of the interface formed by the first layer and the second layer in the laminated film was observed by observing a cross-section of the laminated body using a transmission electron microscope (TEM). The interfacial state was evaluated according to the following criteria.

Using an image of an ultrathin section of the laminated film taken at a magnification of 200,000 using TEM (80 nm long, 600 nm wide), the white balance was adjusted such that the brightest part and the darkest part were included in an 8-bit tone curve using software (image processing software Image)/developed by National Institutes of Health (NIH)). Furthermore, the contrast was adjusted so that the interface could be clearly distinguished. When a well-defined boundary could be drawn between one layer and another layer, it was considered that there existed a well-defined interface, and A and B were evaluated as acceptable.

A well-defined boundary can be drawn across the area: A
A well-defined boundary can be drawn at most areas: B
A well-defined boundary cannot be drawn at many areas: C Average Thickness of First Layer and Second Layer The thicknesses of the first layer and the second layer on a support substrate were measured by observing a cross-section using a transmission electron microscope (TEM). The thickness of each layer was measured as described below. From an image of an ultrathin section of a cross-section of the laminated film taken at a magnification of 200,000 using TEM, the thickness of each layer was read using software (image processing software ImageJ). The layer thickness was measured at 30 points in total, and its average value was defined as the average thickness.

The Number of Openings of First Layer Surface

The laminated body surface was observed using a scanning electron microscope (SEM), and the number of openings was counted by the following method.

From an image taken at a magnification of 50,000 using SEM, images of 4 μm² (2 μm×2 μm) were cut out, and the white balance was adjusted such that the brightest part and the darkest part were included in an 8-bit tone curve using software (image processing software Image)/developed by National Institutes of Health (NIH)). Furthermore, the contrast was adjusted so that the particles could be clearly distinguished at the surface. Openings were extracted by image recognition, and their inscribed diameters were determined. The number of openings having an inscribed diameter three times or more the number average particle diameter $D_A$ of the particles A determined by the method described below was counted. This evaluation was carried out for five visual fields, and its average value was classified as described below; 3 or higher were evaluated as acceptable.

5: The number of openings is 1 or less
4: The number of openings is more than 1 but not more than 3
3: The number of openings is more than 3 but not more than 5
2: The number of openings is more than 5 but not more than 10
1: The number of openings is more than 10

Calculation of $L_x$ and $S_{Lx}$

The laminated body surface was observed using a scanning electron microscope (SEM). Coordinates of the particles X were determined using image processing software ImageJ, and the average center-to-center distance [nm] between particles of the inorganic particle part of the particles X was determined by the following method.

Specifically, the following procedure was used. Using an image taken at a magnification of 50,000 using SEM (1.8 μm long, 2.5 μm wide), the white balance was adjusted such that the brightest part and the darkest part were included in an 8-bit tone curve using software (image processing software ImageJ/developed by National Institutes of Health (NIH)). Furthermore, the contrast was adjusted so that the inorganic particle part could be clearly distinguished, and then the center coordinate of each inorganic particle part in the image was determined. The center point (center coordinate) of an inorganic particle part of the particles X is defined as the center of the circumcircle of the inorganic particle part.

Next, focusing on one inorganic particle part of the particles X in the image, the distance between the center of the inorganic particle part and the center of an inorganic particle part of the particles X adjacent to the inorganic particle part was determined. In determining the center-to-center distance, the center coordinate of each inorganic particle part previously determined was used.

"Adjacent inorganic particle part" as used herein refers to such an inorganic particle part that there does not exist any other particle on a straight line indicating the center-to-center distance. Further, "adjacent inorganic particle part" may be or may not be in contact with the inorganic particle part (the focused one inorganic particle part of the particles X). "Adjacent inorganic particle part" will be described in more detail with reference to FIG. 4. In FIG. 4, focusing on the inorganic particle part (26) of the particles X, there exists another inorganic particle part (85) of the particles X on a straight line (84) indicating the center-to-center distance between the center of the inorganic particle part (26) of the particles X and the center of an inorganic particle part (23) of the particles X. In this case, the inorganic particle part (23) of the particles X is not an adjacent inorganic particle part of the particles X. On the other hand, there does not exist any other inorganic particle part of the particles X on a straight line (28) indicating the center-to-center distance between the inorganic particle part (26) of the particles X and the inorganic particle part (27) of the particles X. Thus, the inorganic particle part (27) of the particles X is an inorganic particle part adjacent to the inorganic particle part (26) of the particles X. Also, the inorganic particle part (85) and inorganic particle parts (86), (87), (88), and (89) of the particles X are inorganic particle parts adjacent to the inorganic particle part (26) of the particles X.

As described above, there can exist a plurality of "adjacent inorganic particle parts" for one inorganic particle part. Thus, when there exists a plurality of adjacent inorganic particle parts, the center-to-center distance is determined for each of them. In FIG. 4, for example, when the inorganic particle part (26) of the particles X is focused, the center-to-center distance between the inorganic particle part (26) and (27) of the particles X, the center-to-center distance between (26) and (85), the center-to-center distance between (26) and (86), the center-to-center distance between (26) and (87), the center-to-center distance between (26) and (88), and the center-to-center distance between (26) and (89) are each determined.

For every inorganic particle part of the particles X in the image, the center-to-center distance is determined in the same manner. The arithmetic mean value of all the center-to-center distances determined is defined as the average center-to-center distance $L_x$ [nm] between particles of the inorganic particle part of the particles X.

Further, from all the center-to-center distances determined, a standard deviation is determined using the STDEVP function in Excel (2003), and this standard deviation is defined as $S_{Lx}$.

Calculation of $F_{12}$ and $A_{12}$

A cross-section of the laminated body was observed using a transmission electron microscope (TEM), and for the interface defined by the method described in the section of "State of Interface Formed by First Layer and Second Layer," coordinates of a boundary of the two layers were determined using image processing software ImageJ, based on which waveform data were generated, and Fourier transformed to thereby generate a plot of a frequency distribution of a contour curve (abscissa: frequency, ordinate: amplitude), what is called a power spectrum. From the power spectrum, the amplitude at a maximum amplitude point was determined as the amplitude of the contour curve, and the wavelength of the contour curve was determined from the reciprocal of the frequency at this point.

Specifically, the following procedure was used. Using an image of an ultrathin section of the laminated film taken at a magnification of 200,000 using TEM (80 nm long, 600 nm wide), the white balance was adjusted such that the brightest part and the darkest part were included in an 8-bit tone curve using software (image processing software Image)/developed by National Institutes of Health (NIH)). Furthermore, the contrast was adjusted so that the two types of particles could be clearly distinguished, after which binarization was performed, and then coordinates of a boundary were determined. Furthermore, these coordinates of a boundary were Fourier transformed to generate a plot of a frequency distribution of a contour curve (abscissa: frequency, ordinate: amplitude), what is called a power spectrum. From the power spectrum, the amplitude at a maximum amplitude point was determined as the amplitude of the contour curve, and the wavelength of the contour curve was determined from the reciprocal of the frequency at this point, which were defined as $A_{12}$ and $F_{12}$.

Number Average Particle Diameter ($D_X$, $D_Y$)

A cross-section of the first layer and the second layer distinguished by the method described in [State of Interface Formed by First Layer and Second Layer] was observed using a transmission electron microscope (TEM). From the image obtained, outer diameters of 100 inorganic particle parts of the particles X in the first layer were determined using image processing software, and from the values obtained, an arithmetic average diameter by number was calculated according to the calculation method described in JIS Z8819-2 (2001). The value obtained was defined as the number average particle diameter $D_X$ of the particles X. Also for the second layer, the number average particle diameter $D_Y$ of the particles Y was determined in the same manner.

"Outer diameter" as used herein refers to a maximum diameter of a particle (i.e., a major axis of the particle, which means the longest diameter of the particle).

Transparency of Laminated Body

The transparency of the laminated body was determined by measuring a haze value. The haze value was measured in accordance with JIS-K7136 (2000) using a haze meter manufactured by Nippon Denshoku Industries Co., Ltd. such that the haze meter was placed such that light was transmitted through a laminated body sample from the side opposite the support substrate (laminated film side), and haze values of 1.2% or less were evaluated as acceptable.

Transparency of Conductive Layer

The transparency of the conductive laminated body was determined by measuring a haze value of the conductive laminated body produced in Conductive Layer Formation 1. The haze measurement was carried out in accordance with JIS-K7136 (2000) using a haze meter manufactured by Nippon Denshoku Industries Co., Ltd. such that the haze meter was placed such that light was transmitted through a conductive laminated body sample from the side opposite the support substrate (conductive layer side), and haze values of 1.5% or less were evaluated as acceptable.

Surface Resistance Value of Conductive Layer, and Annealing Temperature-Lowering Effect Surface resistance values of the conductive laminated bodies produced in Conductive Layer Formation 1 and 2 were measured by the four-terminal method in accordance with JIS-K7194 (1994). Loresta-EP manufactured by DIA Instruments Co., Ltd. was used as a meter. For the conductivity of the conductive laminated bodies, when the surface resistance value of the conductive laminated body produced in Conductive Layer Formation 1 was 180Ω/□ or less, it was evaluated as acceptable. For the annealing temperature-lowering effect, when the difference between the surface resistance values of the conductive laminated body produced in Conductive Layer Formation 2 (annealed at 130° C.) and the conductive laminated body produced in Conductive Layer Formation 1 (annealed at 160° C.) was 30Ω/□ or less, it was evaluated as acceptable.

Adhesion of Conductive Layer

In the ordinary state (23° C., relative humidity: 65%), 100 crosscuts of 1 cm² were formed on the conductive layer-side surface of the conductive laminated body formed in Conductive Layer Formation 1. Cellophane tape available from Nichiban Co., Ltd. was applied thereto, and a rubber roller was passed back and forth three times at a load of 19.6 N to press the cellophane tape, after which the cellophane tape was peeled off in 90° direction, and evaluation was made on a 5-point scale (5: 91 to 100, 4: 81 to 90, 3: 71 to 80, 2: 61 to 70, 1: 0 to 60) based on the number of conductive layers remained; 3 or more was evaluated as acceptable.

Pattern Visibility of Conductive Layer (Front Observation)

Black tape was applied to the side opposite the conductive layer of the patterned conductive laminated body, and the way the conductive layer pattern was seen when the sample was observed from the front was evaluated on a 5-point scale; 3 or more was evaluated as acceptable according to the following criteria.
  5: Pattern invisible
  4: Pattern slightly visible
  3: Pattern somewhat visible, but not distracting
  2: Pattern somewhat visible, and distracting
  1: Pattern clearly visible Pattern Visibility of Conductive Layer (Oblique Observation)

Black tape was applied to the side opposite the conductive layer of the patterned conductive laminated body, and the way the pattern of the conductive layer was seen when the sample was observed from 40 to 60° direction was evaluated on a 5-point scale; 3 or more was evaluated as acceptable according to the following criteria.
  5: Pattern invisible
  4: Pattern slightly visible
  3: Pattern somewhat visible, but not distracting
  2: Pattern somewhat visible, and distracting
  1: Pattern clearly visible In-Plane Variation of Conductive Layer Pattern For in-plane variation in the way the pattern is seen and color tone of the patterned conductive layer laminated body described above, variation in the width direction (3 points) and the winding direction (3 points) was observed, and 3 or more was evaluated as acceptable according to the following criteria.
  5: The way the conductive layer pattern is seen and color tone appear to be the same at every point.
  4: The way the conductive layer pattern is seen and color tone are slightly different depending on the point.
  3: The way the conductive layer pattern is seen and color tone are somewhat different depending on the point, but not distracting.
  2: The way the conductive layer pattern is seen and color tone are different depending on the point, and distracting.
  1: The way the conductive layer pattern is seen and color tone are distinctly different depending on the point.

Table 1 shows formulations of mixed solutions containing particles a and a fluorine polymer A, the number average molecular weight of the fluorine polymer A, and the percentage of components; Table 2 shows compositions of coating compositions; Table 3 shows component ratios in the coating compositions; Table 4 shows constitutions and evaluation results of support substrates and laminated bodies; and Table 5 shows evaluation results of conductive laminated bodies.

Examples that were not acceptable in any one of the evaluation items were judged as failing to achieve the problems. As shown in Tables 1 to 5, our Examples have achieved both of the first and the second problems.

Example 11 wherein the fluorine compound A used in the coating composition was not the preferred compound was a compound corresponding to PFOA, but the properties of a laminated body were within the allowable range.

Example 14 wherein the number average molecular weight of the fluorine polymer A of the coating composition was smaller than the preferred range was somewhat poor in the state of an interface, transparency of a conductive laminated body, and pattern visibility, but was within the allowable range.

Example 17 wherein the number average molecular weight of the fluorine polymer A of the coating composition was larger than the preferred range was somewhat poor in pattern visibility, but was within the allowable range.

Examples 30 and 31 wherein in the method of producing a laminated body, the zeta potential of the support substrate was larger than the preferred range were somewhat poor in transparency of a laminated body and conductive laminated body, and pattern visibility, but were within the allowable range.

Example 31 wherein in the method of producing a laminated body, the surface free energy of the support substrate was larger than the preferred range was somewhat poor in transparency of a laminated body and conductive laminated body, and pattern visibility, but was within the allowable range.

TABLE 1

| Mixed solution containing particles a and fluorine polymer A | Inorganic particle part | | | Fluorine polymer A | |
|---|---|---|---|---|---|
| | Name | Amount (g) | Number average particle diameter (nm) | Formulation No. (concentration) | Amount (g) |
| 2-1 | Colloidal silica dispersed in IPA (IPA-ST from Nissan Chemical Industries, Ltd., 20% by mass) | 10 | 12 | | |
| 2-2 | Colloidal silica dispersed in IPA (IPA-ST from Nissan Chemical Industries, Ltd., 20% by mass) | 10 | 12 | | |
| 2-3 | Colloidal silica dispersed in IPA (IPA-ST from Nissan Chemical Industries, Ltd., 20% by mass) | 10 | 12 | | |
| 2-4 | Colloidal silica dispersed in IPA (IPA-ST from Nissan Chemical Industries, Ltd., 20% by mass) | 10 | 12 | | |
| 2-5 | Colloidal silica dispersed in IPA (IPA-ST from Nissan Chemical Industries, Ltd., 20% by mass) | 10 | 12 | | |
| 1-1 | Colloidal silica dispersed in IPA (IPA-ST from Nissan Chemical Industries, Ltd., 20% by mass) | 10 | 12 | 1 (25% by mass) | 11 |
| 5-1 | Magnesium fluoride dispersed in IPA (available from CIK NanoTek Corporation, 20% by mass) | 10 | 20 | | |
| 6-1 | Colloidal silica dispersed in IPA (available from JGC C&C., 20% by mass) | 10 | 23 | | |
| 2-6 | Colloidal silica dispersed in IPA (IPA-ST from Nissan Chemical Industries, Ltd., 20% by mass) | 10 | 12 | | |
| 2-7 | Colloidal silica dispersed in IPA (IPA-ST from Nissan Chemical Industries, Ltd., 20% by mass) | 10 | 12 | | |
| 7-1 | Colloidal silica dispersed in IPA (IPA-ST from Nissan Chemical Industries, Ltd., 20% by mass) | 10 | 12 | | |
| 7-2 | Colloidal silica dispersed in IPA (IPA-ST from Nissan Chemical Industries, Ltd., 20% by mass) | 10 | 12 | | |
| 7-3 | Colloidal silica dispersed in IPA (IPA-ST from Nissan Chemical Industries, Ltd., 20% by mass) | 10 | 12 | | |
| 3-1 | Colloidal silica dispersed in IPA (IPA-ST from Nissan Chemical Industries, Ltd., 20% by mass) | 10 | 12 | | |
| 3-2 | Colloidal silica dispersed in IPA (IPA-ST from Nissan Chemical Industries, Ltd., 20% by mass) | 10 | 12 | | |
| 4-1 | Colloidal silica dispersed in IPA (IPA-ST from Nissan Chemical Industries, Ltd., 20% by mass) | 10 | 12 | | |
| 4-2 | Colloidal silica dispersed in IPA (IPA-ST from Nissan Chemical Industries, Ltd., 20% by mass) | 10 | 12 | | |
| 6-2 | Hollow silica dispersed in IPA (available from JGC C&C., 20% by mass) | 10 | 60 | | |
| 6-3 | Hollow silica dispersed in IPA (available from JGC C&C., 20% by mass) | 10 | 40 | | |
| 2-8 | Colloidal silica dispersed in IPA (IPA-ST from Nissan Chemical Industries, Ltd., 20% by mass) | 10 | 12 | | |
| 2-9 | Colloidal silica dispersed in IPA (IPA-ST from Nissan Chemical Industries, Ltd., 20% by mass) | 10 | 12 | | |
| 2-10 | Colloidal silica dispersed in IPA (IPA-ST from Nissan Chemical Industries, Ltd., 20% by mass) | 10 | 12 | | |
| 2-11 | Colloidal silica dispersed in IPA (IPA-ST from Nissan Chemical Industries, Ltd., 20% by mass) | 10 | 12 | | |
| 6-4 | Colloidal silica dispersed in IPA (PL-06-IPA from Fuso Chemical Co., Ltd., 20% by mass) | 10 | 3 | | |
| 8-1 | Colloidal silica dispersed in IPA (available from JGC C&C., 20% by mass) | 10 | 12 | | |
| 8-2 | Colloidal silica dispersed in IPA (available from JGC C&C., 20% by mass) | 10 | 12 | | |
| 8-3 | Colloidal silica dispersed in IPA (available from JGC C&C., 20% by mass) | 10 | 12 | | |
| 8-4 | Colloidal silica dispersed in IPA (available from JGC C&C., 20% by mass) | 10 | 12 | | |
| 8-5 | Colloidal silica dispersed in IPA (available from JGC C&C., 20% by mass) | 10 | 12 | | |
| 8-6 | Colloidal silica dispersed in IPA (available from JGC C&C., 20% by mass) | 10 | 12 | | |

TABLE 1-continued

| | | | |
|---|---|---|---|
| 8-7 | Colloidal silica dispersed in IPA (available from JGC C&C., 20% by mass) | 10 | 12 |
| 8-8 | Colloidal silica dispersed in IPA (available from JGC C&C., 20% by mass) | 10 | 12 |
| 8-9 | Colloidal silica dispersed in IPA (available from JGC C&C., 20% by mass) | 10 | 12 |
| 8-10 | Colloidal silica dispersed in IPA (available from JGC C&C., 20% by mass) | 10 | 12 |
| 8-11 | Colloidal silica dispersed in IPA (available from JGC C&C., 20% by mass) | 10 | 12 |
| 8-12 | Colloidal silica dispersed in IPA (available from JGC C&C., 20% by mass) | 10 | 12 |
| 8-13 | Colloidal silica dispersed in IPA (available from JGC C&C., 20% by mass) | 10 | 12 |
| 8-14 | Colloidal silica dispersed in IPA (available from JGC C&C., 20% by mass) | 10 | 12 |
| 8-15 | Colloidal silica dispersed in IPA (available from JGC C&C., 20% by mass) | 10 | 12 |
| 9-1 | Colloidal silica dispersed in IPA (available from JGC C&C., 20% by mass) | 10 | 12 |
| 9-2 | Colloidal silica dispersed in IPA (available from JGC C&C., 20% by mass) | 10 | 12 |
| 9-3 | Colloidal silica dispersed in IPA (available from JGC C&C., 20% by mass) | 10 | 12 |

| Mixed solution containing particles a and fluorine polymer A | Compound D | | Compound E | | Alkaline buffering capacity (ml) | Fluorine compound A | |
|---|---|---|---|---|---|---|---|
| | Compound name | Amount (g) | Compound name | Amount (g) | | Rational formula | Amount (g) |
| 2-1 | Methacryloxypropyl trimethoxysilane | 1.9 | — | — | — | $C_6F_{13}(CH_2)_6$—OCO—CH=$CH_2$ | 0.75 |
| 2-2 | Methacryloxypropyl trimethoxysilane | 1.7 | — | — | — | $C_6F_{13}(CH_2)_6$—OCO—CH=$CH_2$ | 1 |
| 2-3 | Methacryloxypropyl trimethoxysilane | 2.2 | — | — | — | $C_6F_{13}(CH_2)_6$—OCO—CH=$CH_2$ | 0.5 |
| 2-4 | Methacryloxypropyl trimethoxysilane | 2.1 | — | — | — | $C_6F_{13}(CH_2)_6$—OCO—CH=$CH_2$ | 1.9 |
| 2-5 | Methacryloxypropyl trimethoxysilane | 0.69 | — | — | — | $C_6F_{13}(CH_2)_6$—OCO—CH=$CH_2$ | 0.63 |
| 1-1 | — | — | — | — | — | — | — |
| 5-1 | Methacryloxypropyl trimethoxysilane | 1.9 | — | — | — | $C_6F_{13}(CH_2)_6$—OCO—CH=$CH_2$ | 0.75 |
| 6-1 | Methacryloxypropyl trimethoxysilane | 1.9 | — | — | — | $C_6F_{13}(CH_2)_6$—OCO—CH=$CH_2$ | 0.75 |
| 2-6 | Methacryloxypropyl trimethoxysilane | 2.8 | — | — | — | $C_6F_{13}(CH_2)_6$—OCO—CH=$CH_2$ | 2.5 |
| 2-7 | Methacryloxypropyl trimethoxysilane | 0.6 | — | — | — | $C_6F_{13}(CH_2)_6$—OCO—CH=$CH_2$ | 0.5 |
| 7-1 | Methacryloxypropyl trimethoxysilane | 1.9 | — | — | — | $C_8F_{17}(CH_2)_2$—OCO—CH=$CH_2$ | 0.75 |
| 7-2 | Methacryloxypropyl trimethoxysilane | 1.9 | — | — | — | $C_4F_9(CH_2)_4$—OCO—CH=$CH_2$ | 0.75 |
| 7-3 | Methacryloxypropyl trimethoxysilane | 1.9 | — | — | — | $C_6F_{13}(CH_2)_6$—OCO—CH=$CH_2$ | 0.75 |
| 3-1 | Methacryloxypropyl trimethoxysilane | 1.9 | — | — | — | $C_6F_{13}(CH_2)_6$—OCO—CH=$CH_2$ | 0.75 |
| 3-2 | Methacryloxypropyl trimethoxysilane | 1.9 | — | — | — | $C_6F_{13}(CH_2)_6$—OCO—CH=$CH_2$ | 0.75 |
| 4-1 | Methacryloxypropyl trimethoxysilane | 1.9 | — | — | — | $C_6F_{13}(CH_2)_6$—OCO—CH=$CH_2$ | 0.75 |
| 4-2 | Methacryloxypropyl trimethoxysilane | 1.9 | — | — | — | $C_6F_{13}(CH_2)_6$—OCO—CH=$CH_2$ | 0.75 |
| 6-2 | Methacryloxypropyl trimethoxysilane | 0.92 | — | — | — | $C_8F_{17}(CH_2)_2$—OCO—CH=$CH_2$ | 0.93 |
| 6-3 | Methacryloxypropyl trimethoxysilane | 1.37 | — | — | — | $C_8F_{17}(CH_2)_2$—OCO—CH=$CH_2$ | 1.38 |
| 2-8 | Methacryloxypropyl trimethoxysilane | 4.1 | — | — | — | $C_6F_{13}(CH_2)_6$—OCO—CH=$CH_2$ | 3.8 |
| 2-9 | Methacryloxypropyl trimethoxysilane | 0.28 | — | — | — | $C_6F_{13}(CH_2)_6$—OCO—CH=$CH_2$ | 0.25 |
| 2-10 | Methacryloxypropyl trimethoxysilane | 0.4 | — | — | — | $C_6F_{13}(CH_2)_6$—OCO—CH=$CH_2$ | 2.1 |
| 2-11 | Methacryloxypropyl trimethoxysilane | 2.5 | — | — | — | $C_6F_{13}(CH_2)_6$—OCO—CH=$CH_2$ | 0.25 |
| 6-4 | Methacryloxypropyl trimethoxysilane | 4.1 | — | — | — | $C_6F_{13}(CH_2)_6$—OCO—CH=$CH_2$ | 3.8 |

TABLE 1-continued

| | | | | | | | |
|---|---|---|---|---|---|---|---|
| 8-1 | Methacryloxypropyl trimethoxysilane | 1.15 | γ-butyrolactone acrylate | 0.75 | 9 | $C_6F_{13}(CH_2)_6$—OCO—CH=CH$_2$ | 0.75 |
| 8-2 | Methacryloxypropyl trimethoxysilane | 1.15 | δ-valerolactone acrylate | 0.75 | 8 | $C_6F_{13}(CH_2)_6$—OCO—CH=CH$_2$ | 0.75 |
| 8-3 | Methacryloxypropyl trimethoxysilane | 1.15 | γ-butyrolactone methacrylate | 0.75 | 8 | $C_6F_{13}(CH_2)_6$—OCO—CH=CH$_2$ | 0.75 |
| 8-4 | Methacryloxypropyl trimethoxysilane | 1.15 | 2-hydroxyethyl acrylate | 0.75 | 7 | $C_6F_{13}(CH_2)_6$—OCO—CH=CH$_2$ | 0.75 |
| 8-5 | Methacryloxypropyl trimethoxysilane | 1.15 | 2-hydroxybutyl acrylate | 0.75 | 7 | $C_6F_{13}(CH_2)_6$—OCO—CH=CH$_2$ | 0.75 |
| 8-6 | Methacryloxypropyl trimethoxysilane | 1.15 | 2-acryloyloxyethylsuccinic acid | 0.75 | 6 | $C_6F_{13}(CH_2)_6$—OCO—CH=CH$_2$ | 0.75 |
| 8-7 | Methacryloxypropyl trimethoxysilane | 1.15 | 2-acryloyloxyethyl-2-hydroxyethylphtalic acid | 0.75 | 6 | $C_6F_{13}(CH_2)_6$—OCO—CH=CH$_2$ | 0.75 |
| 8-8 | Methacryloxypropyl trimethoxysilane | 1.15 | Neopentyl glycol diacrylate | 0.75 | 1 | $C_6F_{13}(CH_2)_6$—OCO—CH=CH$_2$ | 0.75 |
| 8-9 | Methacryloxypropyl trimethoxysilane | 1.15 | Diethylene glycol dimethacrylate | 0.75 | 1 | $C_6F_{13}(CH_2)_6$—OCO—CH=CH$_2$ | 0.75 |
| 8-10 | Methacryloxypropyl trimethoxysilane | 1.15 | Ethoxylated bisphenol A diacrylate | 0.75 | 1 | $C_6F_{13}(CH_2)_6$—OCO—CH=CH$_2$ | 0.75 |
| 8-11 | Methacryloxypropyl trimethoxysilane | 1.15 | Acryloyl morpholine | 0.75 | 1 | $C_6F_{13}(CH_2)_6$—OCO—CH=CH$_2$ | 0.75 |
| 8-12 | Methacryloxypropyl trimethoxysilane | 1.15 | Dimethylacrylamide | 0.75 | 1 | $C_6F_{13}(CH_2)_6$—OCO—CH=CH$_2$ | 0.75 |
| 8-13 | Methacryloxypropyl trimethoxysilane | 1.15 | Pentaerythritol triacrylate | 0.75 | 6 | $C_6F_{13}(CH_2)_6$—OCO—CH=CH$_2$ | 0.75 |
| 8-14 | Methacryloxypropyl trimethoxysilane | 1.15 | Pentaerythritol trimethacrylate | 0.75 | 6 | $C_6F_{13}(CH_2)_6$—OCO—CH=CH$_2$ | 0.75 |
| 8-15 | Methacryloxypropyl trimethoxysilane | 1.15 | Trimethylolpropane triacrylate | 0.75 | 1 | $C_6F_{13}(CH_2)_6$—OCO—CH=CH$_2$ | 0.75 |
| 9-1 | Methacryloxypropyl trimethoxysilane | 1.53 | γ-butyrolactone acrylate | 0.37 | 7 | $C_6F_{13}(CH_2)_6$—OCO—CH=CH$_2$ | 0.75 |
| 9-2 | Methacryloxypropyl trimethoxysilane | 1.53 | Pentaerythritol triacrylate | 0.37 | 5 | $C_6F_{13}(CH_2)_6$—OCO—CH=CH$_2$ | 0.75 |
| 9-3 | Methacryloxypropyl trimethoxysilane | 1.53 | Dipentaerythritol hexaacrylate | 0.37 | 1 | $C_6F_{13}(CH_2)_6$—OCO—CH=CH$_2$ | 0.75 |

| Mixed solution containing particles a and fluorine polymer A | Polymerization initiator | | Catalyst | | Water |
|---|---|---|---|---|---|
| | Compound name | Amount (g) | Rational formula (concentration) | Amount (g) | Amount (g) |
| 2-1 | 2,2-azobis(2,4-dimethylvaleronitrile) | 0.096 | HCOOH (10% by mass) | 0.17 | 0.3 |
| 2-2 | 2,2-azobis(2,4-dimethylvaleronitrile) | 0.096 | HCOOH (10% by mass) | 0.17 | 0.3 |
| 2-3 | 2,2-azobis(2,4-dimethylvaleronitrile) | 0.1 | HCOOH (10% by mass) | 0.17 | 0.3 |
| 2-4 | 2,2-azobis(2,4-dimethylvaleronitrile) | 0.13 | HCOOH (10% by mass) | 0.22 | 0.4 |
| 2-5 | 2,2-azobis(2,4-dimethylvaleronitrile) | 0.065 | HCOOH (10% by mass) | 0.15 | 0.26 |
| 1-1 | — | — | HCOOH (10% by mass) | 0.17 | 0.3 |
| 5-1 | 2,2-azobis(2,4-dimethylvaleronitrile) | 0.096 | HCOOH (10% by mass) | 0.17 | 0.3 |
| 6-1 | 2,2-azobis(2,4-dimethylvaleronitrile) | 0.096 | HCOOH (10% by mass) | 0.17 | 0.3 |
| 2-6 | 2,2-azobis(2,4-dimethylvaleronitrile) | 0.17 | HCOOH (10% by mass) | 0.26 | 0.46 |
| 2-7 | 2,2-azobis(2,4-dimethylvaleronitrile) | 0.06 | HCOOH (10% by mass) | 0.15 | 0.26 |
| 7-1 | 2,2-azobis(2,4-dimethylvaleronitrile) | 0.096 | HCOOH (10% by mass) | 0.17 | 0.3 |
| 7-2 | 2,2-azobis(2,4-dimethylvaleronitrile) | 0.096 | HCOOH (10% by mass) | 0.17 | 0.3 |
| 7-3 | 2,2-azobis(2,4-dimethylvaleronitrile) | 0.096 | HCOOH (10% by mass) | 0.17 | 0.3 |
| 3-1 | 2,2-azobis(2,4-dimethylvaleronitrile) | 0.029 | HCOOH (10% by mass) | 0.17 | 0.3 |
| 3-2 | 2,2-azobis(2,4-dimethylvaleronitrile) | 0.04 | HCOOH (10% by mass) | 0.17 | 0.3 |

TABLE 1-continued

| Mixed solution containing particles a and fluorine polymer A | Number average molecular weight of fluorine polymer A | Component ratio in solid content | | |
|---|---|---|---|---|
| | | Fluorine polymer A (% by mass) | Inorganic particles (% by mass) | Part derived from fluorine polymer A (% by mass) |
| 2-1 | 12000 | 28.5 | 43 | 28.5 |
| 2-2 | 15000 | 37 | 43 | 20 |
| 2-3 | 10000 | 14 | 43 | 43 |
| 2-4 | 17000 | 10 | 33.6 | 56.4 |
| 2-5 | 8000 | 32 | 60 | 8 |
| 1-1 | 18500 | 40 | 43 | 17 |
| 5-1 | 16000 | 31.4 | 43 | 25.6 |
| 6-1 | 17000 | 17 | 43 | 40 |
| 2-6 | 15000 | 7.3 | 27.5 | 65.2 |
| 2-7 | 9000 | 29 | 66 | 5 |
| 7-1 | 13000 | 28.5 | 43 | 28.5 |
| 7-2 | 9000 | 28.5 | 43 | 28.5 |
| 7-3 | 11000 | 28.5 | 43 | 28.5 |
| 3-1 | 4000 | 22.8 | 43 | 34.2 |
| 3-2 | 5000 | 22.8 | 43 | 34.2 |

| Mixed solution containing particles a and fluorine polymer A | Polymerization initiator | | Catalyst | | Water |
|---|---|---|---|---|---|
| | Compound name | Amount (g) | Rational formula (concentration) | Amount (g) | Amount (g) |
| 4-1 | 2,2-azobis isobutyronitrile | 0.075 | HCOOH (10% by mass) | 0.17 | 0.3 |
| 4-2 | 2,2-azobis isobutyronitrile | 0.086 | HCOOH (10% by mass) | 0.17 | 0.3 |
| 6-2 | 2,2-azobis (2,4-dimethylvaleronitrile) | 0.07 | HCOOH (10% by mass) | 0.1 | 0.2 |
| 6-3 | 2,2-azobis (2,4-dimethylvaleronitrile) | 0.087 | HCOOH (10% by mass) | 0.17 | 0.3 |
| 2-8 | 2,2-azobis (2,4-dimethylvaleronitrile) | 0.2 | HCOOH (10% by mass) | 0.3 | 0.54 |
| 2-9 | 2,2-azobis (2,4-dimethylvaleronitrile) | 0.06 | HCOOH (10% by mass) | 0.14 | 0.25 |
| 2-10 | 2,2-azobis (2,4-dimethylvaleronitrile) | 0.091 | HCOOH (10% by mass) | 0.14 | 0.26 |
| 2-11 | 2,2-azobis (2,4-dimethylvaleronitrile) | 0.096 | HCOOH (10% by mass) | 0.21 | 0.38 |
| 6-4 | 2,2-azobis (2,4-dimethylvaleronitrile) | 0.2 | HCOOH (10% by mass) | 0.3 | 0.54 |
| 8-1 | 2,2-azobis (2,4-dimethylvaleronitrile) | 0.096 | HCOOH (10% by mass) | 0.17 | 0.3 |
| 8-2 | 2,2-azobis (2,4-dimethylvaleronitrile) | 0.096 | HCOOH (10% by mass) | 0.17 | 0.3 |
| 8-3 | 2,2-azobis (2,4-dimethylvaleronitrile) | 0.096 | HCOOH (10% by mass) | 0.17 | 0.3 |
| 8-4 | 2,2-azobis (2,4-dimethylvaleronitrile) | 0.096 | HCOOH (10% by mass) | 0.17 | 0.3 |
| 8-5 | 2,2-azobis (2,4-dimethylvaleronitrile) | 0.096 | HCOOH (10% by mass) | 0.17 | 0.3 |
| 8-6 | 2,2-azobis (2,4-dimethylvaleronitrile) | 0.096 | HCOOH (10% by mass) | 0.17 | 0.3 |

| Mixed solution containing particles a and fluorine polymer A | Number average molecular weight of fluorine polymer A | Component ratio in solid content | | |
|---|---|---|---|---|
| | | Fluorine polymer A (% by mass) | Inorganic particles (% by mass) | Part derived from fluorine polymer A (% by mass) |
| 4-1 | 20000 | 34.2 | 43 | 22.8 |
| 4-2 | 25000 | 34.2 | 43 | 22.8 |
| 6-2 | 17000 | 24 | 52 | 24 |
| 6-3 | 15000 | 34.8 | 42 | 23.2 |
| 2-8 | 30000 | 4 | 20.2 | 75.8 |
| 2-9 | 4000 | 18.3 | 79.2 | 2.5 |
| 2-10 | 6000 | 47.6 | 44 | 8.4 |
| 2-11 | 6000 | 6.9 | 42.3 | 50.8 |
| 6-4 | 30000 | 4 | 20.2 | 75.8 |
| 8-1 | 14000 | 28.5 | 43 | 28.5 |
| 8-2 | 16000 | 28.5 | 43 | 28.5 |

TABLE 1-continued

| | | | | |
|---|---|---|---|---|
| 8-3 | 13000 | 28.5 | 43 | 28.5 |
| 8-4 | 12000 | 28.5 | 43 | 28.5 |
| 8-5 | 15000 | 28.5 | 43 | 28.5 |
| 8-6 | 15000 | 28.5 | 43 | 28.5 |

| Mixed solution Containing particles a and fluorine polymer A | Polymerization initiator Compound name | Amount (g) | Catalyst Rational formula (concentration) | Amount (g) | Water Amount (g) |
|---|---|---|---|---|---|
| 8-7 | 2,2-azobis(2,4-dimethylvaleronitrile) | 0.096 | HCOOH (10% by mass) | 0.17 | 0.3 |
| 8-8 | 2,2-azobis(2,4-dimethylvaleronitrile) | 0.096 | HCOOH (10% by mass) | 0.17 | 0.3 |
| 8-9 | 2,2-azobis(2,4-dimethylvaleronitrile) | 0.096 | HCOOH (10% by mass) | 0.17 | 0.3 |
| 8-10 | 2,2-azobis(2,4-dimethylvaleronitrile) | 0.096 | HCOOH (10% by mass) | 0.17 | 0.3 |
| 8-11 | 2,2-azobis(2,4-dimethylvaleronitrile) | 0.096 | HCOOH (10% by mass) | 0.17 | 0.3 |
| 8-12 | 2,2-azobis(2,4-dimethylvaleronitrile) | 0.096 | HCOOH (10% by mass) | 0.17 | 0.3 |
| 8-13 | 2,2-azobis(2,4-dimethylvaleronitrile) | 0.096 | HCOOH (10% by mass) | 0.17 | 0.3 |
| 8-14 | 2,2-azobis(2,4-dimethylvaleronitrile) | 0.096 | HCOOH (10% by mass) | 0.17 | 0.3 |
| 8-15 | 2,2-azobis(2,4-dimethylvaleronitrile) | 0.096 | HCOOH (10% by mass) | 0.17 | 0.3 |
| 9-1 | 2,2-azobis(2,4-dimethylvaleronitrile) | 0.096 | HCOOH (10% by mass) | 0.17 | 0.3 |
| 9-2 | 2,2-azobis(2,4-dimethylvaleronitrile) | 0.096 | HCOOH (10% by mass) | 0.17 | 0.3 |
| 9-3 | 2,2-azobis(2,4-dimethylvaleronitrile) | 0.096 | HCOOH (10% by mass) | 0.17 | 0.3 |

| Mixed solution containing particles a and fluorine polymer A | Number average molecular weight of fluorine polymer A | Component ratio in solid content | | |
|---|---|---|---|---|
| | | Fluorine polymer A (% by mass) | Inorganic particles (% by mass) | Part derived from fluorine polymer A (% by mass) |
| 8-7 | 14000 | 28.5 | 43 | 28.5 |
| 8-8 | 16000 | 28.5 | 43 | 28.5 |
| 8-9 | 10000 | 28.5 | 43 | 28.5 |
| 8-10 | 14000 | 28.5 | 43 | 28.5 |
| 8-11 | 12000 | 28.5 | 43 | 28.5 |
| 8-12 | 11000 | 28.5 | 43 | 28.5 |
| 8-13 | 15000 | 28.5 | 43 | 28.5 |
| 8-14 | 13000 | 28.5 | 43 | 28.5 |
| 8-15 | 15000 | 28.5 | 43 | 28.5 |
| 9-1 | 12000 | 28.5 | 43 | 28.5 |
| 9-2 | 11000 | 28.5 | 43 | 28.5 |
| 9-3 | 17000 | 28.5 | 43 | 28.5 |

TABLE 2

| Coating composition | Component ratio in coating composition (Parts by mass) | | | | | | | | Zeta potential of whole particles b (mv) |
|---|---|---|---|---|---|---|---|---|---|
| | Mixed solution containing particles a and fluorine polymer A | | Fluorine polymer A (3.5% by mass MEK solution) | | Fluorine compound A | | Particles b | | |
| | Formulation | Parts by mass | Formulation | Parts by mass | Rational formula | Parts by mass | Formulation | Parts by mass | |
| 1 | 2-1 | 50.3 | 1 | 2.7 | — | — | 1 | 7.8 | −20 |
| 2 | 2-2 | As above | As above | As above | — | As above | As above | As above | −20 |
| 3 | 2-3 | As above | As above | As above | — | As above | As above | As above | −20 |
| 4 | 2-4 | As above | As above | As above | — | As above | As above | As above | −20 |
| 5 | 2-5 | As above | As above | As above | — | As above | As above | As above | −20 |
| 6 | 1-1 | As above | As above | As above | As above | As above | As above | As above | −20 |

TABLE 2-continued

| | | | | | | | | | |
|---|---|---|---|---|---|---|---|---|---|
| 7 | 5-1 | As above | As above | As above | As above | As above | As above | As above | −20 |
| 8 | 6-1 | As above | As above | As above | As above | As above | As above | As above | −20 |
| 9 | 2-5 | As above | As above | As above | As above | As above | As above | As above | −20 |
| 10 | 2-6 | As above | As above | As above | As above | As above | As above | As above | −20 |
| 11 | 7-1 | As above | As above | As above | As above | As above | As above | As above | −20 |
| 12 | 7-2 | As above | As above | As above | As above | As above | As above | As above | −20 |
| 13 | 7-3 | As above | As above | As above | As above | As above | As above | As above | −20 |
| 14 | 3-1 | As above | As above | As above | As above | As above | As above | As above | −20 |
| 15 | 3-2 | As above | As above | As above | As above | As above | As above | As above | −20 |
| 16 | 4-1 | As above | As above | As above | As above | As above | As above | As above | −20 |
| 17 | 4-2 | As above | As above | As above | As above | As above | As above | As above | −20 |
| 18 | 2-1 | 53.0 | — | — | $C_6F_{13}(CH_2)_6$—OCO—CH=CH$_2$ | 0.15 | As above | 7.8 | −20 |
| 19 | 2-1 | As above | 1 | 2.7 | — | — | As above | 9.1 | −20 |
| 20 | 2-3 | 50.3 | 1 | 2.7 | As above | As above | 2 | 7.8 | −80 |
| 21 | 2-2 | 34.2 | 1 | 1.8 | As above | As above | As above | 4.8 | −80 |
| 22 | 2-3 | 34.2 | 1 | 1.8 | As above | As above | As above | 10.4 | −80 |
| 23 | 2-2 | 67.3 | 1 | 3.5 | As above | As above | As above | 4.7 | −80 |
| 24 | 2-1 | 66.5 | 1 | 3.5 | As above | As above | As above | 10.2 | −80 |
| 25 | 2-1 | 50.3 | 2 | 2.7 | As above | As above | As above | 7.8 | −80 |
| 26 | As above | As above | 1 | As above | As above | As above | As above | As above | −80 |
| 27 | As above | As above | As above | As above | As above | As above | As above | As above | −80 |
| 28 | — | — | As above | 53 | As above | As above | As above | 7.8 | −80 |
| 29 | 6-2 | 50.0 | — | — | $C_8F_{17}(CH_2)_2$—OCO—CH=CH$_2$ | 3 | 2 | 27 | −80 |
| 30 | 6-3 | 40 | — | — | — | — | 1 | 4.4 | −20 |
| 31 | 2-8 | 50.3 | 1 | 2.7 | As above | As above | As above | 7.8 | −20 |
| 32 | 2-9 | As above | As above | As above | As above | As above | As above | As above | −20 |
| 33 | 2-10 | As above | As above | As above | As above | As above | As above | As above | −20 |
| 34 | 2-11 | As above | As above | As above | As above | As above | As above | As above | −20 |
| 35 | 6-4 | As above | As above | As above | As above | As above | As above | As above | −20 |
| 36 | 8-1 | As above | As above | As above | As above | As above | As above | As above | −20 |
| 37 | 8-2 | As above | As above | As above | As above | As above | As above | As above | −20 |
| 38 | 8-3 | As above | As above | As above | As above | As above | As above | As above | −20 |
| 39 | 8-4 | As above | As above | As above | As above | As above | As above | As above | −20 |
| 40 | 8-5 | As above | As above | As above | As above | As above | As above | As above | −20 |
| 41 | 8-6 | As above | As above | As above | As above | As above | As above | As above | −20 |
| 42 | 8-7 | As above | As above | As above | As above | As above | As above | As above | −20 |
| 43 | 8-8 | As above | As above | As above | As above | As above | As above | As above | −20 |
| 44 | 8-9 | As above | As above | As above | As above | As above | As above | As above | −20 |
| 45 | 8-10 | As above | As above | As above | As above | As above | As above | As above | −20 |
| 46 | 8-11 | As above | As above | As above | As above | As above | As above | As above | −20 |
| 47 | 8-12 | As above | As above | As above | As above | As above | As above | As above | −20 |
| 48 | 8-13 | As above | As above | As above | As above | As above | As above | As above | −20 |
| 49 | 8-14 | As above | As above | As above | As above | As above | As above | As above | −20 |
| 50 | 8-15 | As above | As above | As above | As above | As above | As above | As above | −20 |
| 51 | 9-1 | As above | As above | As above | As above | As above | As above | As above | −20 |
| 52 | 9-2 | As above | As above | As above | As above | As above | As above | As above | −20 |
| 53 | 9-3 | As above | As above | As above | As above | As above | As above | As above | −20 |
| 54 | 2-1 | As above | As above | As above | As above | As above | 3 | As above | −50 |
| 55 | 2-1 | As above | As above | As above | As above | As above | 4 | As above | −62 |

| | Component ratio in coating composition (Parts by mass) | | | | | | | |
|---|---|---|---|---|---|---|---|---|
| Coating composition | Binder material | | Photopolymerization initiator | | Organic solvent | | | |
| | Name | Parts by mass | Name | Parts by mass | Name | Parts by mass | Name | Parts by mass |
| 1 | PETA | 1.56 | Irg127 | 0.26 | Methyl ethyl ketone | 26.4 | Ethylene glycol monobutyl ether acetate | 11 |
| 2 | As above | As above | As above | As above | As above | As above | As above | As above |
| 3 | As above | As above | As above | As above | As above | As above | As above | As above |
| 4 | As above | As above | As above | As above | As above | As above | As above | As above |
| 5 | As above | As above | As above | As above | As above | As above | As above | As above |
| 6 | As above | As above | As above | As above | As above | As above | As above | As above |
| 7 | As above | As above | As above | As above | As above | As above | As above | As above |
| 8 | As above | As above | As above | As above | As above | As above | As above | As above |
| 9 | As above | As above | As above | As above | As above | As above | As above | As above |
| 10 | As above | As above | As above | As above | As above | As above | As above | As above |
| 11 | As above | As above | As above | As above | As above | As above | As above | As above |
| 12 | As above | As above | As above | As above | As above | As above | As above | As above |
| 13 | As above | As above | As above | As above | As above | As above | As above | As above |
| 14 | As above | As above | As above | As above | As above | As above | As above | As above |
| 15 | As above | As above | As above | As above | As above | As above | As above | As above |

TABLE 2-continued

| | | | | | | | | |
|---|---|---|---|---|---|---|---|---|
| 16 | As above | As above | As above | As above | As above | As above | As above | As above |
| 17 | As above | As above | As above | As above | As above | As above | As above | As above |
| 18 | As above | As above | As above | As above | As above | As above | As above | As above |
| 19 | As above | 1.2 | As above | As above | As above | As above | As above | As above |
| 20 | As above | 1.56 | As above | As above | As above | As above | As above | 10 |
| 21 | As above | 0.96 | As above | 0.16 | As above | 48 | As above | As above |
| 22 | As above | 2.1 | As above | 0.36 | As above | 41.6 | As above | As above |
| 23 | As above | 0.95 | As above | 0.16 | As above | 13.3 | As above | As above |
| 24 | As above | 2 | As above | 0.34 | — | — | As above | As above |
| 25 | As above | 1.56 | As above | 0.26 | Methyl ethyl ketone | 26.4 | As above | 11 |
| 26 | DPPA | As above | As above | As above | As above | As above | As above | As above |
| 27 | UA-306T | As above | As above | As above | As above | As above | As above | As above |
| 28 | PETA | As above | As above | 0.26 | As above | As above | As above | As above |
| 29 | As above | 6.74 | As above | 0.34 | As above | 7.63 | As above | 8.32 |
| 30 | As above | 0.84 | As above | 0.16 | As above | 49.1 | As above | 5.5 |
| 31 | As above | 1.56 | As above | 0.26 | As above | 26.4 | As above | 11 |
| 32 | As above | As above | As above | As above | As above | As above | As above | As above |
| 33 | As above | As above | As above | As above | As above | As above | As above | As above |
| 34 | As above | As above | As above | As above | As above | As above | As above | As above |
| 35 | As above | As above | As above | As above | As above | As above | As above | As above |
| 36 | As above | As above | As above | As above | As above | As above | As above | As above |
| 37 | As above | As above | As above | As above | As above | As above | As above | As above |
| 38 | As above | As above | As above | As above | As above | As above | As above | As above |
| 39 | As above | As above | As above | As above | As above | As above | As above | As above |
| 40 | As above | As above | As above | As above | As above | As above | As above | As above |
| 41 | As above | As above | As above | As above | As above | As above | As above | As above |
| 42 | As above | As above | As above | As above | As above | As above | As above | As above |
| 43 | As above | As above | As above | As above | As above | As above | As above | As above |
| 44 | As above | As above | As above | As above | As above | As above | As above | As above |
| 45 | As above | As above | As above | As above | As above | As above | As above | As above |
| 46 | As above | As above | As above | As above | As above | As above | As above | As above |
| 47 | As above | As above | As above | As above | As above | As above | As above | As above |
| 48 | As above | As above | As above | As above | As above | As above | As above | As above |
| 49 | PETA | 1.56 | Irg127 | 0.26 | Methyl ethyl ketone | 26.4 | Ethylene glycol monobutyl ether acetate | 11 |
| 50 | As above | As above | As above | As above | As above | As above | As above | As above |
| 51 | As above | As above | As above | As above | As above | As above | As above | As above |
| 52 | As above | As above | As above | As above | As above | As above | As above | As above |
| 53 | As above | As above | As above | As above | As above | As above | As above | As above |
| 54 | As above | As above | As above | As above | As above | As above | As above | As above |
| 55 | As above | As above | As above | As above | As above | As above | As above | As above |

TABLE 3

| | Component ratio in coating composition (Parts by mass) | | | | |
|---|---|---|---|---|---|
| Coating composition | (1) Fluorine polymer A | (2) Part derived from fluorine polymer A in particles a | (3) Part derived from fluorine compound A in fluorine polymer A | (4) Fluorine compound A | (5) Binder material |
| 1 | 19.5 | 19.5 | 17.5 | 0 | 61 |
| 2 | 25.4 | 13.6 | 25.4 | 0 | 61 |
| 3 | 10 | 29 | 18.7 | 0 | 61 |
| 4 | 6.3 | 35.7 | 29.4 | 0 | 58 |
| 5 | 24 | 6 | 4.5 | 0 | 70 |
| 6 | 27.3 | 11.7 | 11.7 | 0 | 61 |
| 7 | 21.4 | 17.6 | 15.6 | 0 | 61 |
| 8 | 11.7 | 27.3 | 23.4 | 0 | 61 |
| 9 | 6 | 49 | 44.0 | 0 | 45 |
| 10 | 23 | 4.0 | 2.7 | 0 | 73 |
| 11 | 19.5 | 19.5 | 17.5 | 0 | 61 |
| 12 | 19.5 | 19.5 | 7.8 | 0 | 61 |
| 13 | 19.5 | 19.5 | 13.6 | 0 | 61 |
| 14 | 15.6 | 23.4 | 19.5 | 0 | 61 |
| 15 | 15.6 | 23.4 | 19.5 | 0 | 61 |
| 16 | 23.4 | 15.6 | 14.8 | 0 | 61 |
| 17 | 23.4 | 15.6 | 14.8 | 0 | 61 |
| 18 | 25.4 | 13.6 | 25.4 | 3 | 58 |
| 19 | 29 | 5 | 3.4 | 0 | 66 |
| 20 | 10 | 29 | 18.7 | 0 | 61 |
| 21 | 26.6 | 14.4 | 26.7 | 0 | 59 |
| 22 | 6 | 19 | 5.0 | 0 | 75 |
| 23 | 36 | 19 | 36.0 | 0 | 45 |
| 24 | 19.5 | 19.5 | 17.5 | 0 | 61 |
| 25 | 19.5 | 19.5 | 17.5 | 0 | 61 |
| 26 | 19.5 | 19.5 | 17.5 | 0 | 61 |
| 27 | 19.5 | 19.5 | 17.5 | 0 | 61 |
| 28 | 39 | — | 17.5 | 0 | 61 |
| 29 | 2.00 | 2.00 | 1.6 | 58 | 38 |
| 30 | 33.60 | 22.40 | 19.6 | 0 | 44 |
| 31 | 2.3 | 44.7 | 42.3 | 0 | 53 |
| 32 | 16.7 | 2.3 | 1.3 | 0 | 81 |
| 33 | 32.3 | 5.7 | 32.3 | 0 | 62 |
| 34 | 4.70 | 34.30 | 2.7 | 0 | 61 |
| 35 | 2.3 | 44.7 | 42.3 | 0 | 53 |
| 36 | 19.5 | 19.5 | 17.5 | 0 | 61 |
| 37 | 19.5 | 19.5 | 17.5 | 0 | 61 |
| 38 | 19.5 | 19.5 | 17.5 | 0 | 61 |
| 39 | 19.5 | 19.5 | 17.5 | 0 | 61 |
| 40 | 19.5 | 19.5 | 17.5 | 0 | 61 |
| 41 | 19.5 | 19.5 | 17.5 | 0 | 61 |
| 42 | 19.5 | 19.5 | 17.5 | 0 | 61 |
| 43 | 19.5 | 19.5 | 17.5 | 0 | 61 |
| 44 | 19.5 | 19.5 | 17.5 | 0 | 61 |
| 45 | 19.5 | 19.5 | 17.5 | 0 | 61 |
| 46 | 19.5 | 19.5 | 17.5 | 0 | 61 |

TABLE 3-continued

| | | | | | |
|---|---|---|---|---|---|
| 47 | 19.5 | 19.5 | 17.5 | 0 | 61 |
| 48 | 19.5 | 19.5 | 17.5 | 0 | 61 |
| 49 | 19.5 | 19.5 | 17.5 | 0 | 61 |
| 50 | 19.5 | 19.5 | 17.5 | 0 | 61 |
| 51 | 19.5 | 19.5 | 17.5 | 0 | 61 |
| 52 | 19.5 | 19.5 | 17.5 | 0 | 61 |
| 53 | 19.5 | 19.5 | 17.5 | 0 | 61 |
| 54 | 19.5 | 19.5 | 17.5 | 0 | 61 |
| 55 | 19.5 | 19.5 | 17.5 | 0 | 61 |

| | Component ratio in coating composition (Parts by mass) | | |
|---|---|---|---|
| Coating composition | Requirement 1 ((1) + (2) + (4)):(5) | Requirement 2 ((1) + (2)):(2) | Requirement 3 ((1) + (2)):(3) |
| 1 | 39:61 | 39:19.5 | 39:17.5 |
| 2 | 39:61 | 39:13.6 | 39:25.4 |
| 3 | 39:61 | 39:29 | 39:18.7 |
| 4 | 42:58 | 42:35.7 | 42:29.4 |
| 5 | 30:70 | 30:6 | 30:4.5 |
| 6 | 39:61 | 39:11.7 | 39:11.7 |
| 7 | 39:61 | 39:17.6 | 39:15.6 |
| 8 | 39:61 | 39:27.3 | 39:23.4 |
| 9 | 55:45 | 55:49 | 55:44 |
| 10 | 27:73 | 27:4 | 27:2.7 |
| 11 | 39:61 | 39:19.5 | 39:17.5 |
| 12 | 39:61 | 39:19.5 | 39:7.8 |
| 13 | 39:61 | 39:19.5 | 39:13.6 |
| 14 | 39:61 | 39:23.4 | 39:19.5 |
| 15 | 39:61 | 39:23.4 | 39:19.5 |
| 16 | 39:61 | 39:15.6 | 39:14.8 |
| 17 | 39:61 | 39:15.6 | 39:14.8 |
| 18 | 42:58 | 39:13.6 | 39:25.4 |
| 19 | 34:66 | 34:5 | 34:3.4 |
| 20 | 39:61 | 39:29 | 39:18.7 |
| 21 | 41:59 | 41:14.4 | 41:26.7 |
| 22 | 25:75 | 25:19 | 25:5 |
| 23 | 55:45 | 55:19 | 55:36 |
| 24 | 39:61 | 39:19.5 | 39:17.5 |
| 25 | 39:61 | 39:19.5 | 39:17.5 |
| 26 | 39:61 | 39:19.5 | 39:17.5 |
| 27 | 39:61 | 39:19.5 | 39:17.5 |
| 28 | 39:61 | — | 39:17.5 |
| 29 | 62:38 | 4:2 | 4:1.6 |
| 30 | 56:44 | 56:22.4 | 56:19.6 |
| 31 | 47:53 | 47:44.7 | 47:42.3 |
| 32 | 19:81 | 19:2.3 | 19:1.3 |
| 33 | 38:62 | 38:5.7 | 38:32.3 |
| 34 | 39:61 | 39:34.3 | 39:2.73 |
| 35 | 47:53 | 47:44.7 | 47:42.3 |
| 36 | 39:61 | 39:19.5 | 39:17.5 |
| 37 | 39:61 | 39:19.5 | 39:17.5 |
| 38 | 39:61 | 39:19.5 | 39:17.5 |
| 39 | 39:61 | 39:19.5 | 39:17.5 |
| 40 | 39:61 | 39:19.5 | 39:17.5 |
| 41 | 39:61 | 39:19.5 | 39:17.5 |
| 42 | 39:61 | 39:19.5 | 39:17.5 |
| 43 | 39:61 | 39:19.5 | 39:17.5 |
| 44 | 39:61 | 39:19.5 | 39:17.5 |
| 45 | 39:61 | 39:19.5 | 39:17.5 |
| 46 | 39:61 | 39:19.5 | 39:17.5 |
| 47 | 39:61 | 39:19.5 | 39:17.5 |
| 48 | 39:61 | 39:19.5 | 39:17.5 |
| 49 | 39:61 | 39:19.5 | 39:17.5 |
| 50 | 39:61 | 39:19.5 | 39:17.5 |
| 51 | 39:61 | 39:19.5 | 39:17.5 |
| 52 | 39:61 | 39:19.5 | 39:17.5 |
| 53 | 39:61 | 39:19.5 | 39:17.5 |
| 54 | 39:61 | 39:19.5 | 39:17.5 |
| 55 | 39:61 | 39:19.5 | 39:17.5 |

TABLE 4

| | | Support substrate | | | |
|---|---|---|---|---|---|
| No. | Film | Hard coat coating composition | Antiblocking coating composition | Zeta potential (mV) | Surface free energy (mN/m) |
| Example 1 | 7 | U48 | 1 | Applied | −22 | 45 |
| Example 2 | 7 | U48 | 1 | Applied | −22 | 45 |
| Example 3 | 8 | U48 | 2 | Applied | −25 | 47 |
| Example 4 | 7 | U48 | 1 | Applied | −22 | 45 |
| Example 5 | 7 | U48 | 1 | Applied | −22 | 45 |
| Example 6 | 7 | U48 | 1 | Applied | −22 | 45 |
| Example 7 | 7 | U48 | 1 | Applied | −22 | 45 |
| Example 8 | 7 | U48 | 1 | Applied | −22 | 45 |
| Example 9 | 7 | U48 | 1 | Applied | −22 | 45 |
| Example 10 | 7 | U48 | 1 | Applied | −22 | 45 |
| Example 11 | 7 | U48 | 1 | Applied | −22 | 45 |
| Example 12 | 7 | U48 | 1 | Applied | −22 | 45 |
| Example 13 | 7 | U48 | 1 | Applied | −22 | 45 |
| Example 14 | 7 | U48 | 1 | Applied | −22 | 45 |
| Example 15 | 7 | U48 | 1 | Applied | −22 | 45 |
| Example 16 | 7 | U48 | 1 | Applied | −22 | 45 |
| Example 17 | 7 | U48 | 1 | Applied | −22 | 45 |
| Example 18 | 7 | U48 | 1 | Applied | −22 | 45 |
| Example 19 | 7 | U48 | 1 | Applied | −22 | 45 |
| Example 20 | 7 | U48 | 1 | Applied | −22 | 45 |
| Example 21 | 7 | U48 | 1 | Applied | −22 | 45 |
| Example 22 | 7 | U48 | 1 | Applied | −22 | 45 |
| Example 23 | 7 | U48 | 1 | Applied | −22 | 45 |
| Example 24 | 7 | U48 | 1 | Applied | −22 | 45 |
| Example 25 | 7 | U48 | 1 | Applied | −22 | 45 |
| Example 26 | 7 | U48 | 1 | Applied | −22 | 45 |
| Example 27 | 7 | U48 | 1 | Applied | −22 | 45 |
| Example 28 | 1 | U48 | — | — | −16 | 48 |
| Example 29 | 2 | U46 | — | — | −27 | 50 |
| Example 30 | 3 | U34 | — | — | −11 | 41 |
| Example 31 | 9 | U48 | 3 | Applied | −53 | 59 |

TABLE 4-continued

| | | | | | | |
|---|---|---|---|---|---|---|
| Example 32 | 4 | U48 | 1 | — | −22 | 45 |
| Example 33 | 7 | U48 | 1 | Applied | −22 | 45 |
| Example 34 | 7 | U48 | 1 | Applied | −22 | 45 |
| Example 35 | 7 | U48 | 1 | Applied | −22 | 45 |
| Example 36 | 7 | U48 | 1 | Applied | −22 | 45 |
| Example 37 | 7 | U48 | 1 | Applied | −22 | 45 |
| Example 38 | 7 | U48 | 1 | Applied | −22 | 45 |
| Example 39 | 7 | U48 | 1 | Applied | −22 | 45 |
| Example 40 | 7 | U48 | 1 | Applied | −22 | 45 |
| Example 41 | 7 | U48 | 1 | Applied | −22 | 45 |
| Example 42 | 7 | U48 | 1 | Applied | −22 | 45 |
| Example 43 | 7 | U48 | 1 | Applied | −22 | 45 |
| Example 44 | 7 | U48 | 1 | Applied | −22 | 45 |
| Example 45 | 7 | U48 | 1 | Applied | −22 | 45 |
| Example 46 | 7 | U48 | 1 | Applied | −22 | 45 |
| Example 47 | 7 | U48 | 1 | Applied | −22 | 45 |
| Example 48 | 7 | U48 | 1 | Applied | −22 | 45 |
| Example 49 | 7 | U48 | 1 | Applied | −22 | 45 |
| Example 50 | 7 | U48 | 1 | Applied | −22 | 45 |
| Example 51 | 7 | U48 | 1 | Applied | −22 | 45 |
| Example 52 | 7 | U48 | 1 | Applied | −22 | 45 |
| Comparative Example 1 | 7 | U48 | 1 | Applied | −22 | 45 |
| Comparative Example 2 | 2 | U46 | — | — | −27 | 50 |
| Comparative Example 3 | 4 | U48 | 1 | — | −16 | 48 |
| Comparative Example 4 | 7 | U48 | 1 | Applied | −22 | 45 |
| Comparative Example 5 | 7 | U48 | 1 | Applied | −22 | 45 |
| Comparative Example 6 | 7 | U48 | 1 | Applied | −22 | 45 |
| Comparative Example 7 | 7 | U48 | 1 | Applied | −22 | 45 |
| Comparative Example 8 | 7 | U48 | 1 | Applied | −22 | 45 |

| | | Laminated body | | | | | | |
|---|---|---|---|---|---|---|---|---|
| | | Average thickness of first layer and second layer | | Refractive index of first layer and second layer | | Transparency | Zeta potential of first layer surface (mv) | Alkali resistance |
| | Coating composition formulation | First layer (nm) | Second layer (nm) | First layer | Second layer | Haze value (%) | | |
| Example 1 | 1 | 30 | 50 | 1.4 | 1.68 | 0.7 | −25 | B |
| Example 2 | 2 | 30 | 50 | 1.4 | 1.68 | 0.7 | −25 | B |
| Example 3 | 3 | 30 | 50 | 1.4 | 1.68 | 0.7 | −25 | B |
| Example 4 | 4 | 30 | 50 | 1.42 | 1.68 | 0.8 | −25 | B |
| Example 5 | 5 | 30 | 50 | 1.41 | 1.68 | 0.7 | −25 | B |
| Example 6 | 6 | 30 | 50 | 1.4 | 1.68 | 0.7 | −25 | B |
| Example 7 | 7 | 30 | 50 | 1.42 | 1.68 | 0.7 | −25 | B |
| Example 8 | 8 | 30 | 50 | 1.42 | 1.68 | 0.7 | −25 | B |
| Example 9 | 9 | 30 | 50 | 1.41 | 1.68 | 0.7 | −25 | B |
| Example 10 | 10 | 30 | 50 | 1.41 | 1.68 | 0.7 | −25 | B |
| Example 11 | 11 | 30 | 50 | 1.4 | 1.68 | 0.8 | −25 | B |
| Example 12 | 12 | 30 | 50 | 1.4 | 1.68 | 0.8 | −25 | B |
| Example 13 | 13 | 30 | 50 | 1.4 | 1.68 | 0.8 | −25 | B |
| Example 14 | 14 | 30 | 50 | 1.4 | 1.68 | 0.9 | −25 | B |
| Example 15 | 15 | 30 | 50 | 1.4 | 1.68 | 0.8 | −25 | B |
| Example 16 | 16 | 30 | 50 | 1.4 | 1.68 | 0.8 | −25 | B |
| Example 17 | 17 | 30 | 50 | 1.4 | 1.68 | 0.9 | −25 | B |
| Example 18 | 18 | 30 | 50 | 1.43 | 1.68 | 0.8 | −25 | B |
| Example 19 | 19 | 30 | 50 | 1.4 | 1.68 | 0.8 | −25 | B |
| Example 20 | 20 | 30 | 50 | 1.4 | 1.68 | 0.7 | −75 | A |
| Example 21 | 21 | 20 | 30 | 1.4 | 1.68 | 0.7 | −75 | A |
| Example 22 | 22 | 20 | 65 | 1.4 | 1.68 | 0.7 | −75 | A |
| Example 23 | 23 | 40 | 30 | 1.4 | 1.68 | 0.7 | −75 | A |
| Example 24 | 24 | 40 | 65 | 1.4 | 1.68 | 0.7 | −75 | A |
| Example 25 | 25 | 30 | 50 | 1.43 | 1.69 | 0.7 | −75 | A |
| Example 26 | 26 | 30 | 50 | 1.4 | 1.67 | 0.7 | −75 | A |
| Example 27 | 27 | 30 | 50 | 1.4 | 1.68 | 0.7 | −75 | A |
| Example 28 | 1 | 30 | 50 | 1.4 | 1.68 | 0.9 | −25 | B |
| Example 29 | 1 | 30 | 50 | 1.4 | 1.68 | 0.9 | −25 | B |
| Example 30 | 1 | 30 | 50 | 1.4 | 1.68 | 1.2 | −25 | B |

TABLE 4-continued

| | | | | | | | | |
|---|---|---|---|---|---|---|---|---|
| Example 31 | 1 | 30 | 50 | 1.4 | 1.68 | 1.2 | −25 | B |
| Example 32 | 1 | 30 | 50 | 1.4 | 1.68 | 0.7 | −25 | B |
| Example 33 | 36 | 30 | 50 | 1.4 | 1.68 | 0.7 | −25 | A |
| Example 34 | 37 | 30 | 50 | 1.4 | 1.68 | 0.7 | −25 | A |
| Example 35 | 38 | 30 | 50 | 1.4 | 1.68 | 0.7 | −25 | A |
| Example 36 | 39 | 30 | 50 | 1.4 | 1.68 | 0.7 | −25 | A |
| Example 37 | 40 | 30 | 50 | 1.4 | 1.68 | 0.7 | −25 | A |
| Example 38 | 41 | 30 | 50 | 1.4 | 1.68 | 0.7 | −25 | A |
| Example 39 | 42 | 30 | 50 | 1.4 | 1.68 | 0.7 | −25 | A |
| Example 40 | 43 | 30 | 50 | 1.4 | 1.68 | 0.7 | −25 | A |
| Example 41 | 44 | 30 | 50 | 1.4 | 1.68 | 0.7 | −25 | A |
| Example 42 | 45 | 30 | 50 | 1.4 | 1.68 | 0.7 | −25 | A |
| Example 43 | 46 | 30 | 50 | 1.4 | 1.68 | 0.7 | −25 | A |
| Example 44 | 47 | 30 | 50 | 1.4 | 1.68 | 0.7 | −25 | A |
| Example 45 | 48 | 30 | 50 | 1.4 | 1.68 | 0.7 | −25 | A |
| Example 46 | 49 | 30 | 50 | 1.4 | 1.68 | 0.7 | −25 | A |
| Example 47 | 50 | 30 | 50 | 1.4 | 1.68 | 0.7 | −25 | A |
| Example 48 | 51 | 30 | 50 | 1.4 | 1.68 | 0.7 | −25 | A |
| Example 49 | 52 | 30 | 50 | 1.4 | 1.68 | 0.7 | −25 | A |
| Example 50 | 53 | 30 | 50 | 1.4 | 1.68 | 0.7 | −25 | B |
| Example 51 | 54 | 30 | 50 | 1.4 | 1.68 | 0.7 | −55 | B |
| Example 52 | 55 | 30 | 50 | 1.4 | 1.68 | 0.7 | −65 | A |
| Comparative Example 1 | 28 | 30 | 50 | 1.45 | 1.68 | 0.5 | −75 | B |
| Comparative Example 2 | 29 | 100 | 600 | 1.36 | 1.68 | 1.4 | −75 | B |
| Comparative Example 3 | 30 | 100 | 100 | 1.38 | 1.69 | 1.4 | −25 | B |
| Comparative Example 4 | 31 | 30 | 50 | 1.43 | 1.68 | 0.9 | −25 | B |
| Comparative Example 5 | 32 | 30 | 50 | 1.4 | 1.68 | 0.8 | −25 | B |
| Comparative Example 6 | 33 | 30 | 50 | 1.4 | 1.68 | 1.4 | −25 | B |
| Comparative Example 7 | 34 | 30 | 50 | 1.4 | 1.68 | 1.2 | −25 | B |
| Comparative Example 8 | 35 | 30 | 50 | 1.42 | 1.68 | 1.2 | −15 | C |

| | Laminated body | | | | | | |
|---|---|---|---|---|---|---|---|
| | Number average particle diameter | | Number of openings of first layer | Surface shape | | Interface shape | |
| | $D_X$ (nm) | $D_Y$ (nm) | 1 to 5 | $L_X/D_X$ | $S_{LX}$ | State of interface | $A_{12}/D_X$ | $F_{12}/D_X$ |
| Example 1 | 12 | 8 | 5 | 2 | 3 | A | 0.5 | 8 |
| Example 2 | 12 | 8 | 5 | 2.2 | 2 | A | 0.6 | 6 |
| Example 3 | 12 | 8 | 5 | 1.8 | 3 | A | 0.7 | 9 |
| Example 4 | 12 | 8 | 5 | 2.2 | 2 | A | 0.8 | 10 |
| Example 5 | 12 | 8 | 5 | 2.1 | 3 | A | 0.6 | 7 |
| Example 6 | 12 | 8 | 5 | 2.6 | 4 | A | 0.5 | 5 |
| Example 7 | 20 | 8 | 3 | 1.4 | 6 | A | 0.3 | 3 |
| Example 8 | 23 | 15 | 3 | 1.4 | 5 | A | 0.3 | 3 |
| Example 9 | 12 | 8 | 3 | 3 | 7 | A | 0.8 | 11 |
| Example 10 | 12 | 8 | 3 | 1.4 | 6 | A | 0.5 | 5 |
| Example 11 | 12 | 8 | 5 | 2.2 | 4 | A | 0.5 | 8 |
| Example 12 | 12 | 8 | 4 | 2.9 | 6 | A | 0.9 | 13 |
| Example 13 | 12 | 8 | 4 | 2.8 | 5 | A | 0.4 | 4 |
| Example 14 | 12 | 8 | 4 | 2.8 | 6 | B | 1.2 | 16 |
| Example 15 | 12 | 8 | 5 | 2.7 | 5 | A | 0.9 | 13 |
| Example 16 | 12 | 8 | 4 | 3 | 7 | A | 1.1 | 15 |
| Example 17 | 12 | 8 | 2 | 2.9 | 6 | A | 0.4 | 4 |
| Example 18 | 12 | 8 | 5 | 2.6 | 4 | A | 0.5 | 5 |
| Example 19 | 12 | 8 | 5 | 2.6 | 5 | A | 1.1 | 15 |
| Example 20 | 12 | 8 | 5 | 2.4 | 4 | A | 0.8 | 11 |
| Example 21 | 12 | 8 | 5 | 2.2 | 4 | A | 0.7 | 10 |
| Example 22 | 12 | 8 | 5 | 2.6 | 4 | A | 0.5 | 6 |
| Example 23 | 12 | 8 | 5 | 2.2 | 4 | A | 0.6 | 9 |
| Example 24 | 12 | 8 | 5 | 2.7 | 5 | A | 0.8 | 11 |
| Example 25 | 12 | 8 | 5 | 2.6 | 4 | A | 0.5 | 5 |
| Example 26 | 12 | 10 | 5 | 2.6 | 4 | A | 0.9 | 12 |
| Example 27 | 12 | 8 | 5 | 2.6 | 4 | A | 0.9 | 12 |
| Example 28 | 12 | 8 | 5 | 2.2 | 2 | A | 0.8 | 10 |
| Example 29 | 12 | 8 | 5 | 2.5 | 3 | A | 0.6 | 6 |
| Example 30 | 12 | 8 | 5 | 2.9 | 6 | B | 1.2 | 16 |
| Example 31 | 12 | 8 | 5 | 2.8 | 6 | B | 1.4 | 18 |
| Example 32 | 12 | 8 | 5 | 2.4 | 3 | A | 0.7 | 9 |

TABLE 4-continued

|  |  |  |  |  |  |  |  |  |
|---|---|---|---|---|---|---|---|---|
| Example 33 | 12 | 8 | 5 | 2 | 3 | A | 0.5 | 8 |
| Example 34 | 12 | 8 | 5 | 2 | 3 | A | 0.6 | 7 |
| Example 35 | 12 | 8 | 5 | 1.8 | 3 | A | 0.5 | 8 |
| Example 36 | 12 | 8 | 5 | 2.2 | 2 | A | 0.5 | 8 |
| Example 37 | 12 | 8 | 5 | 2 | 3 | A | 0.7 | 6 |
| Example 38 | 12 | 8 | 5 | 2.2 | 2 | A | 0.6 | 8 |
| Example 39 | 12 | 8 | 5 | 1.8 | 2 | A | 0.5 | 7 |
| Example 40 | 12 | 8 | 5 | 1.8 | 3 | A | 0.5 | 7 |
| Example 41 | 12 | 8 | 5 | 2 | 3 | A | 0.7 | 9 |
| Example 42 | 12 | 8 | 5 | 2 | 3 | A | 0.5 | 8 |
| Example 43 | 12 | 8 | 5 | 2 | 3 | A | 0.6 | 7 |
| Example 44 | 12 | 8 | 5 | 1.8 | 3 | A | 0.5 | 8 |
| Example 45 | 12 | 8 | 5 | 2.2 | 2 | A | 0.5 | 8 |
| Example 46 | 12 | 8 | 5 | 2 | 3 | A | 0.7 | 6 |
| Example 47 | 12 | 8 | 5 | 2.2 | 2 | A | 0.6 | 8 |
| Example 48 | 12 | 8 | 5 | 1.8 | 2 | A | 0.5 | 7 |
| Example 49 | 12 | 8 | 5 | 1.8 | 3 | A | 0.5 | 7 |
| Example 50 | 12 | 8 | 5 | 2 | 3 | A | 0.7 | 9 |
| Example 51 | 12 | 8 | 5 | 2 | 3 | A | 0.5 | 8 |
| Example 52 | 12 | 8 | 5 | 2 | 3 | A | 0.5 | 8 |
| Comparative Example 1 | — | 8 | — | — | — | C | — | — |
| Comparative Example 2 | 60 | 10 | 2 | 1.1 | 8 | A | 0.1 | 2 |
| Comparative Example 3 | 40 | 8 | 2 | 1.2 | 8 | A | 0.1 | 2 |
| Comparative Example 4 | 12 | 8 | 2 | 5 | 9 | A | 0.5 | 14 |
| Comparative Example 5 | 12 | 8 | 2 | 4.8 | 9 | A | 0.5 | 13 |
| Comparative Example 6 | 12 | 8 | 1 | 1.1 | 9 | B | 1.4 | 17 |
| Comparative Example 7 | 12 | 8 | 1 | 1.2 | 9 | B | 1.3 | 18 |
| Comparative Example 8 | 3 | 8 | 1 | 4 | 10 | B | 1.2 | 16 |

TABLE 5

| Conductive laminated body | Transparency of conductive layer Haze value (%) | Surface resistance value of conductive layer | | Adhesiveness of conductive layer 1 to 5 | Pattern visibility of conductive layer | | |
|---|---|---|---|---|---|---|---|
| | | Conductive layer formation 1 (annealed at 160° C.) (Ω/□) | Conductive layer formation 2 (annealed at 130° C.) (Ω/□) | | Front observation 1 to 5 | Oblique observation 1 to 5 | In-Plane variation 1 to 5 |
| Example 1 | 0.8 | 150 | 165 | 5 | 5 | 5 | 5 |
| Example 2 | 0.8 | 150 | 165 | 5 | 5 | 5 | 5 |
| Example 3 | 0.8 | 150 | 165 | 5 | 5 | 5 | 5 |
| Example 4 | 0.8 | 150 | 165 | 5 | 5 | 5 | 5 |
| Example 5 | 0.8 | 150 | 165 | 5 | 5 | 5 | 5 |
| Example 6 | 0.8 | 150 | 165 | 5 | 5 | 5 | 5 |
| Example 7 | 0.8 | 160 | 190 | 5 | 5 | 4 | 4 |
| Example 8 | 1.0 | 160 | 190 | 5 | 5 | 4 | 4 |
| Example 9 | 1.3 | 170 | 200 | 3 | 5 | 4 | 5 |
| Example 10 | 0.8 | 170 | 200 | 5 | 5 | 5 | 5 |
| Example 11 | 0.8 | 150 | 165 | 5 | 5 | 5 | 5 |
| Example 12 | 1.2 | 180 | 210 | 4 | 4 | 4 | 4 |
| Example 13 | 1.2 | 180 | 210 | 4 | 4 | 4 | 4 |
| Example 14 | 1.5 | 180 | 210 | 4 | 3 | 3 | 5 |
| Example 15 | 0.8 | 180 | 210 | 4 | 4 | 4 | 4 |
| Example 16 | 1.5 | 180 | 210 | 3 | 4 | 4 | 5 |
| Example 17 | 1.2 | 180 | 210 | 4 | 3 | 3 | 4 |
| Example 18 | 0.8 | 150 | 165 | 5 | 5 | 5 | 5 |
| Example 19 | 1.2 | 150 | 165 | 5 | 5 | 5 | 5 |
| Example 20 | 0.8 | 150 | 165 | 5 | 5 | 5 | 5 |
| Example 21 | 0.8 | 150 | 165 | 5 | 4 | 4 | 5 |
| Example 22 | 0.8 | 150 | 165 | 5 | 4 | 4 | 5 |
| Example 23 | 0.8 | 150 | 165 | 5 | 4 | 4 | 5 |
| Example 24 | 0.8 | 150 | 165 | 5 | 4 | 4 | 5 |
| Example 25 | 0.8 | 150 | 165 | 5 | 5 | 5 | 5 |
| Example 26 | 1 | 150 | 165 | 5 | 4 | 4 | 5 |

TABLE 5-continued

| Conductive laminated body | Transparency of conductive layer Haze value (%) | Surface resistance value of conductive layer | | Adhesiveness of conductive layer 1 to 5 | Pattern visibility of conductive layer | | In-Plane variation 1 to 5 |
|---|---|---|---|---|---|---|---|
| | | Conductive layer formation 1 (annealed at 160° C.) (Ω/□) | Conductive layer formation 2 (annealed at 130° C.) (Ω/□) | | Front observation 1 to 5 | Oblique observation 1 to 5 | |
| Example 27 | 1 | 150 | 165 | 5 | 4 | 4 | 5 |
| Example 28 | 1.2 | 150 | 165 | 5 | 5 | 5 | 5 |
| Example 29 | 1.2 | 150 | 165 | 5 | 5 | 5 | 5 |
| Example 30 | 1.5 | 170 | 200 | 4 | 4 | 4 | 5 |
| Example 31 | 1.5 | 170 | 200 | 4 | 4 | 4 | 5 |
| Example 32 | 1.2 | 150 | 165 | 5 | 5 | 5 | 5 |
| Example 33 | 0.8 | 150 | 165 | 5 | 5 | 5 | 5 |
| Example 34 | 0.8 | 150 | 165 | 5 | 5 | 5 | 5 |
| Example 35 | 0.8 | 150 | 165 | 5 | 5 | 5 | 5 |
| Example 36 | 0.8 | 150 | 165 | 5 | 5 | 5 | 5 |
| Example 37 | 0.8 | 150 | 165 | 5 | 5 | 5 | 5 |
| Example 38 | 0.8 | 150 | 165 | 5 | 5 | 5 | 5 |
| Example 39 | 0.8 | 150 | 165 | 5 | 5 | 5 | 5 |
| Example 40 | 0.8 | 150 | 165 | 5 | 5 | 5 | 5 |
| Example 41 | 0.8 | 150 | 165 | 5 | 5 | 5 | 5 |
| Example 42 | 0.8 | 150 | 165 | 5 | 5 | 5 | 5 |
| Example 43 | 0.8 | 150 | 165 | 5 | 5 | 5 | 5 |
| Example 44 | 0.8 | 150 | 165 | 5 | 5 | 5 | 5 |
| Example 45 | 0.8 | 150 | 165 | 5 | 5 | 5 | 5 |
| Example 46 | 0.8 | 150 | 165 | 5 | 5 | 5 | 5 |
| Example 47 | 0.8 | 150 | 165 | 5 | 5 | 5 | 5 |
| Example 48 | 0.8 | 150 | 165 | 5 | 5 | 5 | 5 |
| Example 49 | 0.8 | 150 | 165 | 5 | 5 | 5 | 5 |
| Example 50 | 0.8 | 150 | 165 | 5 | 5 | 5 | 5 |
| Example 51 | 0.8 | 150 | 165 | 5 | 5 | 5 | 5 |
| Example 52 | 0.8 | 150 | 165 | 5 | 5 | 5 | 5 |
| Comparative Example 1 | 0.8 | 180 | 280 | 1 | 4 | 1 | 1 |
| Comparative Example 2 | 1.8 | 300 | 350 | 2 | 1 | 1 | 1 |
| Comparative Example 3 | 1.8 | 300 | 350 | 2 | 1 | 1 | 1 |
| Comparative Example 4 | 0.9 | 150 | 250 | 1 | 3 | 3 | 3 |
| Comparative Example 5 | 0.8 | 180 | 280 | 1 | 3 | 3 | 3 |
| Comparative Example 6 | 1.5 | 250 | 350 | 1 | 3 | 3 | 3 |
| Comparative Example 7 | 1.5 | 250 | 350 | 2 | 3 | 3 | 3 |
| Comparative Example 8 | 1.6 | 180 | 280 | 2 | 3 | 3 | 3 |

The invention claimed is:

1. A laminated body comprising:
   a first layer;
   a second layer; and
   a support substrate, the second layer and the first layer having different refractive indices and being laminated in this order on at least one surface of the support substrate, the first layer containing particles X (the particles X being particles having at least an inorganic particle part), the second layer containing particles Y (the particles Y being particles having at least an inorganic particle part),
   wherein the inorganic particle part of the particles X has a number average particle diameter (hereinafter referred to as $D_X$) [nm] of 5 nm to 25 nm, and Expressions (1) and (2) are satisfied:

$$1.4 \leq (L_X/D_X) \leq 3 \quad (1)$$

$$S_{LX} \leq 7 \quad (2)$$

wherein $L_X$ means an average center-to-center distance [nm] between particles of the inorganic particle part of the particles X as measured by observation of the surface of the first layer under a scanning electron microscope; and
   $S_{LX}$ means a standard deviation of the average center-to-center distance [nm] between particles of the inorganic particle part of the particles X as measured by observation of the surface of the first layer under a scanning electron microscope.

2. The laminated body according to claim 1, wherein the number of openings having an inscribed diameter three times or more the $D_X$, as determined by observation of the surface of the first layer under a scanning electron microscope, is not more than 5 per 4 μm².

3. The laminated body according to claim 1, wherein an interface formed by the first layer and the second layer satisfies Expressions (3) and (4):

$$0.3 \leq (A_{12}/D_X) \leq 1.1 \quad (3)$$

$$3 \leq (F_{12}/D_X) \leq 15 \quad (4)$$

wherein $A_{12}$ means an amplitude [nm] of a contour curve of the interface formed by the first layer and the second layer; and $F_{12}$ means a wavelength [nm] of the contour curve of the interface formed by the first layer and the second layer.

4. The laminated body according to claim 1, wherein a zeta potential at pH 10 of the surface of the first layer is −60 mV or less.

5. A conductive laminated body having a conductive layer on the first layer of the laminated body according to claim 1.

6. A touch panel comprising the conductive laminated body according to claim 5.

7. The laminated body according to claim 1, wherein the first layer has an average thickness of 20 nm to 40 nm, and the second layer has an average thickness of 30 nm to 65 nm.

8. The laminated body according to claim 7, wherein the number of openings having an inscribed diameter three times or more the $D_X$, as determined by observation of the surface of the first layer under a scanning electron microscope, is not more than 5 per 4 μm².

9. The laminated body according to claim 7, wherein an interface formed by the first layer and the second layer satisfies Expressions (3) and (4):

$$0.3 \leq (A_{12}/D_X) \leq 1.1 \quad (3)$$

$$3 \leq (F_{12}/D_X) \leq 15 \quad (4)$$

wherein $A_{12}$ means an amplitude [nm] of a contour curve of the interface formed by the first layer and the second layer; and $F_{12}$ means a wavelength [nm] of the contour curve of the interface formed by the first layer and the second layer.

10. The laminated body according to claim 7, wherein a zeta potential at pH 10 of the surface of the first layer is −60 mV or less.

\* \* \* \* \*